(12) United States Patent
Takeuchi et al.

(10) Patent No.: US 6,383,071 B1
(45) Date of Patent: May 7, 2002

(54) VEHICULAR AIR-CONDITIONING APPARATUS

(75) Inventors: Tokuhisa Takeuchi, Chita-gun; So Hibino, Anjo; Teruhiko Kameoka, Okazaki; Koichi Ito, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/693,469

(22) Filed: Oct. 20, 2000

(30) Foreign Application Priority Data

Oct. 21, 1999 (JP) .......................................... 11-300210
Jul. 27, 2000 (JP) ........................................ 2000-227500
Aug. 21, 2000 (JP) ...................................... 2000-250121

(51) Int. Cl.[7] ............................................... B60S 1/54
(52) U.S. Cl. ....................................... 454/121; 454/333
(58) Field of Search ............................... 454/121, 256, 454/258, 333

(56) References Cited

U.S. PATENT DOCUMENTS 3,638,679 A * 2/1972 Gorchev ...................... 137/894
3,641,915 A * 2/1972 Jardinier et al. ............. 454/333
4,874,127 A * 10/1989 Collier ......................... 165/205
5,259,411 A * 11/1993 Guzorek ...................... 110/163

* cited by examiner

Primary Examiner—Harold Joyce
Assistant Examiner—Derek S. Boles
(74) Attorney, Agent, or Firm—Harness, Dickey & Pierce, PLC

(57) ABSTRACT

A differential mechanism is provided between first output shaft, to which the rotation of the drive motor is transmitted, and second output shaft, to which the rotation of first output shaft is transmitted, for adjusting the relative positions of these two output shafts. An air-mix door is connected to first output shaft, and a blowout mode door is connected to second output shaft. The rotation of the drive motor is used to operate the air-mix door and the blowout mode door in linkage, and the blowout mode door is designed to be able to be independently operated by the operation of movable lever of differential gear mechanism.

27 Claims, 48 Drawing Sheets

TEMPERATURE CONTROL LEVER
OPERATION POSITION · BLOWOUT MODE

| TEMPERATURE CONTROL LEVER | BLOWOUT MODE | | | | |
|---|---|---|---|---|---|
| | FACE | B/L | FOOT | F/D | DEF |
| MAXIMUM COOLING (M, C) | OPEN | | | | CLOSED |
| ↑ INTERMEDIATE ↓ | CLOSED | CLOSED | CLOSED | CLOSED | |
| MAXIMUM HEATING (M, H) | OPEN | | | | |

FIG. 25

| TEMPERATURE CONTROL LEVER | BLOWOUT MODE | | | | |
|---|---|---|---|---|---|
| | FACE | B/L | FOOT | F/D | DEF |
| MAXIMUM COOLING (M, C) ↑ INTERMEDIATE ↓ MAXIMUM HEATING (M, H) | CLOSED | CLOSED | CLOSED | CLOSED | CLOSED |
| | OPEN | | | | |

| INTERNAL/EXTERNAL AIR SELECTION :EXTERNAL AIR |
|---|
| MODE OTHER THAN DEF |

| FOOT MODE |
| --- |
| MAXIMUM HEATING |

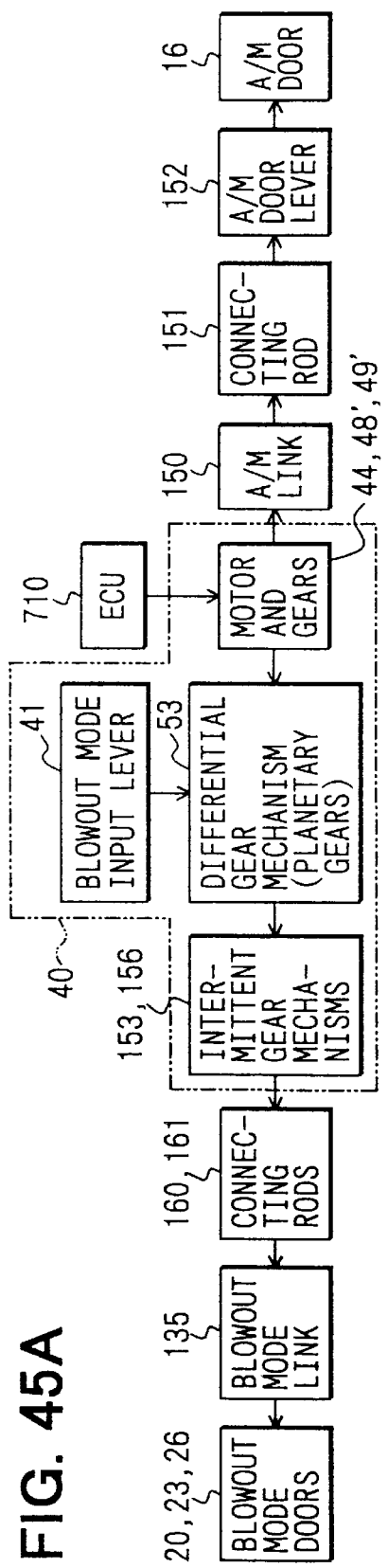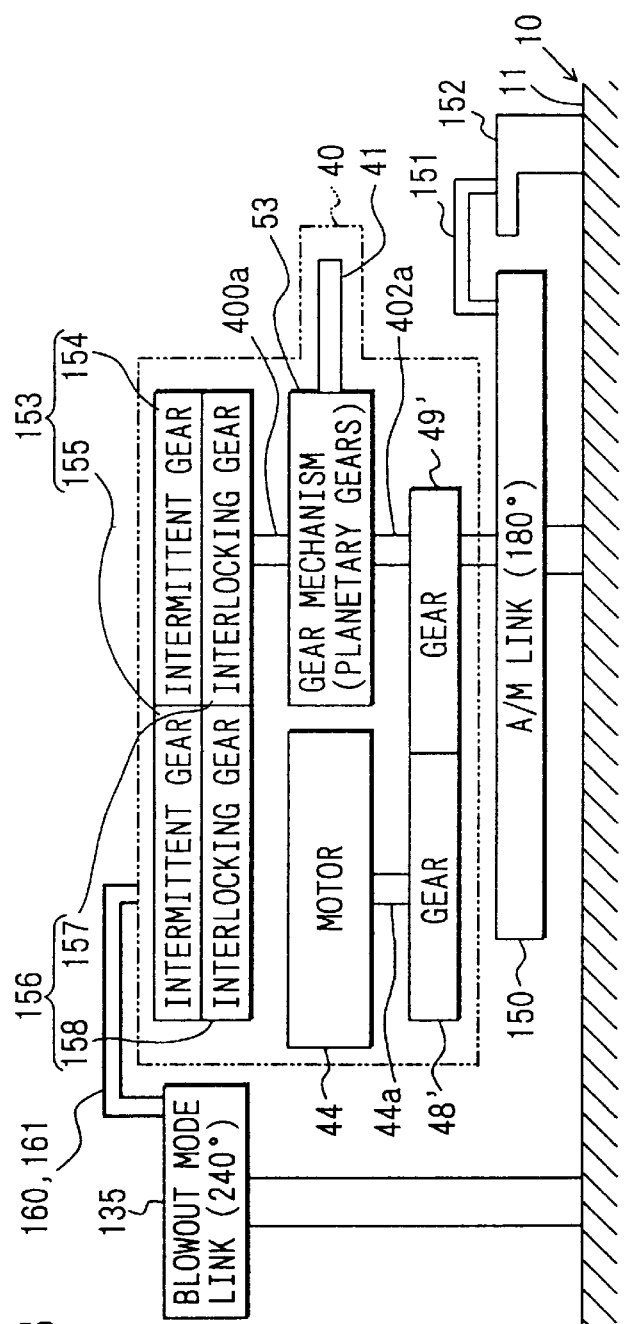

FIG. 53

| | GEAR | MODULE | DIAMETER | OPERATION ANGLE DURING AUTO SETTING | OPERATION ANGLE DURING MANUAL SETTING (MAX VALUE) STATIONARY (MOTOR STOPPED) |
|---|---|---|---|---|---|
| SUN GEAR (A/M) | 40 | 0.5 | 20 | 180° | |
| INTERNAL GEAR (BLOWOUT MODE OUTPUT SIDE) | 80 | 0.5 | 40 | 90° | 600° ※1 |
| PLANETARY GEAR (BLOWOUT MODE INPUT SIDE) | 20 | 0.5 | 10 | STATIONARY | 400° ※2 |

VEHICULAR AIR-CONDITIONING APPARATUS

CROSS-REFERENCE TO RELATED APPLICATION

The present invention is related to Japanese patent application No. Hei. 11-300210, filed Oct. 21, 1999; No. 2000-227500, filed Jul. 27, 2000; and No. 2000-250121, filed Aug. 21, 2000, the contents of which are incorporated herein by reference.

FIELD OF THE INVENTION

The present invention relates to a vehicular air-conditioning apparatus, and more particularly, to a motor actuator and the operational force transmission device used for a vehicular air-conditioning apparatus.

BACKGROUND OF THE INVENTION

Conventional vehicular air-conditioning apparatus is provided with an internal/external air selection door, a temperature control means (air mix door, hot water valve, etc.), as well as a blowout mode door, whereby these instruments are independently operated by means of manual operation mechanisms or motor actuators.

More recently, an increasing number of vehicular air-conditioning apparatuses are beginning to allow the driver to use switch operations for activating motor actuators to easily operate the aforementioned instruments. This type of apparatus requires dedicated motor actuators for internal/external air selection, temperature control, and blowout mode door switching, resulting in higher costs.

Therefore, the inventors evaluated the possibility of using a single motor actuator for temperature control and blowout mode switching, in order to reduce the number of motor actuators. That is, by focusing on the fact that correlation exists between the switching of the blowout mode and the operation position of the temperature control means, and by sequentially shifting the blowout mode from the face mode, to the bi-level mode, and then to lo the foot mode as the operation position of the temperature control means shifts from the low-temperature side to the high-temperature side, the inventors evaluated the possibility of using a single motor actuator for temperature control and blowout mode switching.

However, when temperature control and blowout mode switching are simply performed using a single motor actuator, the operating position of the temperature control means and the switching of the blowout mode are always fixed to a 1-to-1 relationship. Consequently, a problem arises, i.e., when the window is fogged up, it will not be possible to set the defroster mode regardless of the operating position of the temperature control means.

Note that Japanese patent application No. H4-131657 describes a vehicular air-conditioning apparatus that can drive multiple doors by means of a single motor actuator by providing electromagnetic clutches between a single drive shaft and multiple door shafts and using the interrupting action of this electromagnetic clutch for transmitting or shutting off the drive force of the single motor to individual doors.

However, with this conventional technology, it is necessary to provide electromagnetic clutches in the drive force transmission routes to the multiple doors. Consequently, even though the number of motor actuators can be reduced, multiple electromagnetic clutches must be added instead, making it impossible to avoid cost increases.

Moreover, it has been known that some conventional vehicular air-conditioning apparatuses use an internal/external air 2-layer flow mode, in which recirculated internal high-temperature air is blown out from the foot opening while warm low-moisture external air is blown out from the defroster opening. This both improves the heating performance in the area near the vehicle occupant's feet and maintains the window glass fog-free when heating is used in winter.

However, vehicular air-conditioning apparatuses in which this internal/external air 2-layer flow mode can be set have the problem described below. Specifically, this internal/external air 2-layer flow mode is set when the maximum heating capacity is required (i.e., when the temperature control means, such as an air-mix door, is at the maximum heating position) in the blowout mode that opens both the foot and defroster openings. In the internal/external air 2-layer flow mode, the air passage is partitioned into an internal passage leading to the foot openings and an external passage leading to the defroster openings. At the same time, an internal/external air selection box introduces internal air into the internal passage by opening the internal air introduction port located on the internal passage side and introduces external air into the external passage by opening the external air introduction port located on the external passage side.

As explained above, the aforementioned internal/external air 2-layer flow mode must be set in linkage with the setting of the blowout mode for opening both the foot and defroster openings as well as the operation of the temperature control means to the maximum heating setting. Therefore, conventionally, the setting condition for the internal/external air 2-layer flow mode is determined by an air-conditioning control device based on the blowout mode and the operating position of the temperature control means. The output of this air-conditioning control device is added to the drive motor for the internal/external air door, thereby moving the internal/external air door to the 2-layer flow mode.

As described above, a method that sets the 2-layer flow mode through automatic control requires an electrical control area for determining the setting condition for the 2-layer flow mode as well as an electrically controlled door drive motor, thus leading to cost increases.

SUMMARY OF THE INVENTION

The present invention includes a drive motor, a first output shaft to which the rotation of drive motor is transmitted, a second output shaft to which the rotation of first output shaft is transmitted, a differential mechanism located between the first output shaft and second output shaft that adjusts the relative positions of the two output shafts, and an operation component that operates differential mechanism.

A temperature control means, which controls air temperature blown into the interior of the vehicle, is connected to first output shaft. Blowout mode doors are connected to second output shaft. When operation component is set to the auto blowout mode, the rotation of drive motor rotates first output shaft and second output shaft via differential mechanism at the same time. The rotation of first output shaft controls temperature control means. The rotation of second output shaft drives blowout mode doors, thereby switching between the face mode and the foot mode. When operation component is set to the defroster blowout mode while drive motor is stationary, differential mechanism is activated while first output shaft is stationary, thereby setting the defroster mode by rotating second output shaft and shifting the relative positions of the two output shafts.

Accordingly, switching between the blowout temperature control and blowout mode in a vehicular air-conditioning apparatus can be accomplished using a single motor actuator. Moreover, by shifting the relative positions of the two output shafts using differential mechanism, the defroster mode can be set while first output shaft is stationary. Therefore, no electromagnetic clutch is required in the drive force transmission route, as is the case in a conventional technology. Also, the defroster mode can be set any time when the windshield is fogged up, using a simple configuration.

In another aspect of the invention, the defroster mode is maintained even when a second output shaft rotates within a predetermined angle ($\theta^2$) during the defroster mode.

Consequently, the rotation of the drive motor rotates the first output shaft, thereby controlling the position of the temperature control means and controlling the blowout temperature, while maintaining the defroster mode.

In another aspect of the invention, the first output shaft is positioned on one side of the axial direction of differential mechanism while a second output shaft is positioned on the other side of the axial direction of differential mechanism.

In another aspect of the invention, stopper means are provided, which restrict the rotation angle of second output shaft to a predetermined range ($\theta^1$) when second output shaft is rotated by moving operation component to the defroster blowout mode.

In another aspect of the invention, the rotation angle ($\theta^1$) of the second output shaft, rotated when an operation component is moved from the auto blowout mode to the defroster mode, is set larger than the rotation angle ($\theta$) of second output shaft, which is rotated by the rotation of drive motor, when operation component is set to the auto blowout mode.

Consequently, regardless of the rotational position of the second output shaft during automatic control of the blowout mode, the defroster mode is set with the rotation of second output shaft. In another aspect of the invention, operation component is installed in an air-conditioning operation panel in a manually operable manner, and a differential mechanism is provided with a movable component that is activated by receiving the manual operation force from operation component.

In another aspect of the invention, the differential mechanism component is configured using a differential mechanism that uses bevel gears. In another aspect of the invention includes a drive motor, a first output shaft to which the rotation of drive motor is transmitted, a second output shaft to which the rotation of first output shaft is transmitted, a differential mechanism located between first output shaft and second output shaft and that can adjust the relative positions of the two output shafts (50*a* and 58*a*), and a movable component installed in a differential mechanism. A first slave component is connected to first output shaft while second slave components (20, 23, and 26) are connected to second output shaft. When the movable component is being set to the first operation position, the rotation of drive motor rotates the first output shaft and the second output shaft at the same time, via differential mechanism within a predetermined operation angle range. A First slave component and second slave components are activated in linkage through the rotation of first output shaft and the second output shaft. When movable component is set to the second operation position while drive motor is stopped, a differential mechanism is activated while the first output shaft is stationary, thereby rotating the second output shaft outside the aforementioned predetermined operation angle range by shifting the relative positions of the two output shafts (50*a* and 58*a*).

Consequently, first slave component and second slave components (20, 23, and 26) can be simultaneously activated in linkage based on the rotation of drive motor. Also, moving the second slave components (20, 23, and 26) to positions different from those when the drive motor is. active is accomplished by shifting the relative positions of the two output shafts by means of differential mechanism.

In another aspect, the rotation angle ($\theta^1$) of the second output shaft, which is rotated when the movable component is moved from the first operation position to the second operation position, is set larger than the rotation angle ($\theta$) of second output shaft, which is rotated by the rotation of drive motor, when the movable component is set to the first operation position.

In another aspect, the motor actuator described is used as a motor actuator for vehicular air-conditioning by using a temperature control means for controlling the air temperature blown into the cabin as first slave component and using blowout mode doors (20, 23, and 26) for switching blowout modes for the cabin, as second slave components.

In another aspect, a vehicular air-conditioning apparatus is provided with defroster openings for blowing air toward the vehicular window glass, foot openings for blowing air toward the foot area of the vehicle occupant, a first air passages (80 and 80*a*) for sending air to the defroster openings, a second air passages (81 and 81*a*) for sending air to foot openings, a first internal/external air selection door for switching the air introduced into first air passages between the internal and external air, a second internal/external air selection door for switching the air introduced into second air passages, a blowout mode operation component that is manually operated for selecting the blowout mode for the cabin, a blowout mode input component which rotates in linkage with the operation of blowout mode operation component, a temperature control operation component manually operated for controlling air temperature blown into the cabin, temperature control input components (200 and 119) which rotate in linkage with the operation of temperature control operation component, and with differential mechanisms which rotate output component using the rotational shift in all input components. An output component is connected to the operation area of second internal/external air selection door, and the mode for blowing out air from both the defroster opening and the foot opening is set by blowout mode operation component. At the same time, when temperature control operation component is set to the maximum heating setting, differential mechanisms rotate the output component to the predetermined position based on the rotational shifts of all input components. This sets the second internal/external air selection door to the position for introducing the internal air into the second air passages.

In another aspect of the invention, when the defroster mode for blowing out air from the defroster opening is set by the blowout mode operation component, differential mechanisms (98 and 98A) rotate the output component to the predetermined position based on the rotational shifts of blowout mode input component. Accordingly, the second internal/external air selection door is set to stop internal air from entering the second air passages. In another aspect, the shift adjustment mechanisms are installed between the output component and the second internal/external air selection door to adjust the shifts between the two components, and when the defroster mode is set, even if the rotational shifts of temperature control input components change the rotational position of output component, second internal/external air selection door can be maintained in the external air introduction position by means of shift adjustment mechanisms.

In another aspect, when a blowout mode other than the defroster mode is set by the blowout mode operation component and the temperature control operation component is set to the maximum cooling position, differential mechanisms rotate the output component to the predetermined position based on the rotational shifts of all input components, thereby setting the second internal/external air selection door for introducing internal air into second air passages.

In another aspect of the invention, the differential mechanisms use bevel gears. The rotational shifts of temperature control input components are input into the bevel gears.

In another aspect of the invention, shift adjustment mechanisms that adjust the shifts between two components are installed between the blowout mode operation component and the blowout mode input component, and between the temperature control operation component and the temperature control input components.

Another aspect of the invention provides defroster openings for blowing air toward the vehicular window glass, foot openings for blowing out air to the foot area of the vehicle occupant, an internal/external air selection door for switching the air sent to the cabin between internal and external air, an internal/external air operation component manually operated to switch between internal and external air introduction, a blowout mode operation component manually operated for selecting the blowout mode for the cabin, a blowout mode input component which rotates in linkage with the operation of blowout mode operation component, an internal/external air selection input component which rotates in linkage with the operation of internal/external air operation component, and with a differential mechanism which rotates output component using the rotational shift of both input components as inputs. The output component is connected to the operation area of internal/external air selection door. When the mode for blowing air from the defroster openings is set by the blowout mode operation component, differential mechanism rotates output component to predetermined position based on the rotational shifts of blowout mode input component, thereby maintaining internal/external air selection door in the external air introduction position. When a blowout mode other than the defroster-dominant mode is being set by blowout mode operation component, the differential mechanism rotates output component to the position that corresponds to the rotational shift of internal/external air selection input component. This sets the internal/external air selection door to the internal/external air mode set by blowout mode operation component.

In another aspect, shift adjustment mechanisms are installed between the output component and the internal/external air selection door to adjust the shifts between these two components. When the defroster-dominant mode is being set, even if the rotational shifts of temperature control input components cause the rotational position of output component, internal/external air selection door can be maintained in the external air introduction position by means of shift adjustment mechanisms.

Another aspect of the invention includes a temperature control means for controlling the air temperature blown into the cabin, blowout mode doors for switching the mode for blowing air into the cabin, a first transmission means for transmitting the operation of the temperature control operation component to the operation area of temperature control means, and a second transmission means for transmitting the operation of blowout mode operation component to the operation areas of blowout mode doors. Temperature control input components of differential mechanisms are rotated based on the shift transmitted from first transmission means. The blowout mode input component of the differential mechanisms is rotated based on the shift transmitted from second transmission means.

In another aspect of the invention, a vehicular air-conditioning apparatus has a temperature control means for controlling the air temperature blown into the cabin, face openings for blowing out air toward the head of the vehicle occupant in the cabin, foot openings for blowing out air toward the feet of the vehicle occupant in the cabin, defroster openings for blowing out air to the vehicular window glass, and blowout mode doors for opening/closing the individual openings, and that switches at least among the face mode for blowing out air from face opening, the foot mode for blowing out air from foot opening, and the defroster mode for blowing out air from defroster opening. There is further provided a drive motor, a first rotation shaft to which the rotation of drive motor is transmitted, a second rotation shaft to which the rotation of first rotation shaft is transmitted, a differential mechanism that is positioned between first rotation shaft and second rotation shaft for adjusting the relative positions of the two rotation shafts, and an operation component for operating differential mechanism. The temperature control means is connected to first rotation shaft, blowout mode doors are connected to second rotation shaft. When operation component is set to the auto blowout mode, the rotation of drive motor rotates first rotation shaft, and at the same time, rotates second rotation shaft via differential mechanism. Also, at the same time, the rotation of first rotation shaft controls temperature control means and the rotation of second rotation shaft drives blowout mode doors (20, 23, and 26), thereby switching between the face mode and the foot mode. When operation component is set to the face mode position, the foot mode position, or the defroster position of the blowout mode while drive motor is stopped, differential mechanism is activated while first rotation shaft is stationary, thereby setting the face mode, the foot mode, or the defroster mode by rotating second rotation shaft and changing the operation angle of second rotation shaft corresponding to the operation position of operation component.

In another aspect of the invention, an intermittent operation mechanism is provided between the second rotation shaft and the operation mechanism on the side of the blowout mode doors. The rotation of second rotation shaft is intermittently transmitted to the operation mechanism only within part of the operation angle of second rotation shaft.

In another aspect of the invention, a planetary gear mechanism is used for the differential mechanism, and the first rotation shaft is a sun gear shaft while the second rotation shaft is an internal gear shaft. A planetary gear is revolved by operating operation component.

Another aspect of the invention provides an operational force transmission device, provided with a first input component that rotates in linkage with the operation of first operation component, second input components that rotate in linkage with the second operation components, a differential mechanism that rotates output component using the rotational shift of all input components, and with slave components that are driven by the rotational shift of output component.

The differential mechanism rotates the output component to the first output position when all input components have rotated to their predetermined positions. The differential mechanism rotates the output component to the second output position when any of the input components rotates to a position different from the predetermined position. Also, shift adjustment mechanisms can be provided that are installed between output component and slave components for adjusting the shifts among these components. Here, a differential mechanism rotates output component within the predetermined range between first and second positions corresponding to the rotational shift of the first input component within the predetermined range, and moreover, output component is designed to rotate to a third position that is outside of the predetermined range based on the rotational shift of second input components. When output component rotates to the third position, the rotational shift of output component is not transmitted to slave components by shift adjustment mechanisms.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 25 is a table showing the operational characteristics of the second internal/external-air door in a modified example of a vehicle air conditioning apparatus according to the present invention;

FIG. 45A is a diagram explaining the interlocked flow of the door operation mechanism of Embodiment 11 of a vehicle air conditioning apparatus according to the present invention;

FIG. 45B is a schematic diagram of the door operation is mechanism of a vehicle air conditioning apparatus according to the present invention;

FIG. 53 is a table showing examples of specific specifications of the planetary gear mechanism used in the door operation mechanism of a vehicle air conditioning apparatus according to the present invention;

DETAILED DESCRIPTION OF THE INVENTION

Figure 1:
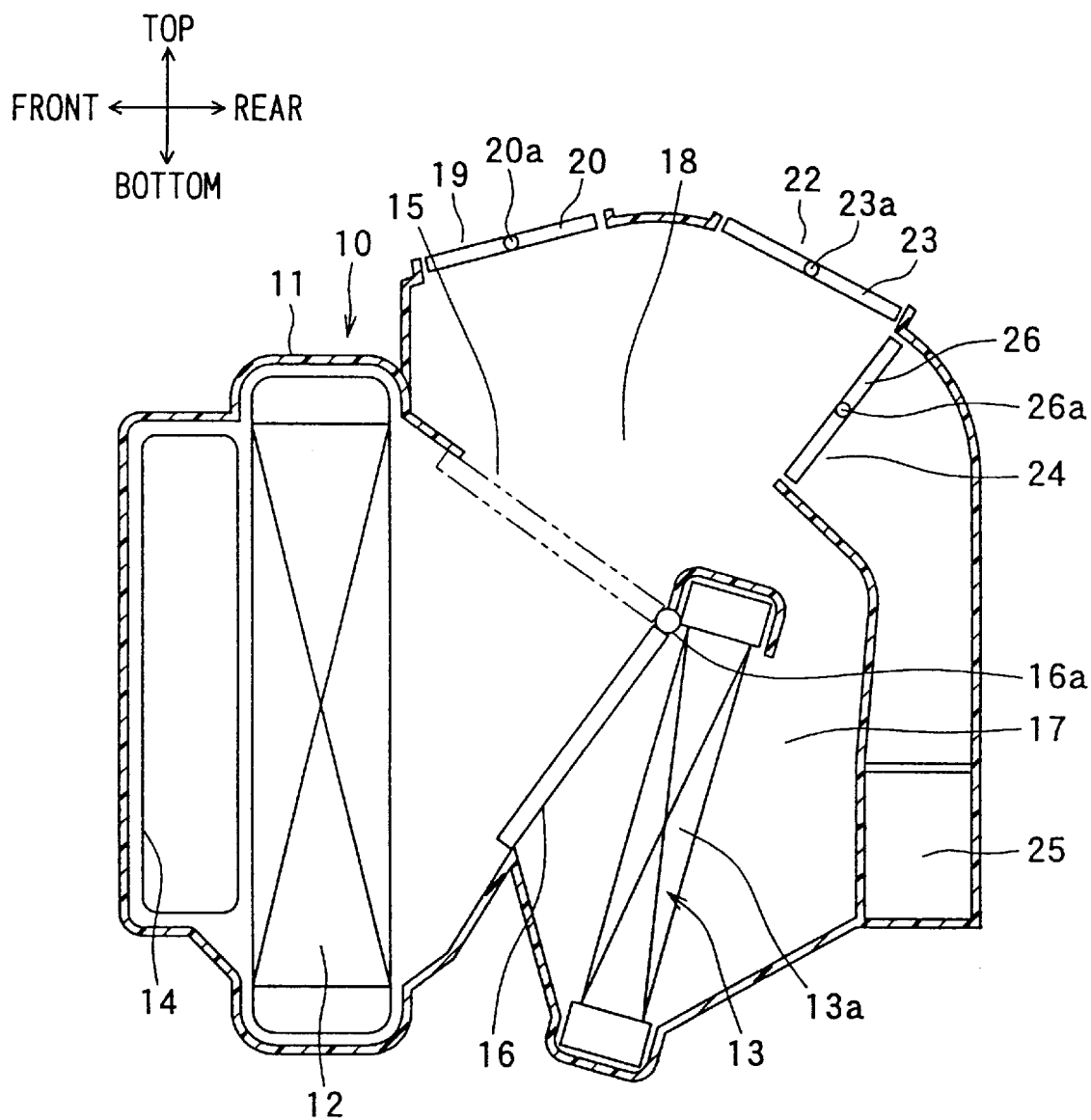
FIG. 1 is a schematic cross-sectional diagram of the major areas of the vehicular air-conditioning apparatus in a first embodiment of the present invention.

FIG. 1 is a cross-sectional diagram of the air-conditioning unit of a vehicular air-conditioning apparatus according to a first embodiment of the present invention. The air-conditioning apparatus in this embodiment has a so-called semi-center placement layout, in which air-conditioning unit 10 is positioned in the approximate center in the left-right direction of the vehicle inside the instrument panel located in the front portion of the cabin. The arrows in the figure indicate the installation orientation of air-conditioning unit 10 relative to the up-down and front-back directions.

A fan unit (not shown in the figure) for sending conditioned air to this air-conditioning unit 10 is positioned while being offset to one side (the passenger side) of air-conditioning unit 10. As is well known, this fan unit is provided with an internal/external air selection box for selectively introducing the internal or external air and with a centrifugal electric fan for sending the air (the internal or external air) sucked into this internal/external air selection box toward air-conditioning unit 10. Air-conditioning unit 10 has an air-conditioning case 11 made of resin, and an air passage, through which the supplied air flows from the front of the vehicle toward the back of the vehicle via heat exchangers 12 and 13, is formed inside this air-conditioning case 11.

Inside the air passage of air-conditioning case 11, evaporator 12 is positioned toward the front of the vehicle and heater core 13 is positioned toward the back of the vehicle. As is well known, evaporator 12 is a heat exchanger for cooling, which cools air by absorbing latent heat of vaporization of the coolant in a cooling cycle. Heater core 13 is a heat exchanger for heating, that heats the air using hot water (cooling water) from the vehicle engine as the heat source. An air intake port 14 (not shown in the figure) into which air supplied from the fan unit flows, is formed on the front-most side of air-conditioning case 11 in the vehicle (in front of evaporator 12) and on the side of the passenger seat.

A cool air bypass passage 15 is formed above heater core 13, and a plate-shaped air-mix door 16 is rotatably installed with rotation shaft 16a at its center, immediately downstream of evaporator 12 (toward the back of the vehicle). This air-mix door 16 adjusts the temperature of air blown out to the desired level by controlling the ratio between the cool air passing through cool air bypass passage 15 and the warm air passing through core area 13a of heater core 13.

An upward-facing warm air passage 17 is formed immediately behind heater core 13, and the warm air from this warm air passage 17 and the cold air from cool air bypass passage 15 are mixed in air-mixing area 18. Multiple blow-out openings are formed on the downstream side of the air passages of air-conditioning case 11. Of these blowout openings, defroster openings 19 open into air-conditioning case 11 on its top surface at the approximate center in the front-back direction of the vehicle. Furthermore, these defroster openings 19 blow conditioned air out toward the interior surfaces of vehicle window glass via defroster ducts (not shown in the figure). Defroster openings 19 are opened and closed by a plate-shaped defroster door 20 that rotates around a rotating shaft 20a.

Next, face openings 22 open into air-conditioning case 11 on its top surface, behind defroster openings 19 in terms of the vehicle direction. These face openings 22 blow air out toward the head of the vehicle occupants inside the cabin via face ducts (not shown in the figure). Face openings 22 are opened and closed by a plate-shaped face door 23 that rotates around a rotating shaft 23a.

Next, foot openings 24 open into air-conditioning case 11 below face openings 22. The downstream side of foot openings 24 are connected to foot blowout openings 25 positioned on both the right and left sides of air-conditioning case 11. These foot blowout openings 25 blow air out toward the feet of the vehicle occupants. Foot openings 24 are opened and closed by a plate-shaped foot door 26 that rotates around a rotating shaft 26a.

Note that, in the example in FIG. 1, the aforementioned openings 19, 22, and 24 are configured to open and close by three dedicated doors 20, 23, and 26, respectively. However, as is well known, it is also possible to open and close defroster openings 19 and face openings 22 using a single shared door, and to open and close face openings 22 and foot openings 24 using a single shared door.

In air-conditioning unit 10, one end of rotation shaft 16a of air-mix door 16, one end of rotation shaft 20a of defroster door 20, one end of rotation shaft 23a of face door 23, and one end of rotation shaft 26a of foot door 26 protrude outside air-conditioning case 11 and connects to the single motor actuator 40 described below (FIGS. 3 through 6). As such, air-mix door 16 for controlling temperature as well as blowout mode selection doors 20, 23, and 26 are opened and closed by this single motor actuator 40.

Figure 2A:
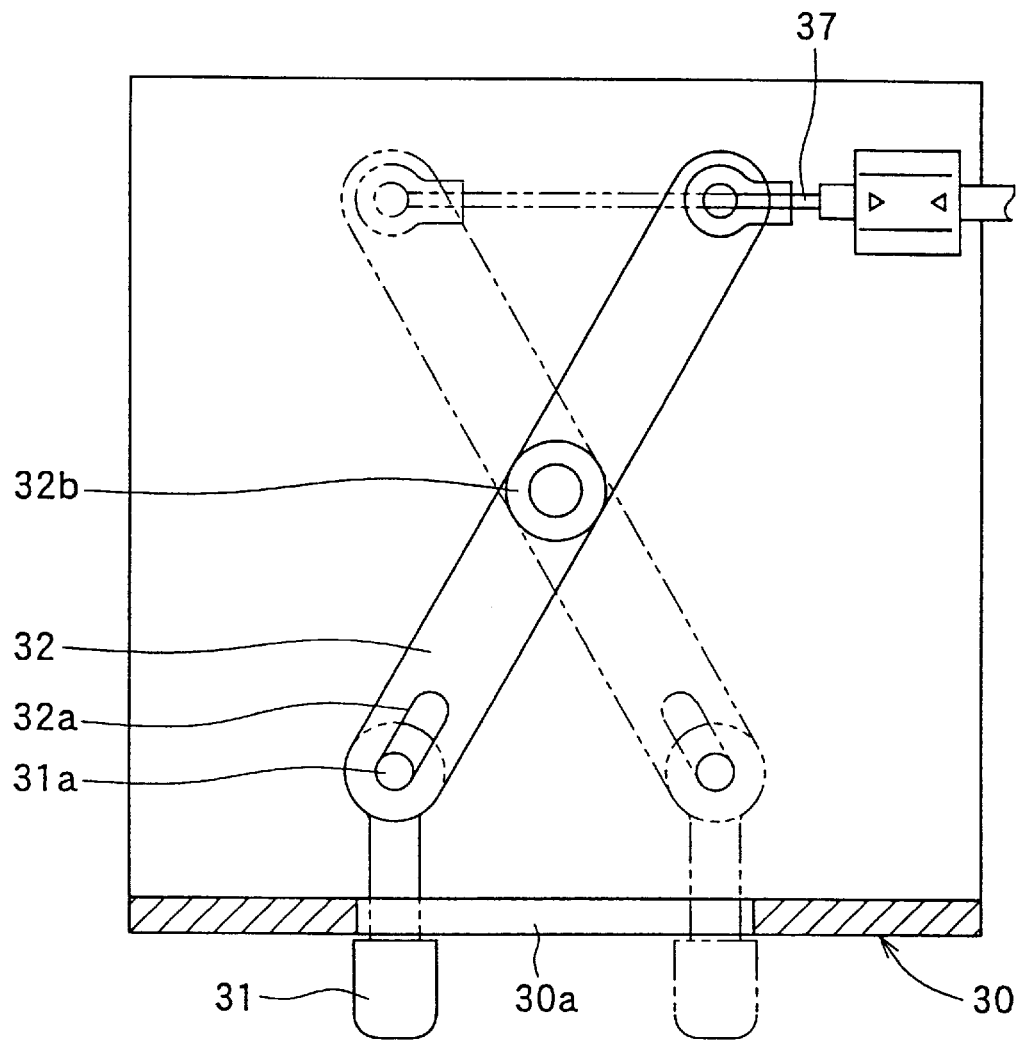
FIG. 2A is a top view of a partial cross-sectional diagram of the air-conditioning operation panel in a first embodiment of the present invention.
Figure 2B:
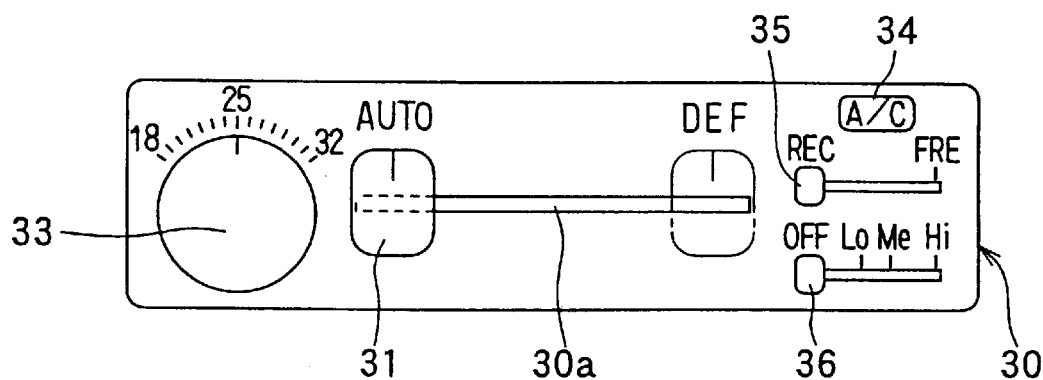
FIG. 2B shows the top view of a partial cross-sectional diagram of the air-conditioning operation panel in a first embodiment of the present invention.

Next, the motor actuator, which is a unique feature of the present invention, will be explained. FIG. 2 shows air-conditioning operation panel 30 which is positioned near the instrument panel in the front portion inside the vehicle, and blowout mode knob 31 is manually operated to the Auto position and the defroster position of the blowout mode by sliding inside groove 30a on the front of panel 30. When this blowout mode knob 31 is set to the Auto position, motor actuator 40 automatically sets the face, bi-level, or foot blowout mode in linkage with the blowout temperature control inside the cabin. On the other hand, when blowout mode knob 31 is set to the defroster position, the defroster mode gets set.

A pin 31a is provided on one end of blowout mode knob 31, which is slidably inserted into groove 32a on one end of lever 32. Since lever 32 is installed on air-conditioning operation panel 30 and rotatably supported by rotation shaft 32b, lever 32 is operated by sliding blowout mode knob 31 inside groove 30a on the front of panel 30. Note that, in this example, other operation components besides blowout mode knob 31, that are manually operated by the vehicle occupant, are provided on the front of air-conditioning operation panel 30. These other operation components are described below. A temperature setter 33 having a rotating knob generates a signal for setting the temperature inside the cabin. A push-button air-conditioning switch 34 generates the activation signal for the compressor (not shown in the figure) for the air-conditioning cooling cycle. An internal/external switch 35 having a lever-type knob generates the signal for switching between the internal and external air for the internal/external air selection box of the fan unit. A fan switch 36 having a lever-type knob generates the air volume selection signal for the electric fan of the fan unit.

Figure 3:
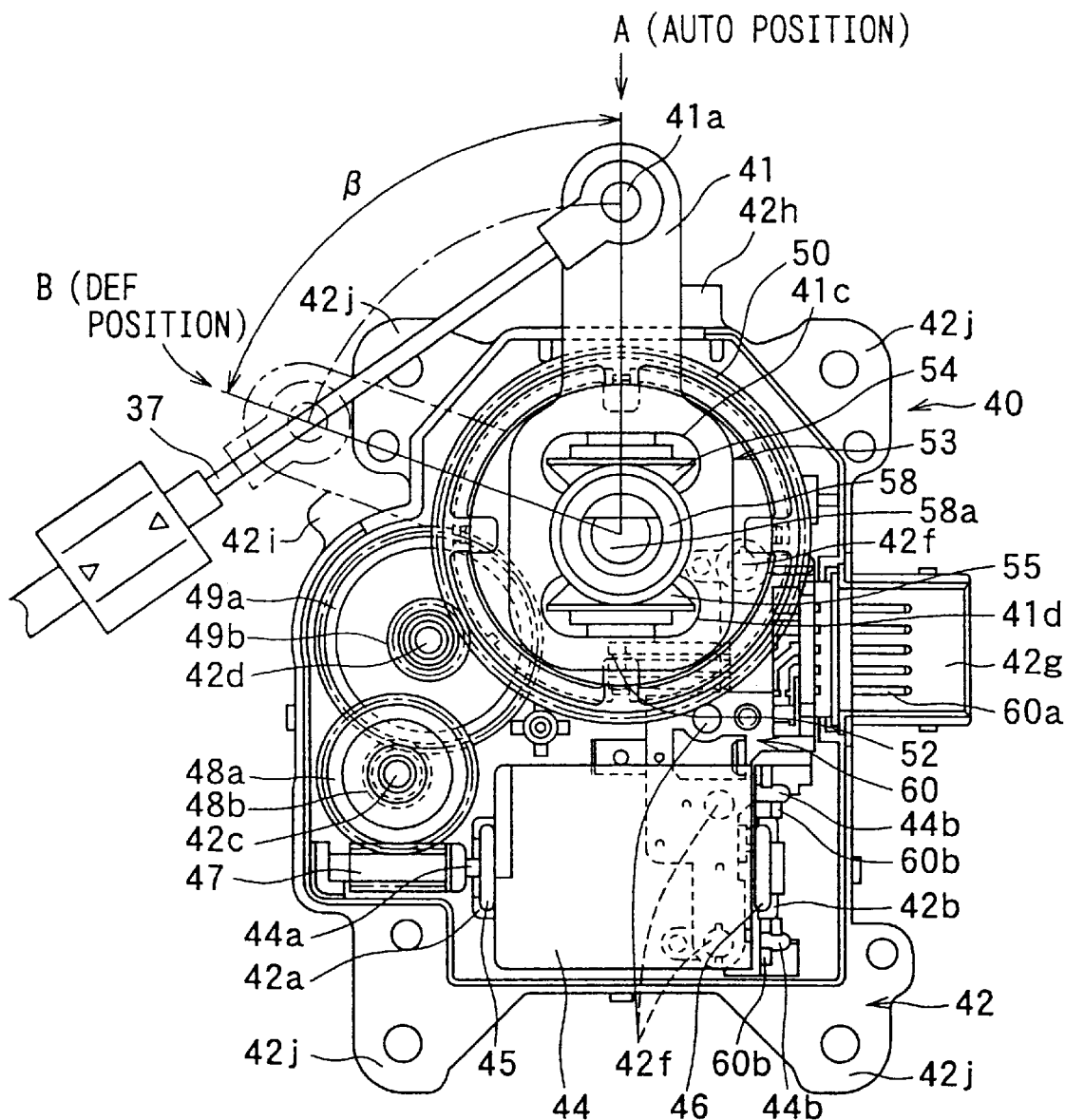
FIG. 3 is an exploded front view of the motor actuator in a first embodiment of the present invention.

One end of cable 37 is connected to the other end of the aforementioned lever 32, and the other end of this cable 37 is connected to a shaft 41a of a movable lever (input component) 41 of motor actuator 40 as shown in FIG. 3.

As shown in FIGS. 3 through 6, motor actuator 40 is provided with a resin case 42 and a resin cover 43 for closing the open end of this case 42. The space formed by this case 42 and cover 43 houses a drive motor 44 consisting of a direct current (DC) motor as well as gear mechanisms, etc. that are connected to this drive motor 44. Concave support components 42a and 42b are integrally formed on case 42 corresponding to the two ends in the axial direction of drive motor 44, and the two ends of drive motor 44 are held under slight pressure by these support components 42a and 42b via O-ring-shaped rubber elastic components.

A resin worm gear 47 is pressure-fitted onto output shaft 44a of drive motor 44. The rotation of this worm gear 47 is transmitted to output gear 50 via reduction gears 48a, 48b, 49a, and 49b. Reduction gears 48a and 48b are rotatably supported by support shaft 42c which is integrally formed with case 42, and reduction gears 49a and 49b are rotatably supported by support shaft 42d which is integrally formed with case 42.

Figure 4:
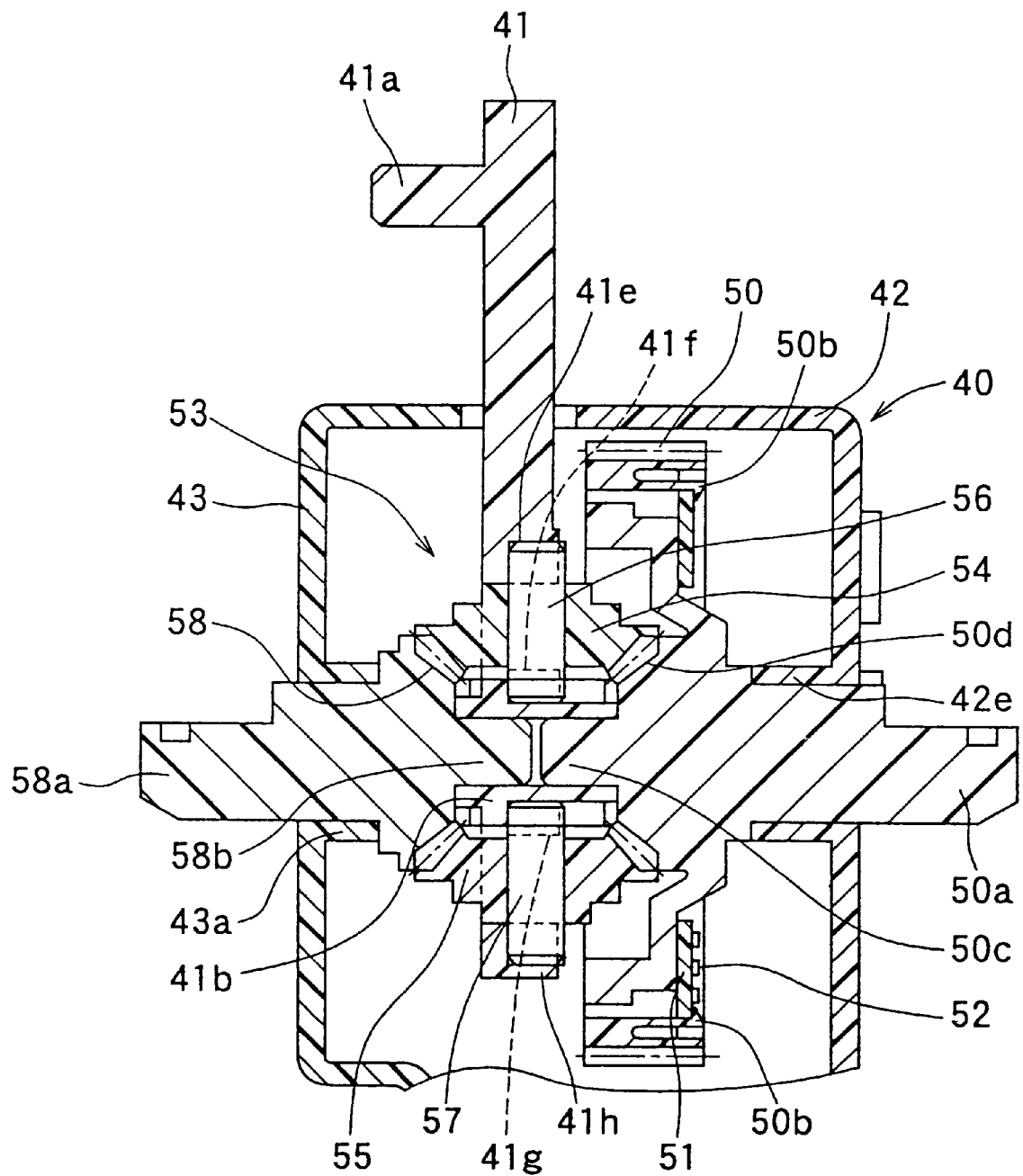
FIG. 4 is a cross-section along IV—IV of FIG. 5.

Output gear 50 is a spur gear made of resin, and a first output shaft 50a is integrally formed in the central area of the spur gear as shown in FIG. 4. This first output shaft 50a is rotatably supported by bearing 42e of case 42 and at the same time protrudes outside case 42. Rotation shaft 16a of air-mix door 16 is connected to this protruding end via a linking mechanism (not shown in the figure). Therefore, the rotation of first output shaft 50a rotates air-mix door 16 (the first slave component).

Furthermore, multiple latches 50b which can elastically deform, are integrally formed on the inside perimeter of the teeth area of output gear 50. These latches 50b securely hold a rotating circuit board 51 onto the side of output gear 50. This rotating circuit board 51 consists of a printed circuit board provided with an electrical resistor, and rotates while sliding over a brush 52 held by case 42. This rotating circuit board 51 and brush 52 form a potentiometer 700 (see FIG. 7) for detecting the rotational position of air-mix door 16.

A shaft 50c is also integrally formed on output gear 50 on the same shaft as output shaft 50a. Shaft 50c is slidably inserted into bearing 41b on the internal perimeter of movable lever 41. Furthermore, a bevel gear 50d of differential gear mechanism 53 is formed in output gear 50 on the outer perimeter of shaft 50c.

Movable lever 41 is provided with two holes 41c and 41d (see FIG. 3) in 180° symmetrical positions corresponding to the outer perimeter of bearing 41b. Bevel gears 54 and 55 of differential gear mechanism 53 are rotatably positioned inside these two holes 41c and 41d, respectively. Bevel gears 54 and 55 are equivalent to the planetary gears in a planetary gear mechanism, are made of resin, and are rotatably supported by support shafts 56 and 57 (see FIG. 4). Support shafts 56 and 57 are made of metal (steel), and are securely held by concave areas 41e, 41f, 41g, and 41h formed in movable lever 41.

Moreover, a resin bevel gear 58 is positioned to mesh with bevel gears 54 and 55, and a second output shaft 58a is integrally formed in the central area of this bevel gear 58. This second output shaft 58a is positioned on the same shaft as first output shaft 50a, and is rotatably supported by bearing 43a of cover 43.

Second output shaft 58a protrudes outside cover 43, and rotation shafts 20a, 23a, and 26a of blowout mode doors 20, 23, and 26 are connected to this protruding end via linking mechanisms (not shown in the figure). Therefore, the rotation of second output shaft 58a rotates blowout mode doors 20, 23, and 26 (the second slave components).

Furthermore, a shaft 58b, which corresponds to shaft 50c of first output shaft 50a, is integrally formed on second output shaft 58a. This shaft 58b is also slidably inserted into bearing 41b on the internal perimeter of movable lever 41. Therefore, movable lever 41 is rotatably supported by shafts 50c and 58b.

In this embodiment, differential gear mechanism 53 comprises bevel gear 50d of output gear 50, bevel gears 54 and 55, bevel gear 58, and movable lever 41 which rotatably supports bevel gears 54 and 55.

Next, feeding plate 60 shown in FIG. 3 integrally forms an electric circuit on a substrate made of resin. Multiple (four in the example in FIG. 3) protrusions 42f are integrally formed on the bottom of case 43, and feeding plate 60 is secured to the bottom of case 42 by interfitting the installation holes of the resin substrate of feeding plate 60 onto these protrusions 42f, and by thermally crimping protrusions 42f.

Connector terminals 60a for electrically connecting external lead wires, feeding area 60b for feeding power to terminal 44b of drive motor 44, and the aforementioned brush 52 are integrally provided on feeding plate 60 by inserting these components into the resin substrate.

Note that, in addition to the aforementioned components (42a through 42f), connector housing 42g for housing connector terminals 60a, stoppers 42h and 42i for restricting the operation range of movable lever 41 to the predetermined angle β, and installation areas 42j for installing case 42 in air-conditioning case 11 are formed in case 42. These installation areas 42j are provided on four corners of case 42 and have screw throughholes. Stoppers 42h and 42i restrict the rotational angle of second output shaft 58a to the predetermined range $\theta^1$ by restricting the operation range of movable lever 41.

Meanwhile, connector housing 43b which, along with connector housing 42g of case 42, houses connector terminal 60a, as well as installation areas 43c [for installing cover 43] in air-conditioning case 11 are formed on cover 43, in addition to the aforementioned bearing 43a. These installation areas 43c are provided on four corners of cover 43 and are provided with screw throughholes. Installation areas 42j of case 42 and installation areas 43c of cover 43 are together secured to air-conditioning case 11 using common screws.

Figure 7:
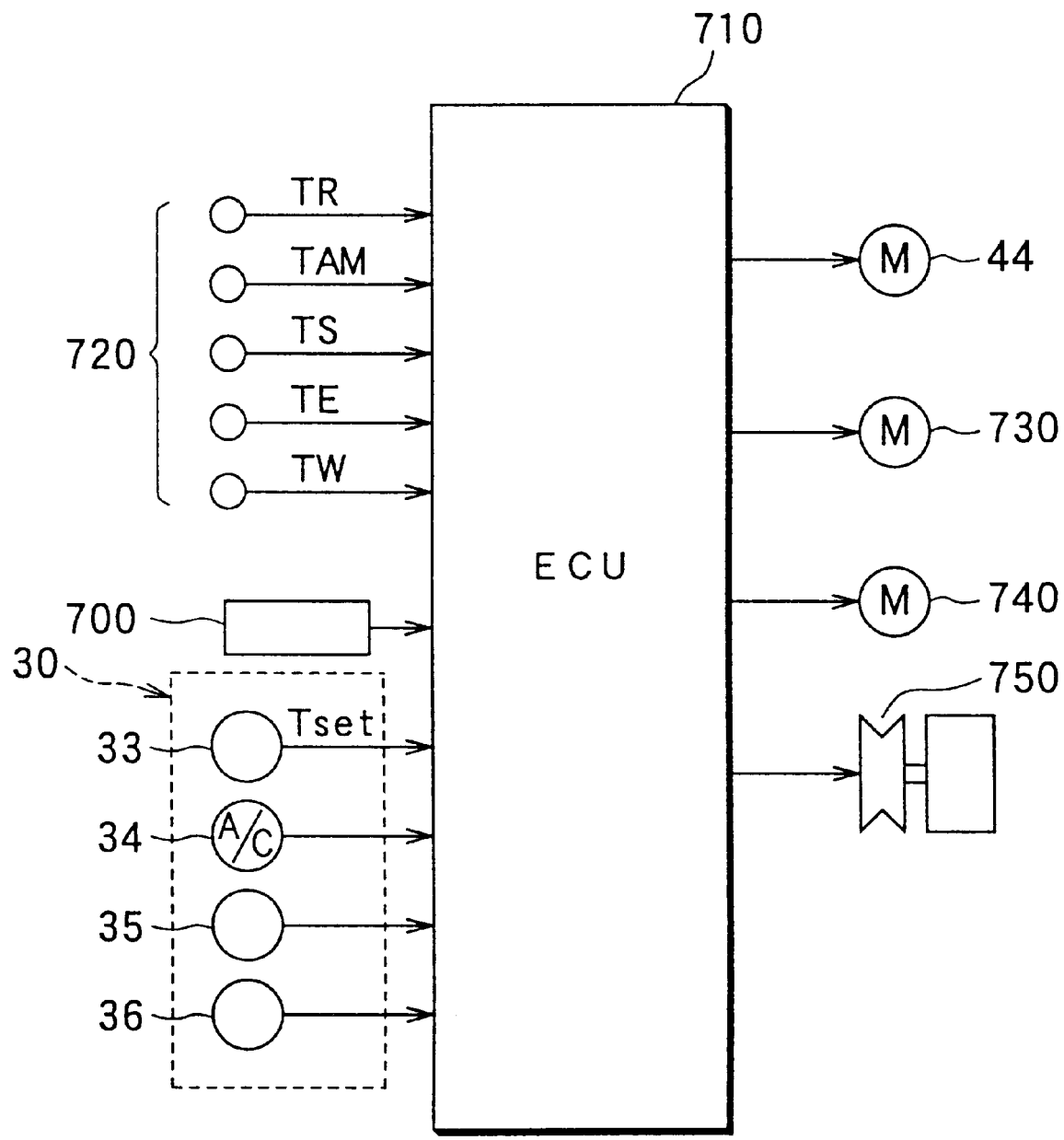
FIG. 7 is an electrical control block diagram of a first embodiment of the present invention.

Next, an overview of the electrical control area in this embodiment will be explained with reference to FIG. 7. Detection signals are input into an air-conditioning electronic control device 710 for air-conditioning control, from a known sensor group 720 that detects internal air temperature TR, external air temperature TAM, sun light volume TS, evaporator blowout temperature (evaporator cooling performance) TE, warm water temperature TW, etc.

Temperature setting signal Tset inside the cabin from temperature setter 33 of air-conditioning operation panel 30, compressor activation signals (ON and OFF signals) in the air-conditioning cooling cycle from air-conditioner switch 34, an internal/external selection signal from internal/external switch 35, and a fan air volume selection signal from fan switch 36 are also input. An air-mix door opening signal is also input from potentiometer 700 of motor actuator 40.

Air-conditioning electronic control device 710 consists of a known microcomputer comprising a CPU, ROM, and RAM, and peripheral circuits; and performs predetermined computation according to a preset program to control power supplied to drive motor 44 of motor actuator 40, drive motor 73 of the internal/external air selection door (not shown in the figure), drive motor 740 of the fan (not shown in the figure), and electromagnetic clutch 750 for activating and shutting off the compressor, etc.

Figure 8:
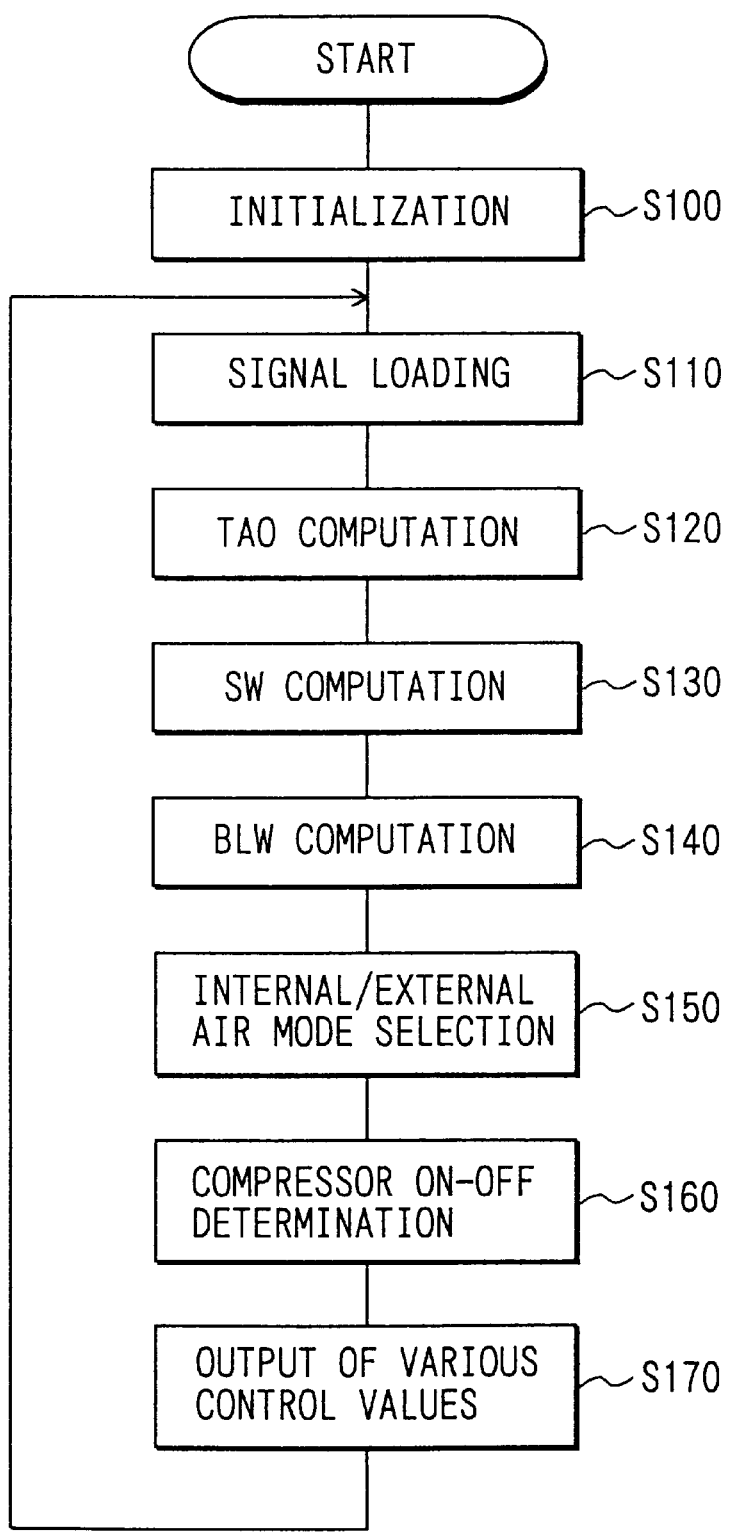
FIG. 8 is a flowchart of the air-conditioning control in a first embodiment of the present invention.

Next, the operation of this embodiment will be explained based on the aforementioned configuration. The flowchart in FIG. 8 shows the control process executed by the microcomputer of air-conditioning electronic control device 710. The control routine in FIG. 8 starts when fan switch 36 of air-conditioning operation panel 30 is turned on while power is supplied to control device 710 after the vehicle engine ignition switch has been turned on. First, in Step S100, flags, timers, etc. are initialized, and in the next Step S110, detection signals from sensor group 720, the operation signal from air-conditioning operation panel 30, etc. are loaded.

Then, in Step S120, the target blowout temperature (TAO) of air blown into the cabin is computed based on Mathematical expression 1 shown below. This target blowout temperature (TAO) is the blowout temperature necessary for maintaining the temperature inside the cabin at the temperature setting Tset of temperature setter 33.

Mathematical expression 1

$$TAO = Kset \times Tset - Kr \times TR - Kam \times TAM - Ks \times TS + C$$

where Kset, Kr, Kam, and Ks: Control gains
C: Correction coefficient

Next, the process proceeds to Step 130, in which the target opening SW of air-mix door 16 is computed based on Mathematical expression 2.

Mathematical Expression 2

$$SW = \{(TAO-TE)/(TW-TE)\} \times 100 (\%)$$

According to Mathematical expression 2, target opening SW is computed as a percentage, and is set to 0% when air-mix door 16 is at the maximum cooling position (the position indicated by solid lines in FIG. 1) which completely closes the air passage of heater core 13, and to 100% when air-mix door 16 is at the maximum heating position (the position indicated by dotted lines in FIG. 1) which completely closes cool air bypass passage 15.

Next, in Step S140, the target air feed volume BLW of air sent by the fan of the fan unit is computed based on the aforementioned TAO. The method of computing this target air feed volume BLW is well known, and the target air volume is increased on the high-temperature side (maximum heating side) and the low-temperature side (maximum cooling side) of the aforementioned TAO. Also, the target air volume is decreased in the mid-temperature range of the aforementioned TAO.

Next, in Step S150, an internal/external air mode is determined according to the aforementioned TAO. As is well known, this internal/external air mode can be set so that it switches from the internal air mode to the external air mode, or from the all internal air mode to the internal/external mixed mode, and then to the all external air mode, as TAO shifts from the low-temperature side to the high-temperature side.

Next, in Step S160, ON-OFF of the compressor is determined. Specifically, the target evaporator blowout temperature TEO is computed based on the aforementioned TAO and external air temperature TAM. The actual evaporator blowout temperature TE is compared with the target evaporator blowout temperature TEO. If TE>TEO, the compressor is turned ON. If TE≦TEO, the compressor is turned OFF.

Next, in Step S170, the various control values computed in the aforementioned various steps S130 through S160 are output to motors 44, 730, and 740, and to electromagnetic clutch 750, to control air-conditioning. That is, motor 44 of motor actuator 40 controls the opening of air-mix door 16 so that the actual opening of the air-mix door detected by potentiometer 700 matches the target opening SW from Step S130.

The rotational frequency of fan drive motor 740 is controlled by controlling its supply voltage so that the target air volume BLW from Step S140 can be achieved. Internal/external air motor 730 controls the operation position of the internal/external air door (not shown in the figure) so that the internal/external air mode from Step S150 can be achieved. Electromagnetic clutch 750 controls the ON-OFF operation of the compressor so that the actual evaporator blowout temperature TE matches the target evaporator blowout temperature TEO.

Next, the operation of motor actuator 40, will be described in detail. In motor actuator 40, air-mix door 16 is connected to first output shaft 50a. Therefore, by providing first output shaft 50a with rotating circuit board 51 of potentiometer 700 and by sliding and rotating this rotating circuit board 51 on brush 52 of case 42, the electrical resistance of rotating circuit board 51 can be varied and the rotation positional signal of air-mix door 16, i.e., a door opening signal, can be extracted from brush 52. This door opening signal is input into control device 710 via connector terminal 60a.

Then, if the actual opening of air-mix door 16 matches the target opening SW, control device 710 stops the supply of power to motor 44, thus stopping motor 44. In contrast, if the actual opening of air-mix door 16 does not match the target opening SW, control device 710 supplies power to motor 44, thus activating motor 44. Here, by switching between the positive and negative lo polarities of the power supplied to motor 44, motor 44 rotates in either the positive or negative direction depending on whether the opening of air-mix door 16 is increased or decreased.

If power is supplied to motor 44 and motor 44 is activated, its rotational output is transmitted to output gear 50 via worm gear 47 and reduction gears 48a, 48b, 49a, and 49b. Then, first output shaft 50a and bevel gear 50d for the differential gear mechanism rotate with output gear 50.

Here, if blowout mode knob 31 is set to the Auto blowout mode in air-conditioning operation panel 30, movable lever 41 is set to point A in FIG. 3 via lever 32 and cable 37, and movable lever 41 is securely held at point A of FIG. 3 by the friction, etc. of cable 37.

Therefore, when bevel gear 50d rotates, its rotational output is transmitted to bevel gear 58 via bevel gears 54 and 55, thus rotating second output shaft 58a. Here, second output shaft 58a rotates in the direction opposite from first output shaft 50a because of bevel gears 54 and 55.

Figure 9A:
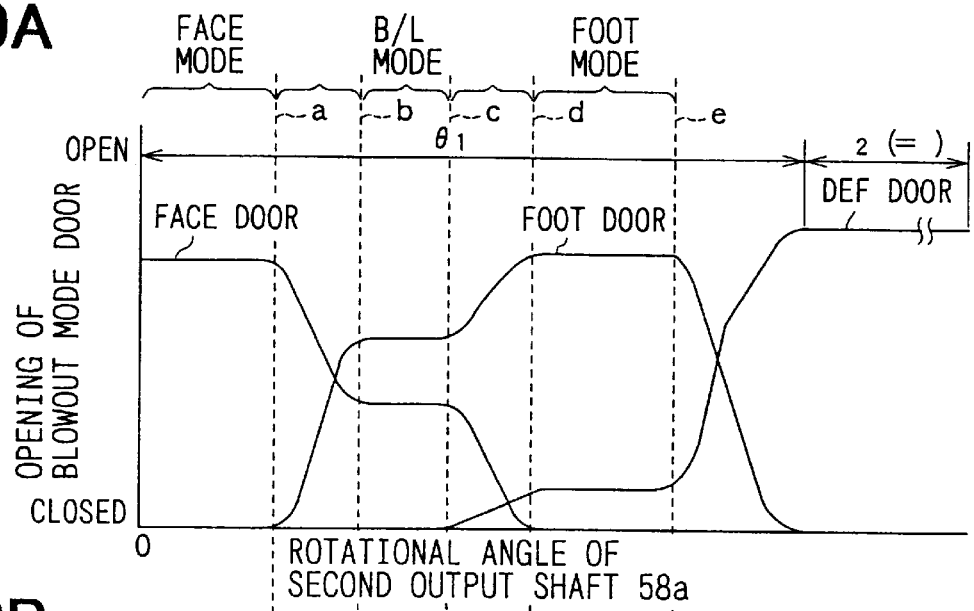
FIG. 9 is an operation diagram of a first embodiment of the present invention.
Figure 9B:
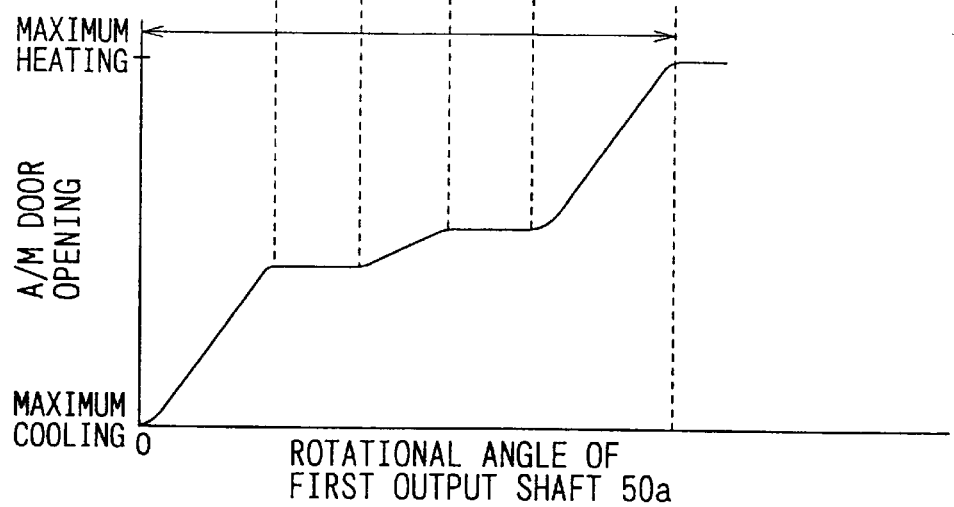

That is, when blowout mode knob 31 is being set to the auto blowout mode, first output shaft 50a and second output shaft 58a rotate in linkage based on the rotational output of motor 44. Therefore, the rotation of first output shaft 50a increases/decreases the opening of air-mix door 16, and at the same time, the rotation of second output shaft 58a automatically switches the blowout mode. FIG. 9 explains the operation of automatically switching blowout modes in linkage with the change in the opening of air-mix door 16. The horizontal axis in FIG. 9A indicates the rotational angle of second output shaft 58a. The horizontal axis in FIG. 9B indicates the rotational angle of first output shaft 50a, and first output shaft 50a rotates within the range of predetermined angle θ based on motor 44.

The rotation of this first output shaft 50a continuously changes the opening of air-mix door 16 between the maximum cooling position (opening=0%) and the maximum heating position (opening =100%) indicated by the horizontal axis in FIG. 9B. Note that the maximum cooling position and the maximum heating position of air-mix door 16 are indicated by the solid line position and the two-dot chain line position in FIG. 1, respectively.

FIG. 9A shows the changes in the opening of blowout mode doors 20, 23, and 26 corresponding to the rotational angle of second output shaft 58a. When the rotational angle of second output shaft 58a is within the range 0 to a, face door 23 fully opens face openings 22, activating the face mode. When the rotational angle of second output shaft 58a is within the range b to c, both face door 23 and foot door 26 fully open both face openings 22 and foot openings 24, activating the bi-level mode.

Then, when the rotational angle of second output shaft 58a is within the range d to e, foot door 26 fully opens foot openings 24, and at the same time, defroster door 20 slightly opens defroster openings 19, activating the foot mode.

In this way, when blowout mode knob 31 of air-conditioning operation panel 30 is set to the Auto position, the operational angle of first output shaft 50a increases according to increases in the drive angle of motor 44, thus increasing the opening of air-mix door 16. As the opening of the air-mix door increases, the blowout mode can be sequentially and automatically switched from the face mode to the bi-level mode, and to the foot mode.

Note that angle ranges a to b and c to d in FIG. 9A are the regions used for switching the position of the blowout mode door, and therefore, the opening of air-mix door 16 is maintained constant in these regions. On the other hand, to set the defroster mode in order to remove the fogging from the vehicle window glass, blowout mode knob 31 of air-conditioning operation panel 30 is set to the defroster position. Then, movable lever 41 rotates from point A to point B via lever 32 and cable 37. Here, the movement of movable lever 41 is restricted to point B by stopper 42i.

When this movable lever 41 rotates, output gear 50 does not move because it is restrained in the engagement area between worm gear 47 and reduction gear 48a. Therefore, first output shaft 50a does not move, and consequently air-mix door 16 does not move, either.

Since output gear 50 does not move, bevel gears 54 and 55, which are rotatably supported on movable lever 41, rotate (revolution and autorotation) on bevel gear 50d which is on the output gear 50 side as movable lever 41 rotates. The rotation of these bevel gears 54 and 55 causes bevel gear 58 to rotate, thus rotating second output shaft 58a.

Figure 5:
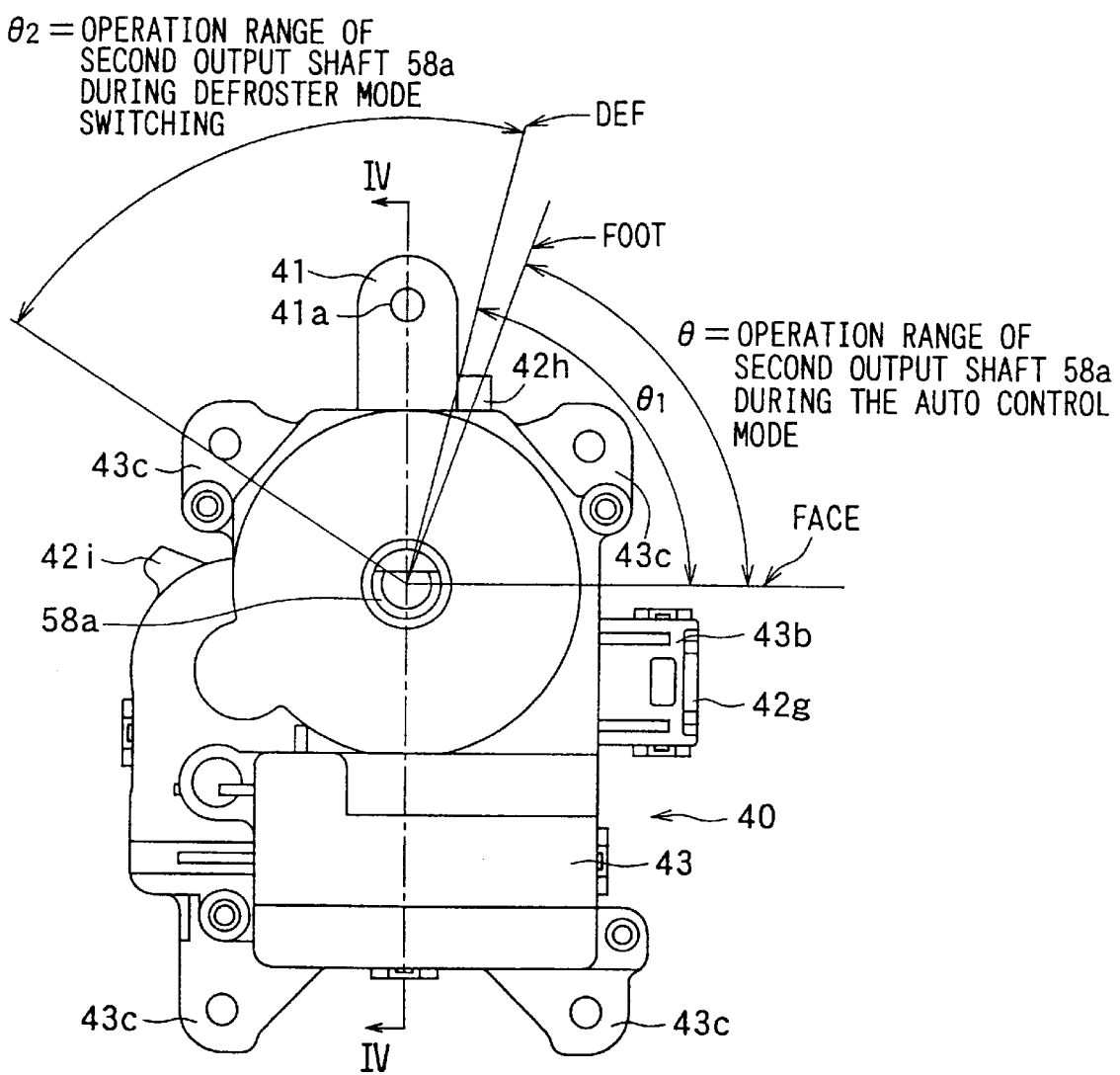
FIG. 5 is a front view of the motor actuator in a first embodiment of the present invention.
Figure 6:
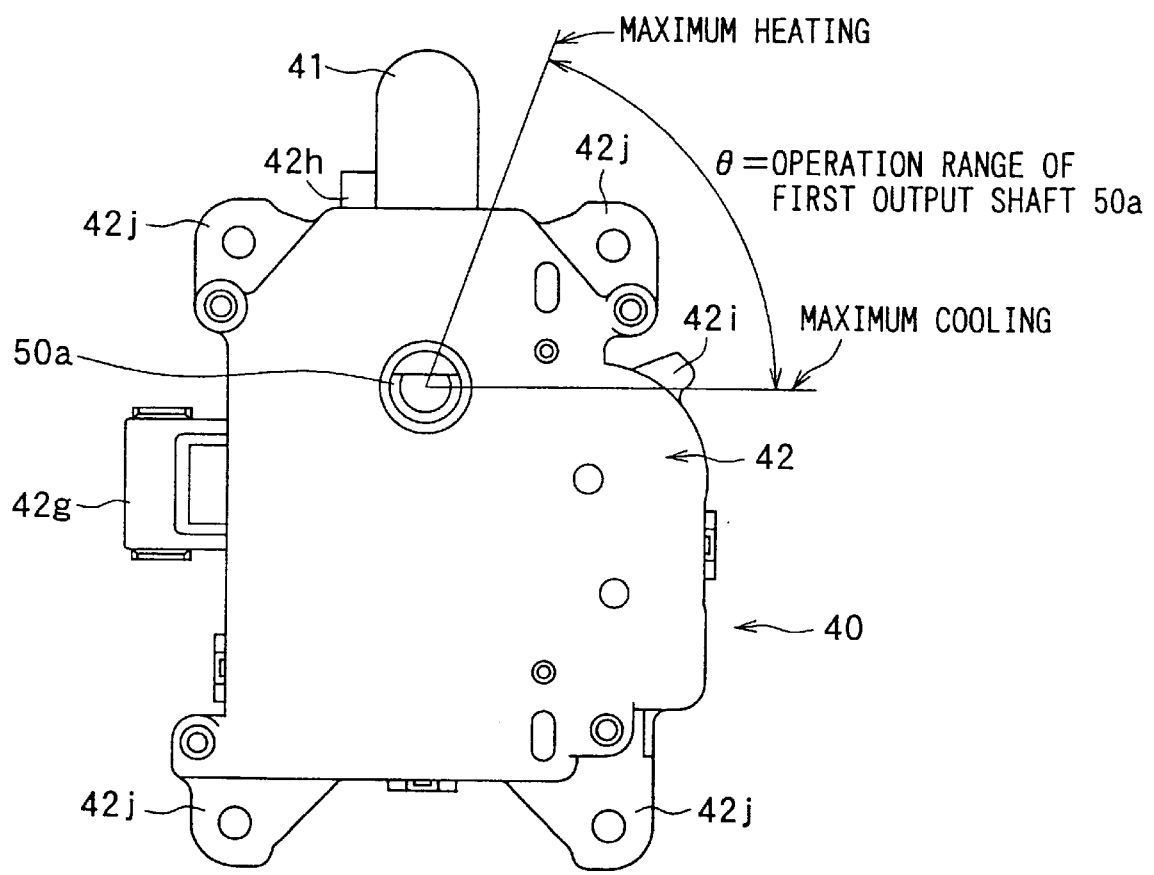
FIG. 6 is a rear view of the motor actuator in a first embodiment of the present invention.

While movable lever 41 rotates from point A to point B of FIG. 3 within the operation range of β°, second output shaft 58a rotates by angle el (FIGS. 5 and 9). Therefore, second output shaft 58a becomes relatively offset by angle θ¹ from first output shaft 50a. Here, rotational angle θ¹ of second output shaft 58a is set to a value that is greater by a predetermined value than the rotational angle θ of second output shaft 58a when the aforementioned auto control mode is set.

Consequently, even if blowout mode knob 31 of air-conditioning operation panel 30 is moved to the defroster position while the blowout mode is set to the face mode (when air-mix door 16 is on the maximum cooling position side), second output shaft 58a rotates to a position that is past the foot mode position, as shown in FIGS. 5 and 9. In this way, the defroster mode can be set as the blowout mode.

Likewise, if blowout mode knob 31 is moved to the defroster position when the blowout mode is set to the bi-level or foot mode, the defroster mode can be set as the blowout mode since second output shaft 58a rotates by angle θ.

Note that second output shaft 58a rotates within the range of angle $\theta^2$ while the defroster mode is set by moving blowout mode knob 31 to the defroster position. That is, the link mechanisms (not shown in the figure) that exist between second output shaft 58a and blowout mode doors 20, 23, and 26 are provided with an idling mechanism that maintains blowout mode doors 20, 23, and 26 in the defroster mode position even when second output shaft 58a rotates within the range of angle $\theta^2$.

Therefore, motor 44 can be used to rotate second output shaft 58a along with first output shaft 50a while blowout mode doors 20, 23, and 26 are maintaining the defroster mode position. As a result, the blowout temperature in the defroster mode can be controlled by changing the opening of air-mix door 16, in the same way as in other modes.

Note that since operation angle $\theta^2$ of second output shaft 58a during defroster mode switching is the operation range for controlling the blowout temperature in the defroster mode, it can be the same as operation angle θ of first output shaft 50a and second output shaft 58a during the auto control mode.

As can be understood from the above explanation, according to the present embodiment, a single dual-shaft-type motor actuator 40, in which first and second output shafts 50a and 58a are positioned on both side in the axial direction, can be used to control the opening of air-mix door 16 for temperature control, to automatically switch the blowout modes (face, bi-level, and foot) by means of blowout mode doors 20, 23, and 26, and to set the defroster mode whenever the vehicle window glass needs to be defogged, regardless of the opening of air-mix door 16. Furthermore, the blowout temperature can be controlled even while the defroster mode is set, as in other modes.

Note that since the rotational position of second output shaft 58a is determined by the rotation of first output shaft 50a and the rotation of movable lever 41, both first output shaft 50a and movable lever 41 can be considered input components in relation to second output shaft 58a.

Figure 10:
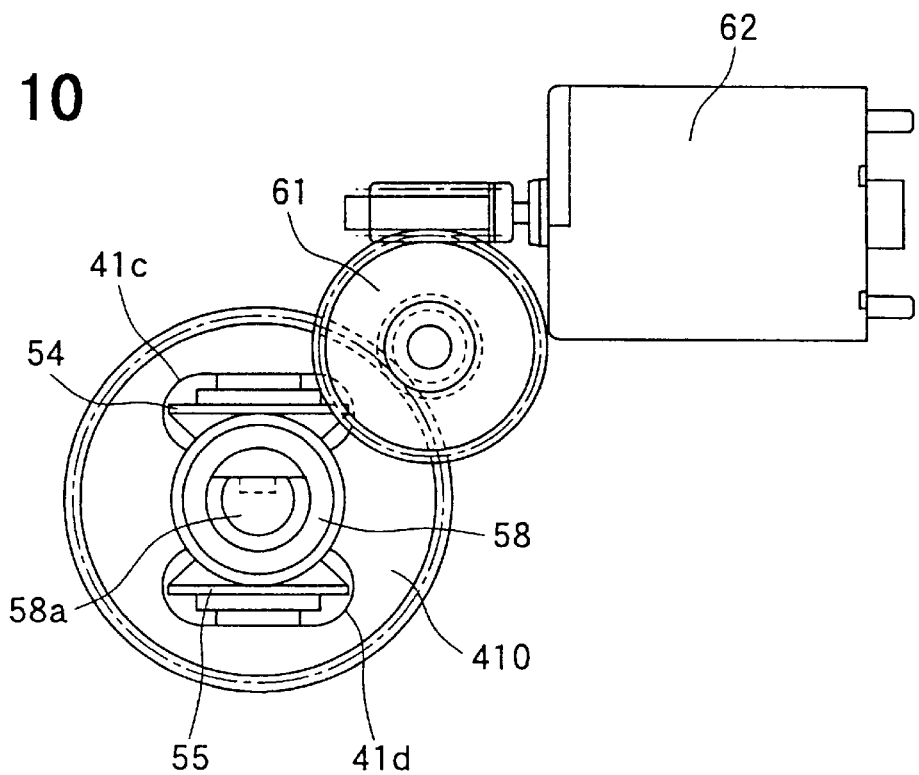
FIG. 10 is a diagram explaining the motor actuator of a vehicle air conditioning apparatus according to the present invention.

In the first embodiment, to set the defroster mode, movable lever 41 is rotated by manually operating blowout mode knob 31 of air-conditioning operation panel 30, thereby rotating bevel gears 54 and 55 of differential gear mechanism 53. In contrast, as shown in FIG. 10, in the second embodiment, a platter 410 having a gear area on the outer perimeter is used instead of movable lever 41, and bevel gears 54 and 55 are rotatably supported in holes 41c and 41d of this platter 410 as in Embodiment 1.

The gear area of platter 410 is connected to the output shaft of drive motor 62 via a reduction gear 61. Meanwhile, the defroster switch is designed to go ON to supply electrical power to drive motor 62 when blowout mode knob 31 of air-conditioning operation panel 30 is moved to the defroster position. In this way, in Embodiment 2, the blowout mode can be set to the defroster mode by simply performing a switching operation using switch blowout mode knob 31, thus improving the operational ease for the vehicle occupant.

Figure 11:
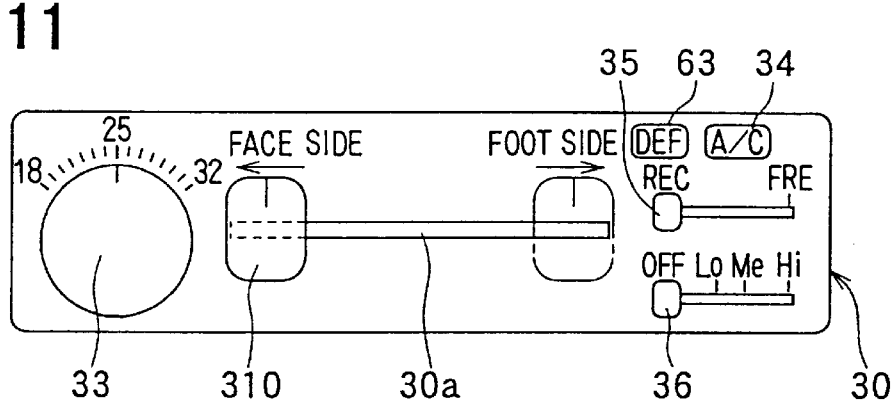
FIG. 11 is a front view of the air-conditioning operation panel in a vehicle air conditioning apparatus according to the present invention.

FIG. 11 shows a third embodiment, in which a blowout mode fine-tuning knob 310 is provided in air-conditioning operation panel 30 instead of blowout mode knob 31. Also, movable lever 41 is rotated by manually operating this knob 310, thereby causing a shift between the relative positions of first and second output shafts 50a and 58a. Therefore, the rotational angle of first output shaft 50a, i.e., the mode switching positions (points a, b, c, and d in FIG. 9) corresponding to the opening of air-mix door 16, can be fine-tuned.

Figure 12:
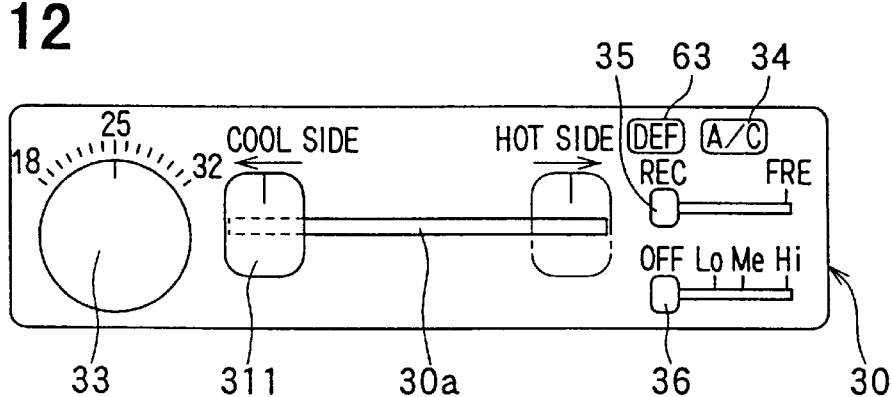
FIG. 12 is a front view of the air-conditioning operation panel in a vehicle air conditioning apparatus according to the present invention.

Furthermore, in this embodiment, by adding a defroster switch 63 to air-conditioning operation panel 30 and turning ON this defroster switch 63, drive motor 44 is activated to rotate first and second output shafts 50a and 58a by an angle equivalent to $\theta^1$ in FIG. 9, to set the defroster mode. Therefore, according to Embodiment 3, the defroster mode is always at the maximum heating state. FIG. 12 shows a fourth embodiment, in which a blowout temperature fine-tuning knob 311 is provided in air-conditioning operation panel 30 instead of blowout mode knob 31. Movable lever 41 is rotated by manually operating this knob 311, thereby causing a shift between the relative positions of first and second output shafts 50a and 58a.

Furthermore, in Embodiment 4, blowout mode doors 20, 23, and 26 are connected to first output shaft 50a via linking mechanisms and air-mix door 16 is connected to second output shaft 58a via a linking mechanism.

Therefore, blowout modes (face, bi-level, and foot) are automatically switched corresponding to the rotational angle of drive motor 44, and the opening of air-mix door 16 is adjusted according to this automatic switching of blowout modes. Furthermore, by rotating movable lever 41 by manually operating blowout temperature fine-tuning knob 311, a shift between the relative positions of first output shaft 50a and second output shaft 58a can be generated. As a result, the temperature of the air blown into the cabin can be fine-tuned by fine-tuning the opening of air-mix door 16.

Note that in Embodiment 4, the method of setting the defroster mode is the same as in Embodiment 3. That is, it is necessary to rotate first and second output shafts 50a and 58a by an angle equivalent to $\theta^1$ in FIG. 9 by activating drive motor 44 by turning ON defroster switch 63 of air-conditioning operation panel 30.

Figure 13:
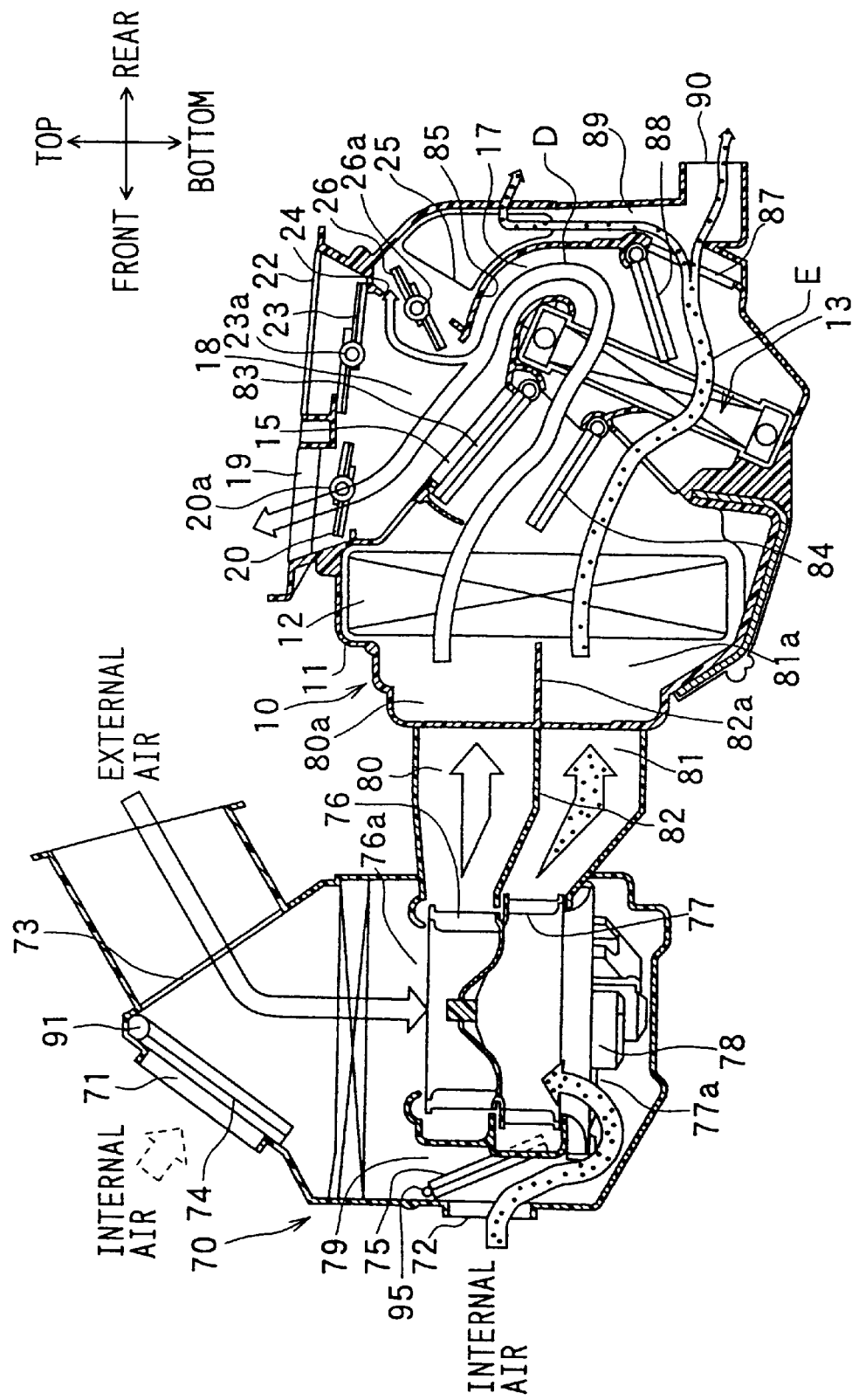
FIG. 13 is a schematic cross-sectional diagram of the vehicular air-conditioning apparatus in a vehicle air conditioning apparatus according to the present invention.

In a fifth embodiment, the vehicle occupant can set the internal/external air 2-layer flow mode through a manual operation in a vehicular air-conditioning apparatus in which the internal/external air 2-layer flow mode can be set. First, an overview of the vehicular air-conditioning apparatus to which Embodiment is applied will be provided with reference to FIG. 13. In FIG. 13, those areas that are identical or equivalent to those in FIG. 1 are assigned the same symbols and their explanations are omitted.

Note that although FIG. 13 shows fan unit 70 on the front side of air-conditioning unit 10 (toward the front of the vehicle), for convenience, fan unit is actually positioned on the passenger side of air-conditioning unit 10. Fan unit 70 is provided with first and second internal air introduction ports 71 and 72 for introducing the internal air (air inside the cabin) and an external air introduction port 73 for introducing the external air (air outside the cabin). These introduction ports 71 through 73 can be opened and closed by first and second internal/external air selection doors 74 and 75.

First fan 76 (on the external air side) and second fan 77 (on the internal air side), for sending the air introduced from the aforementioned introduction ports 71 through 73, are positioned on top of each other inside fan unit 70. These fans 76 and 77 are known centrifugal, multiple-blade fans, and are simultaneously driven and rotated by a single common electric motor 78.

FIG. 13 shows the state of the 2-layer flow mode described below, and first internal/external air selection door 74 has closed first internal air introduction port 71 and opened external air introduction port 73. Second internal/external air selection door 75 has opened second internal air introduction port 72 and closed linking passage 79. Consequently, the external air is introduced from external air introduction port 73 into suction port 76a of first fan 76 (on the external air side) and is sent to first passage 80 (on the external air side). Meanwhile, the internal air is introduced from internal air introduction port 72 into suction port 77a of second fan 77 (on the internal air side) and is sent to second passage 81 (on the internal air side). First passage 80 and second passage 81 are separated by partitioning plate 82.

Next, the differences in air-conditioning unit 10 from that in FIG. 1 will be described. Inside air-conditioning case 11, the upstream part of evaporator 12 is divided into first and second air passages 80a and 81a by partitioning plate 82a. The air supplied from first and second air passages 80 and 81 of fan unit 70 flows into these first and second air passages 80a and 81a.

Also inside air-conditioning case 11, cool air bypass passage 35, through which air (cool air) flows by bypassing heater core 13, is formed in the upper part of heater core 13. Inside air-conditioning case 11, flat plate-shaped main air-mix door 83 and auxiliary air-mix door 84, which adjust the ratio between the warm air heated by heater core 13 and the cool air (i.e., the cool air that flows through cool air bypass passage 35) that bypasses heater core 13, are rotatably installed between heater core 13 and evaporator 12 as air-mix doors.

At the maximum cooling setting, both air-mix doors 83 and 84 are rotated to overlapping positions, thus completely closing the air inflow passages to heater core 13. On the other hand, at maximum heating setting, both air-mix doors 83 and 84 are rotated to the positions indicated by the solid lines in FIG. 13. As a result, main air-mix door 83 completely closes cool air bypass passage 15, and at the same time, the tip of auxiliary air-mix door 84 becomes positioned near the approximate center in the vertical direction immediately behind evaporator 12, and thus auxiliary air-mix door 84 acts as a movable partitioning component for partitioning the air passage between evaporator 12 and heater core 13 into first air passage 80a and second air passage 81a.

Also inside air-conditioning case 11, partitioning wall 85 positioned on the downstream side of heater core 13 (toward the rear of the vehicle) forms warm air passage 17, which faces upward immediately behind heater core 13. The warm air from this warm air passage 17 and the cool air from cool air bypass passage 15 are mixed in air mixing area 18 above heater core 13.

Additionally, warm air bypass opening 87 is provided on the bottom edge of partitioning wall 85. This warm air bypass opening 87 is opened and closed by plate-shaped 2-layer partitioning door 88. When the maximum heating state is set in the foot blowout mode and foot defroster blowout mode (i.e., 2-layer flow mode) described below, this 2-layer partitioning door 88 is moved to the position indicated by solid lines in FIG. 1 (approximate center in the vertical direction of heater core 13) to open warm air bypass opening 87. At the same time, this door acts as a movable partitioning component for partitioning warm air passage 17 immediately behind heater core 13 into first air passage 80a and second air passage 81a.

Inside air-conditioning case 11, foot blowout openings 25 for the front seats are provided on both sides toward the rear of the vehicle. Conditioned air that has been temperature-controlled, through mixing of cool and warm air, flows from the top of heater core 13 via foot opening 24 into these front-seat foot blowout openings 25. At the same time, during maximum heating, warm air also flows in from warm air bypass opening 87 via warm air passage 89.

Also, inside air-conditioning case 11, rear-seat foot opening 90 is provided immediately behind warm air bypass opening 87 on the bottom edge toward the rear of the vehicle (closer to the vehicle occupant). Warm air from warm air bypass opening 87 and warm air passage 89 flows into this rear-seat foot opening 90. This warm air is blown out to the foot area of the rear-seat passengers via a foot duct not shown in the figure.

Figure 14:
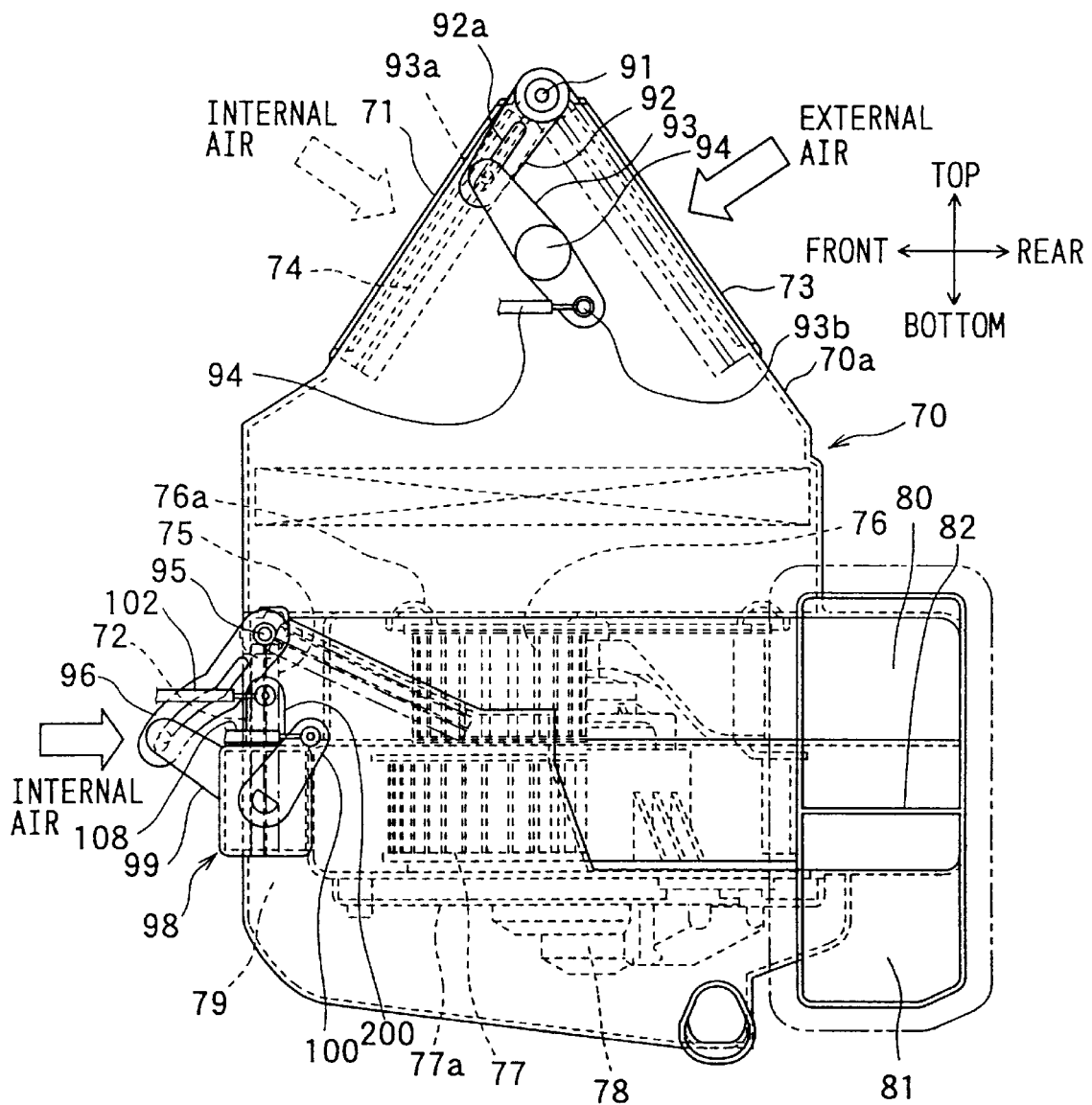
FIG. 14 is a front view of the fan unit in a vehicle air conditioning apparatus according to the present invention.

Next, FIG. 14 is a magnified and detailed diagram of fan unit 70 in FIG. 13, and plate-shaped first internal/external air selection door 74, which opens and closes first internal air introduction port 71 and external air introduction port 73, rotates around rotation shaft 91. First internal/external air door lever 92 is connected to this rotation shaft 91, such that it rotates on the exterior surface of case 70a of fan unit 70. Pin 93a on one end of intermediate lever 93 is slidably fitted into groove 92a of this lever 92.

Intermediate lever 93 rotates around rotation shaft 94 on the exterior surface of case 70a, and internal/external air selection cable 94 is connected to pin 93b on the other end of this intermediate lever 93. The movement of cable 94 in the left-right direction in FIG. 14 causes, via intermediate lever 93, first internal/external air door lever 92 and first internal/external air selection door 74 to rotate around rotation shaft 91 in the left-right direction in FIG. 2. Note that the positions of levers 92 and 93 and the dotted line position (in FIG. 14) of first internal/external air selection door 74 indicate the external air introduction position, and the two-dot chain position (in FIG. 14) of first internal/external air selection door 74 indicates the internal air introduction position.

Figure 15:
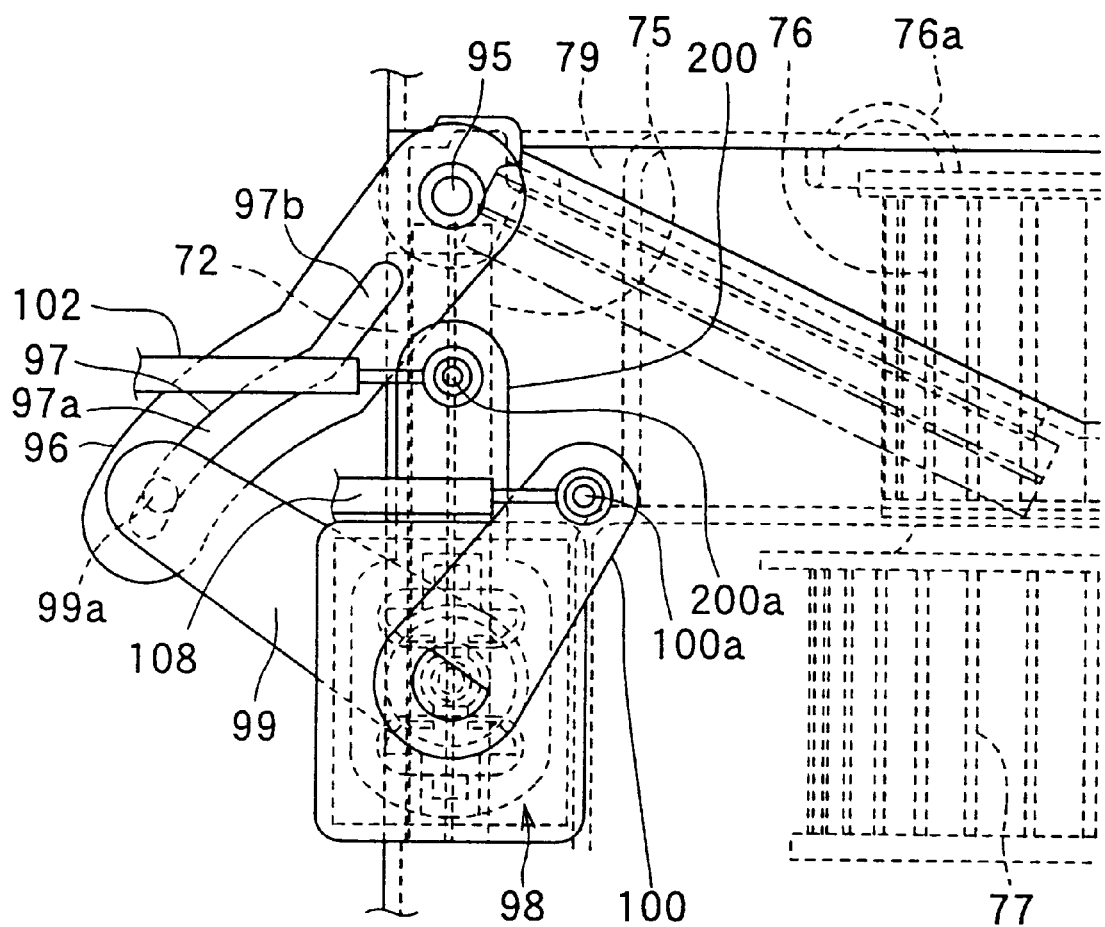
FIG. 15 is an exploded view of the major area of FIG. 14 of a vehicle air conditioning apparatus according to the present invention.

Next, the operation mechanism of second internal/external air selection door 75, which opens and closes second internal air introduction port 72 and linking passage 79, will be explained with reference to FIG. 15. Second internal/external air selection door 75 is plate-shaped and rotates around rotation shaft 95. Second internal/external air door lever 96 is connected to rotation shaft 95, such that it rotates on the exterior surface of case 70a.

A long engagement groove (cam groove) 97, which extends in the longitudinal direction of the lever, is formed on this second internal/external air door lever 96. Pin 99a of output lever 99 of differential gear mechanism 98 engagement is slidably fitted into this groove 97. Engagement groove 97 is also provided with an idling groove 97a, which prevents second internal/external air door lever 96 from rotating even when output lever 99 (pin 99a) rotates, and with a drive groove 97b, which rotates second internal/external air door lever 96 based on the rotational shift of output lever 99 (pin 99a). The aforementioned pin 99a and engagement groove 97 comprise a mechanism for adjusting the shift between output lever 99 and second internal/external air door lever 96.

Figure 16:
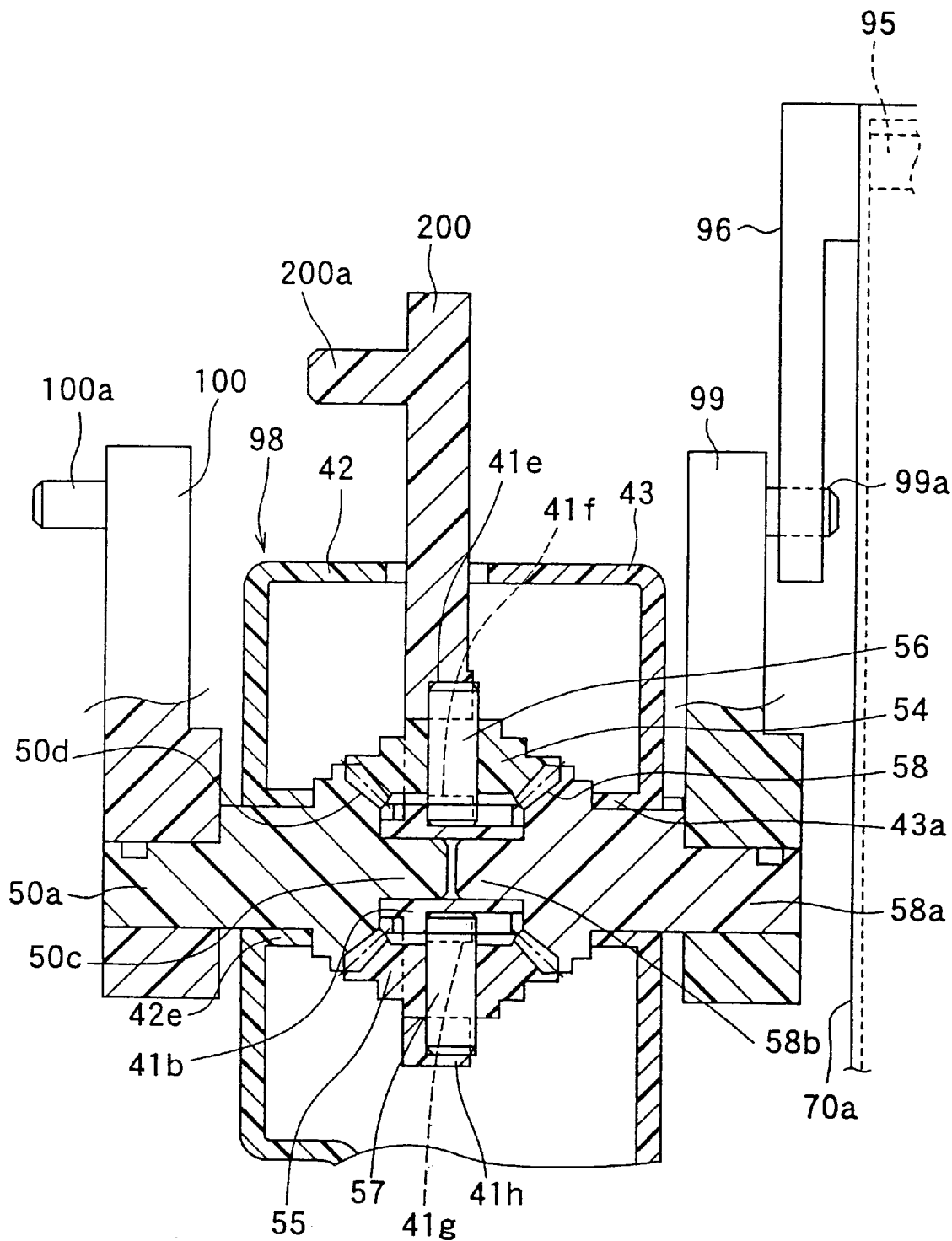
FIG. 16 is a cross-sectional diagram of the differential gear mechanism in FIG. 15 of a vehicle air conditioning apparatus according to the present invention.

Next, differential gear mechanism 98 will be specifically explained with reference to FIG. 16. Since the basic configuration of differential gear mechanism 98 is the same as that of differential gear mechanism 53 shown in FIGS. 3 through 6 for Embodiment 1, those areas in FIG. 16 that are identical or equivalent to differential gear mechanism 53 are assigned the same symbols and their explanations are omitted.

Differential gear mechanism 98 constitutes a "2-input, 1-output" type differential mechanism that has blowout mode input lever 100 as the first input component, temperature control input lever 200 as the second input component, and the aforementioned output lever (output component) 99.

One end of blowout mode input lever 100 is integrally connected to input shaft 50$a$ while the other end is provided with pin 100$a$. Pin 100$a$ is connected to blowout mode setting lever 31' of air-conditioning operation panel 30 (FIGS. 17 and 18) via cable 108 and intermediate lever 109. Intermediate lever 109 rotates around rotation shaft 110, and pin 109$a$ of intermediate lever 109 is slidably fitted into engagement groove 111 of blowout mode setting lever 31'.

Blowout mode setting lever 31' rotates around rotation shaft 112, and the drive linking mechanism (not shown in the figure) of blowout mode doors 20 23, and 26 is connected to blowout mode setting lever 31' via separate cable 113. Therefore, by manually operating blowout mode setting lever 31' in the left-right direction of FIGS. 17 and 18, blowout mode doors 20, 23, and 26 can be opened and closed to set the various blowout modes described below. At the same time, blowout mode input lever 100 of differential gear mechanism 98 can be rotated together with input shaft 50$a$.

Figure 18:
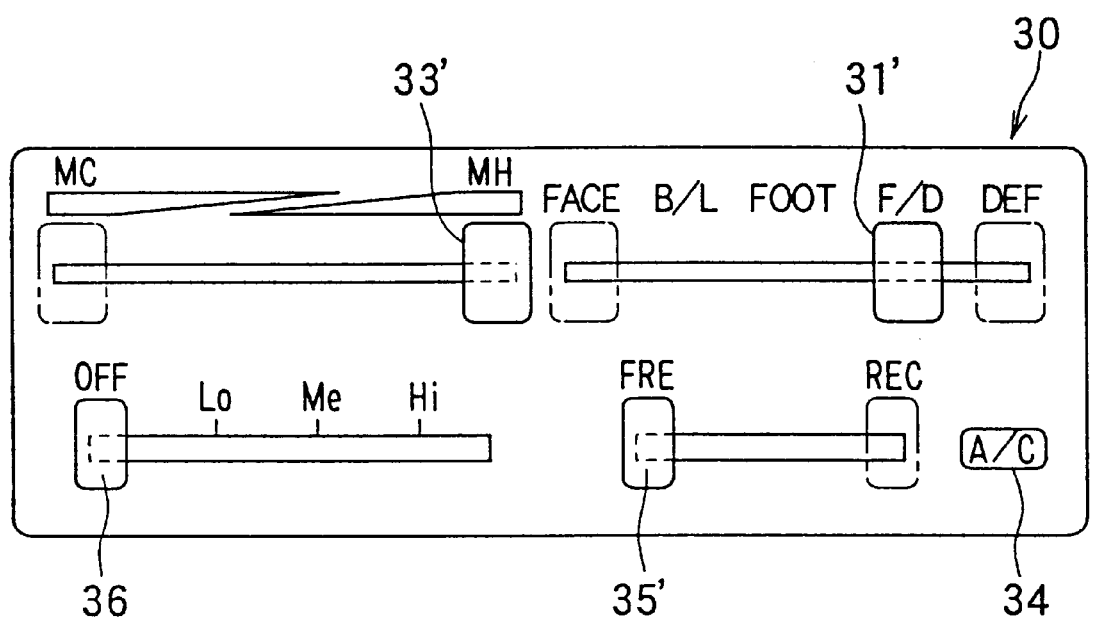
FIG. 18 is a front view of the air-conditioning operation panel of a vehicle air conditioning apparatus according to the present invention.

Note that, in the example in FIG. 18, various blowout modes, i.e., face (FACE), bi-level (B/L), foot (FOOT), foot defroster (F/D), and defroster (DEF) modes, are switched by lever 31'.

Meanwhile, temperature control input lever 200 is equivalent to movable lever 41 in Embodiment 1, and slidably supports bevel gears 54 and 55. Pin 200$a$ on the tip of temperature control input lever 200 is connected to temperature control lever 33' of air-conditioning operation panel 30 via cable 102 and intermediate lever 103.

Intermediate lever 103 rotates around rotation shaft 104, and pin 103$a$ of intermediate lever 103 is slidably fitted into engagement groove 105 of temperature control lever 33'. Temperature control lever 33' rotates around rotation shaft 106, and the drive linking mechanism (not shown in the figure) of both air-mix doors 83 and 84 is connected to temperature control lever 33' via separate cable 107. Therefore, by manually operating temperature control lever 33' in the left-right direction of FIGS. 17 and 18, the opening of air-mix doors 83 and 84 can be controlled. At the same time, temperature control input lever 200 of differential gear mechanism 98 can be rotated to cause bevel gears 54 and 55 to rotate (revolve) around bevel gear 50$d$ of input shaft 50$a$.

In Embodiment 5, bevel gear 50$d$ of input shaft 50$a$ and bevel gear 58 of output shaft 58$a$ are symmetrically positioned in differential gear mechanism 98, and the gear ratio between these bevel gears 50$d$ and 58 is set to 1:1. Therefore, if input shaft 50$a$ rotates by a predetermined amount when temperature control input lever 200 is stopped, the rotation of bevel gear 50$d$ causes bevel gears 54 and 55 to autorotate, thereby causing bevel gear 58 of output shaft 58$a$ to rotate by the same amount in the opposite direction.

The aforementioned internal/external air selection cable 94 is connected to internal/external air selection lever 35' (in FIG. 18) which constitutes an internal/external operation component. Therefore, by manually operating this internal/external air selection lever 35' in the left-right direction of FIG. 18, first internal/external air selection door 74 can be set to the external air introduction position or the internal air introduction position via cable 94 and lever 93.

Since differential gear mechanism 98 in Embodiment 5 uses the rotational shifts of the aforementioned blowout mode input lever 100 and temperature control input lever 200 as inputs, it is not equipped with output gear 50 for transmitting the output of motor 44 as in Embodiment 1.

Also, a shift adjustment mechanism is formed by pin 109$a$ of intermediate lever 109 and engagement groove 111 of blowout mode setting lever 31' between blowout mode input lever 100 (the first input component) and blowout mode setting lever 31' of air-conditioning operation panel 30. This shift adjustment mechanism adjusts the shift (operation angle) of blowout mode input lever 100 relative to the shift of blowout mode setting lever 31'. In this example, the operation angle of blowout mode input lever 100 is divided into two states depending on the operation position of blowout mode setting lever 31'.

Figure 19:
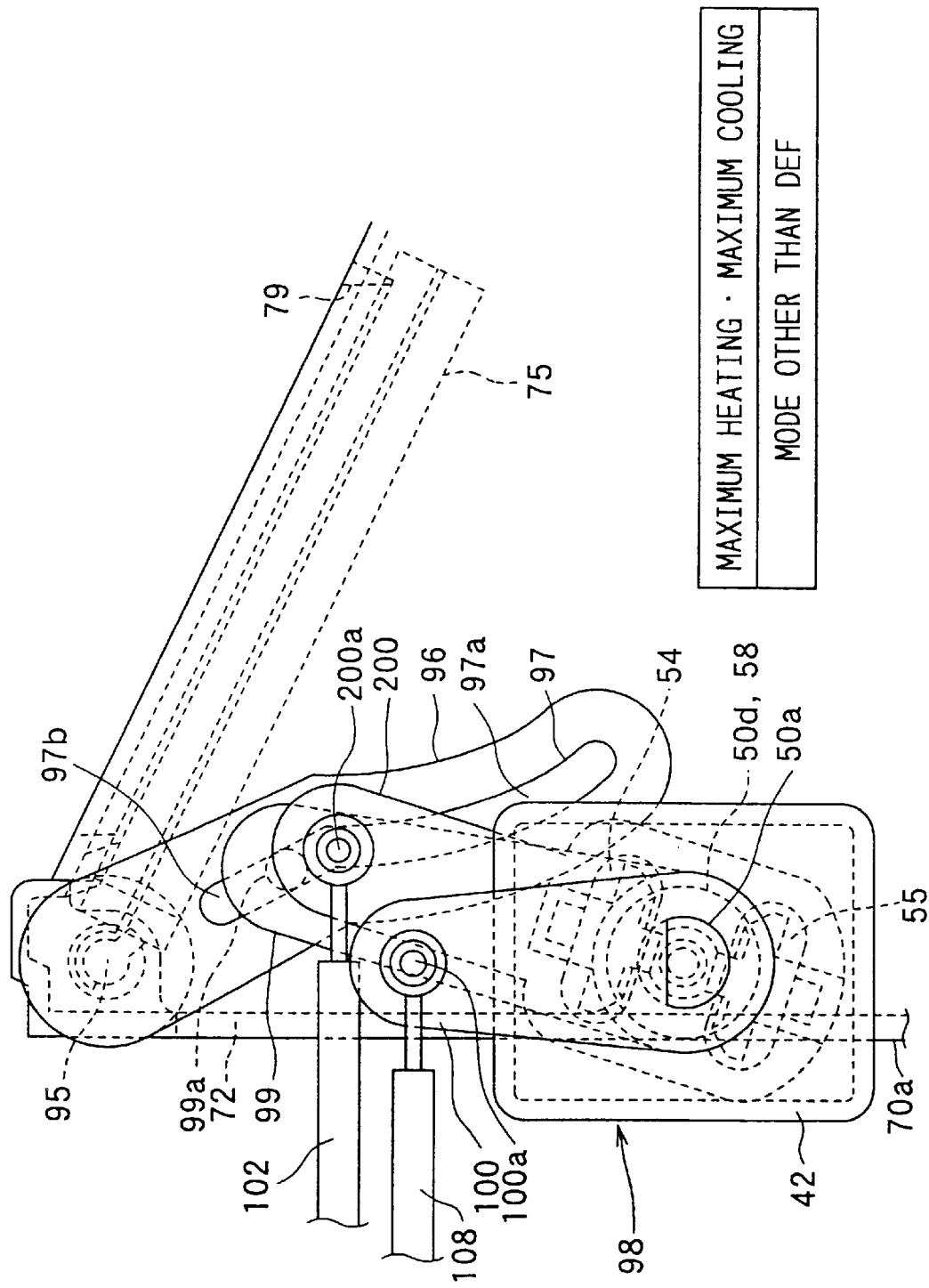
FIG. 19 is a diagram explaining the operation of the differential gear mechanism of a vehicle air conditioning apparatus according to the present invention.
Figure 20:
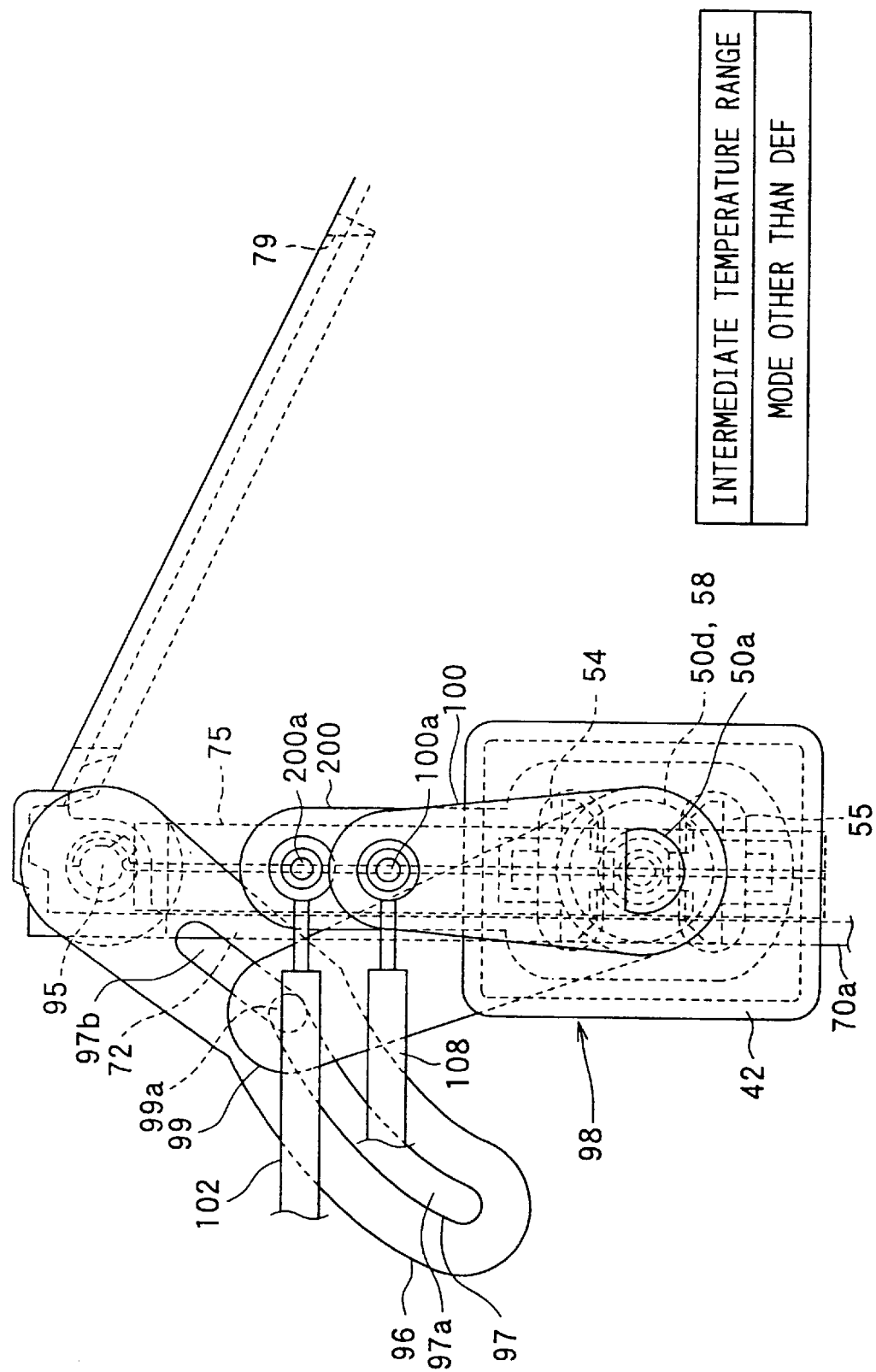
FIG. 20 is a diagram explaining the operation of the differential gear mechanism of a vehicle air conditioning apparatus according to the present invention.

That is, (1) when blowout mode setting lever 31' is being set to a mode position (face (FACE), bi-level (B/L), foot (FOOT), or foot defroster (F/D) mode) other than the defroster (DEF) mode, blowout mode input lever 100 becomes approximately parallel to the opening face of second internal air introduction port 72 as shown in FIGS. 19 and 20 described below. This state is designated to be the first operation angle.

Figure 21:
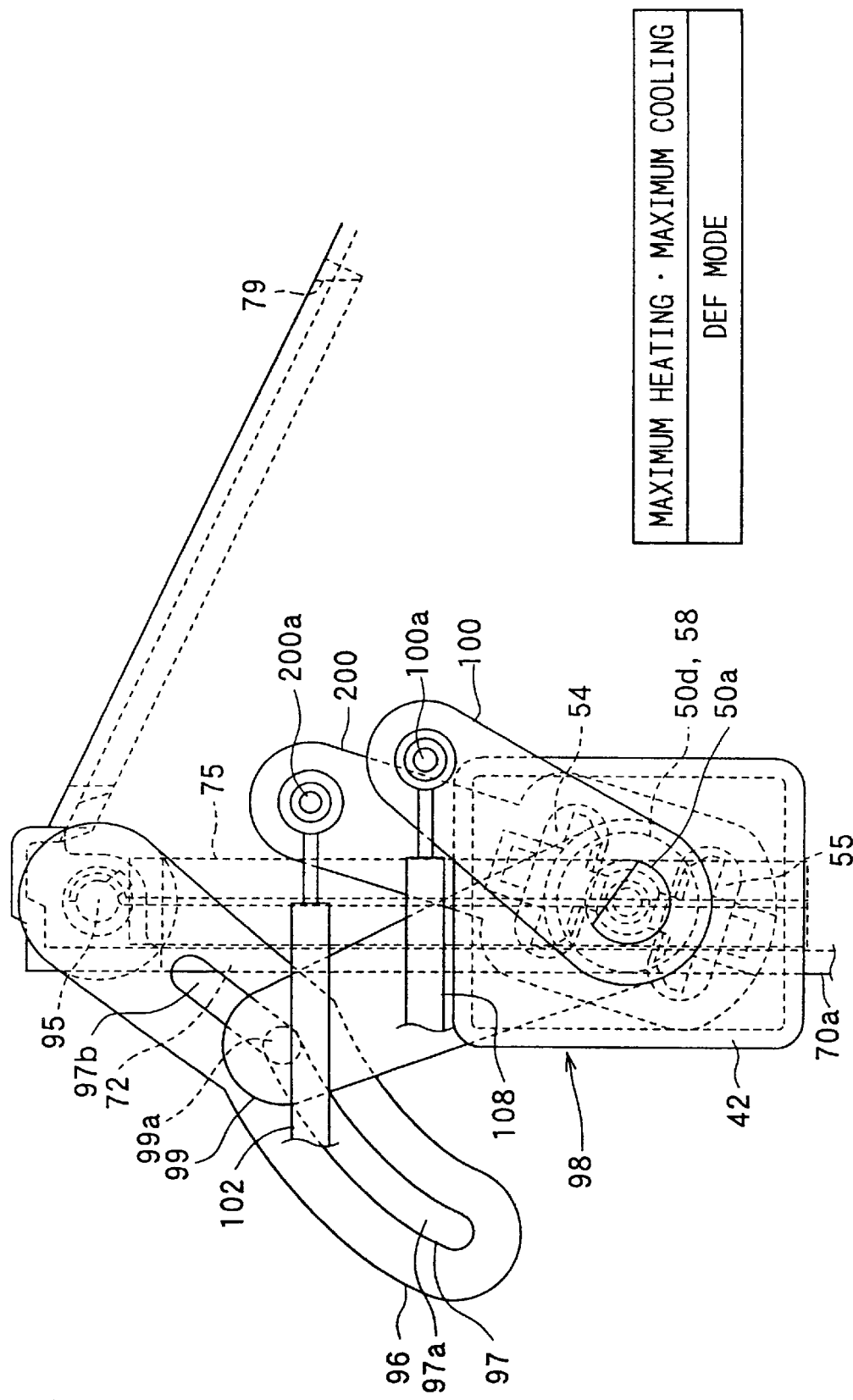
FIG. 21 is a diagram explaining the operation of the differential gear mechanism of a vehicle air conditioning apparatus according to the present invention.
Figure 22:
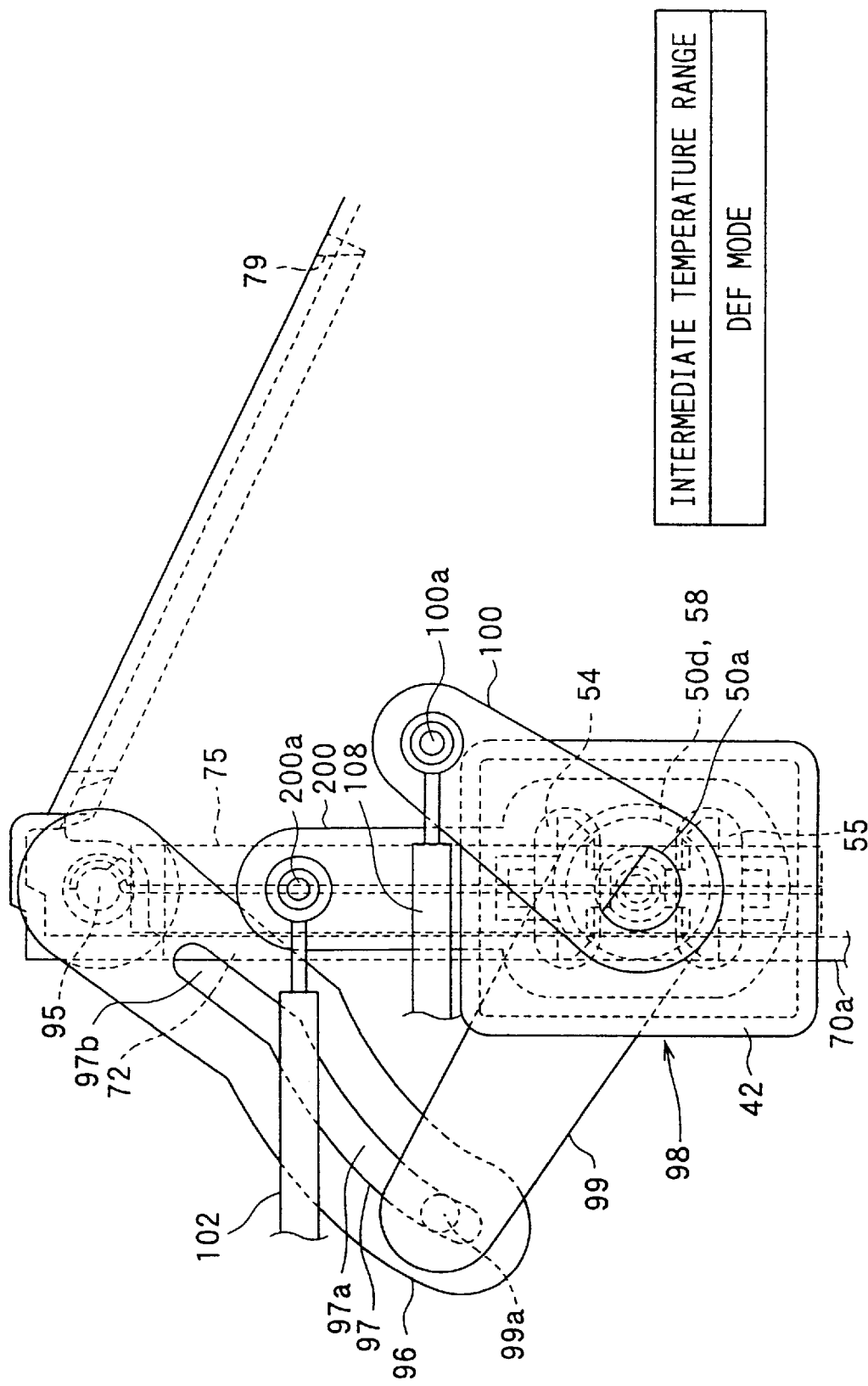
FIG. 22 is a diagram explaining the operation of the differential gear mechanism in of a vehicle air conditioning apparatus according to the present invention.

(2) when blowout mode setting lever 31' is being set to the defroster (DEF) mode, blowout mode input lever 100 rotates from the position shown in FIGS. 19 and 20 by a predetermined angle in the clockwise direction, reaching the position shown in FIGS. 21 and 22. This state is designated to be the second operation angle.

These operation angle characteristics of blowout mode input lever 100 can be obtained by making the shape of engagement groove 111 of blowout mode setting lever 31' a double-arc shape connected in a mountain shape. Of engagement groove 111, the right-side arc-shaped groove 111$a$ is an idling groove that is used to move blowout mode input lever 100 to the first operation angle position in FIGS. 19 and 20 and to maintain this first operation angle position when a mode other than the defroster mode is set. Therefore, even when the blowout mode changes between the face mode and the foot defroster mode, blowout mode input lever 100 is maintained in the first operation angle position in FIGS. 19 and 20. Of engagement groove 111, the left-side arc-shaped groove 111$b$ is a drive groove that is used to rotate blowout mode input lever 100 to the second operation angle position in FIGS. 21 and 22 when setting the defroster mode.

A shift adjustment mechanism is also formed by pin 103$a$ of intermediate lever 103 and engagement groove 105 of temperature control lever 33' between temperature control input lever 200 (the second input component) and temperature control lever 33' of air-conditioning operation panel 30. This shift adjustment mechanism adjusts the shift (operation angle) of temperature control input lever 200 relative to the shift of temperature control lever 33', and in this example, the operation angle of temperature control input lever 200 is varied as explained below.

Figure 17:
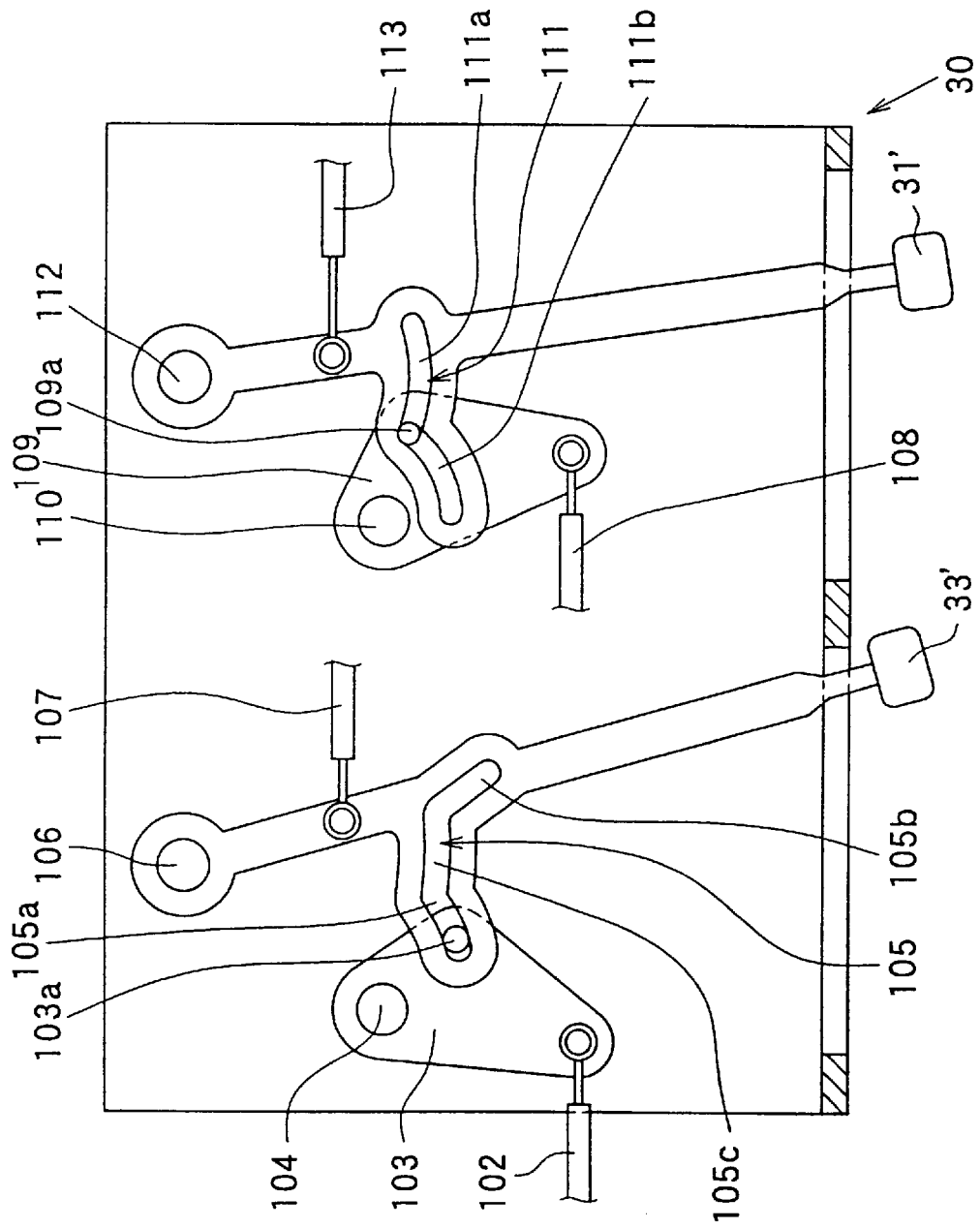
FIG. 17 is a partial cross-sectional diagram of the air-conditioning operation panel in Embodiment 5 of a vehicle air conditioning apparatus according to the present invention.

That is, when temperature control lever 33' is at the maximum heating (MH) position on the right edge in FIGS. 17 and 18, temperature control input lever 200 reaches the position that is rotated by a predetermined angle in the clockwise direction from the opening face of second internal air introduction port 72 as shown in FIGS. 19 and 20. This state is designated as the first operation angle.

Then, when temperature control lever 33' moves to an intermediate position (intermediate temperature region) between the left and right edges in FIGS. 17 and 18, temperature control input lever 200 rotates from the position shown in FIGS. 19 and 21 by a predetermined angle in the counterclockwise direction, reaching the position that is approximately parallel to the opening face of second internal air introduction port 72, as shown in FIGS. 20 and 22. This state is designated as the second operation angle.

Furthermore, when temperature control lever 33' moves to the maximum cooling (MC) position on the left edge in FIGS. 17 and 18, temperature control input lever 200 is designed to return to the position of the first operation angle again.

These operation angle characteristics of temperature control input lever 200 can be obtained by making the shape of engagement groove 105 trapezoidal. Of engagement groove 105, the right- and left-side grooves 105a and 105b on the two sides of the trapezoid are used to move temperature control input lever 200 to the first operation angle in FIGS. 19 and 20. Of engagement groove 105, groove 105c on top of the trapezoid is used to move temperature control input lever 200 to the second operation angle in FIGS. 20 and 22, and to hold it there.

Next, the operation of Embodiment 5 in the aforementioned configuration will be explained with references to FIGS. 19 through 22. FIGS. 19 and 20 show cases in which blowout mode setting lever 31' is set to a mode position other than the defroster (DEF) mode. In this case, intermediate lever 109, which is driven by lever 31', is located in the position shown in FIG. 17 and blowout mode input lever 100 is in a position (the first operation angle) that is approximately parallel to the opening face of second internal air introduction port 72. This state is maintained by friction, etc. of cable 108 as long as lever 31' is not moved again.

From this state, if temperature control lever 33' of air-conditioning operation panel 30 is being set to the maximum heating (MH) position, pin 103a of intermediate lever 103 fits into the left-side groove 105a of engagement groove 105 of lever 33', setting intermediate lever 103 to the position shown in FIG. 17.

As a result, when maximum heating (MH) is being set, temperature control input lever 200 reaches the position (the first operation angle) that is rotated by a predetermined angle in the clockwise direction from the opening face of second internal air introduction port 72 as shown in FIG. 19, and bevel gears 54 and 55 revolve to the position corresponding this first operation angle of temperature control input lever 200.

Therefore, in differential gear mechanism 98, blowout mode input lever 100, i.e., bevel gear 50d of input shaft 50a, rotates to the first operation angle position, and additionally, bevel gears 54 and 55 of temperature control input lever 200 further revolve to the first operation angle position of lever 200.

In this way, the operation of both blowout mode input lever 100 and temperature control input lever 200 to the first operation angle position causes output shaft 58a and output lever 99 to rotate to the position corresponding to the first operation angle position of both levers 100 and 200, via the engagement of bevel gear 50d, bevel gears 54 and 55, and bevel gear 58. As a result, output lever 99 rotates to the position shown in FIG. 19, and pin 99a enters drive groove 97b of engagement groove 97 of second internal/external air door lever 96, thus causing both second internal/external air door lever 96 and second internal/external air selection door 75 to the positions shown in FIG. 19.

As a result, second internal/external air selection door 75 opens second internal air introduction port 72 and closes linking passage 79. During this process, moving internal/external air selection lever 35' to the external air (FRE) position causes first internal/external air selection door 74 to close first internal air introduction port 71 and open external air introduction port 73. Therefore, the external air is sucked into suction port 76a of first fan 76 (on the external air side) from external air introduction port 73, and the external air is supplied to first passages 80 and 80a. Meanwhile, the internal air is sucked into suction port 77a of second fan 77 from second internal air introduction port 72, and the internal air is supplied to second passages 81 and 81a.

Also, auxiliary air-mix door 84 is moved to the maximum heating position and partitions the air passage between evaporator 12 and heater core 13 into first air passage 80a and second air passage 81a. Furthermore, if maximum heating is set in the foot blowout mode or the foot defroster blowout mode, both of which are different from the defroster (DEF) mode, 2-layer partitioning door 88 opens warm air bypass opening 87, and at the same time, partitions warm air passage 17 immediately behind heater core 13 into first air passage 80a and second air passage 81a.

Consequently, when maximum heating is set in the foot blowout mode or the foot defroster blowout mode, the internal/external air 2-layer flow mode shown in FIG. 13 can be set, thereby achieving both window glass fogging prevention and improved heating in the foot area of the vehicle occupant.

Note that, pin 103a of intermediate lever 103 also fits into the right-side groove 105b of engagement groove 105 of lever 33' when temperature control lever 33' is being set to the maximum cooling (MC) position, setting intermediate lever 103 to the position shown in FIG. 17. Consequently, again, when maximum cooling (MC) is being set, temperature control input lever 200 reaches the position (the first operation angle) that is rotated by a predetermined angle in the clockwise direction from the opening face of second internal air introduction port 72 as shown in FIGS. 19 and 21.

Consequently, when maximum cooling (MC) is being set in the foot blowout mode or the foot defroster blowout mode, and when maximum heating (MH) or maximum cooling (MC) is being set in the face blowout mode or the bi-level blowout mode, second internal/external air selection door 75 is moved to the position shown in FIG. 19, in the same manner as explained above, thus opening second internal air introduction port 72 and closing linking passage 79. Therefore, the air volume can be increased by introducing the internal air, thereby improving the air-conditioning performance.

On the other hand, when temperature control lever 33' of air-conditioning operation panel 30 is being set to a position between the maximum heating (MH) position and the maximum cooling (MC) position in a blowout mode other than the defroster mode, the rotational shift of lever 33' causes pin 103a of intermediate lever 103 to fit into the top groove 105c of engagement groove 105.

As a result, intermediate lever 103 rotates in the counterclockwise direction in FIG. 17, applying a force to pull cable 102 toward the right side of FIG. 17. Therefore, temperature control input lever 200 rotates from the first operation angle position in FIG. 19 to the second operation angle position in FIG. 20, and bevel gears 54 and 55 revolve on bevel gear 50d of input shaft 50a up to the position corresponding to the operation angle change of this input lever 200.

The revolution of bevel gears 54 and 55 is transmitted to output shaft 58a and output lever 99, and output lever 99 rotates from the first operation angle position in FIG. 19 to the second operation angle position in FIG. 20. As a result, pin 99a of output lever 99 rotates second internal/external air door lever 96 and second internal/external air selection door 75 to the positions shown in FIG. 20, causing second internal/external air selection door 75 to close second internal air introduction port 72 and open linking passage 79.

Note that, likewise, when temperature control lever 33' is set to the maximum cooling (MC) position, pin 103a again fits into the right-side groove 105a [sic. Should be 105b?] of engagement groove 105 of lever 33', and intermediate lever 103 is at the position shown in FIG. 17. Even when the blowout mode changes between the face mode and the foot defroster mode, the shift adjustment mechanism consisting of pin 109a and engagement groove 111 in FIG. 17 always maintains blowout mode input lever 100 in the first operation angle position as shown in FIGS. 19 and 20, and therefore, the open state of second internal air introduction port 72 in FIG. 19 and the closed state of second internal air introduction port 72 in FIG. 20 are maintained.

Next, when blowout mode setting lever 31' is moved to the defroster mode position, arc-shaped groove 111b on the left side of engagement groove 111 of blowout mode setting lever 31' (see FIG. 17) engages with pin 109a of intermediate lever 109. Here, arc-shaped groove 111b rotates in the counterclockwise direction of FIG. 17 as lever 31' is moved to the defroster mode position. However, since the groove shape is designed such that the walls of arc-shaped groove 111b apply a force that presses pin 109a toward the left side of FIG. 17 in this case, intermediate lever 109 rotates in the clockwise direction from the position in FIG. 17, thus generating a force that presses cable 108 toward the left side of FIG. 17.

Consequently, a rotational force in the clockwise direction is applied to blowout mode input lever 100, which is in the first operation angle position in FIGS. 19 and 20, via cable 108, thus moving blowout mode input lever 100 to the second operation angle position in FIGS. 21 and 22.

Then, in this state, if temperature control lever 33' of air-conditioning operation panel 30 is moved to the maximum heating (MH) position or the maximum cooling (MC) position, pin 103a of intermediate lever 103 becomes positioned in groove 105a or 105b on either side of engagement groove 105 of temperature control lever 33', setting intermediate lever 103 in the position in FIG. 17. As a result, temperature control input lever 200 reaches the first operation angle position that is rotated by a predetermined angle in the clockwise direction from the opening face of second internal air introduction port 72 as shown in FIG. 21, and bevel gears 54 and 55 revolve to the position corresponding to the first operation angle position of lever 200.

When the first operation angle position (position in FIG. 21) of temperature control input lever 200 is combined with the second operation angle position (position in FIGS. 21 and 22) of blowout mode input lever 100 in this way, output shaft 58a and output lever 99 rotate to the second operation angle position in FIG. 21. As a result, pin 99a of output lever 99 rotates second internal/external air door lever 96 and second internal/external air selection door 75 to the positions shown in FIG. 21, causing second internal/external air selection door 75 to close second internal air introduction port 72 and open linking passage 79.

During this process, internal/external air selection lever 35' of air-conditioning operation panel 30 is moved to the external air introduction (FRE) position, causing first internal/external air selection door 74 to close first internal air introduction port 71 and open external air introduction port 73. Therefore, the external air is sucked into suction port 76a of first fan 76 (on the external air side) from external air introduction port 73, and the external air is also sucked into suction port 77a of second fan 77 via linking passage 79.

On the other hand, if temperature control lever 33' of air-conditioning operation panel 30 is moved to an intermediate temperature region between the maximum heating (MH) position and the maximum cooling (MC) position in the defroster mode, pin 103a of intermediate lever 103 engages with top groove 105c of engagement groove 105.

As a result, intermediate lever 103 rotates in the counterclockwise direction of FIG. 17, applying a rightward suction force to cable 102 in FIG. 17. Therefore, temperature control input lever 200 rotates from the first operation angle position in FIG. 21 to the second operation angle position in FIG. 22, causing bevel gears 54 and 55 to revolve on bevel gear 50d of input shaft 50a up to the position corresponding to the change in the operation angle of this input lever 200.

The revolution of bevel gears 54 and 55 is transmitted to output shaft 58a and output lever 99, and output lever 99 rotates from the second operation angle position in FIG. 21 to the third operation angle position in FIG. 22. However, pin 99a of output lever 99 only slides inside idling groove 97a of engagement groove 97 of second internal/external air door lever 96, and thus the position of second internal/external air door lever 96 is not changed. In other words, even when temperature control lever 33' of air-conditioning operation panel 30 is being set to an intermediate temperature region from the maximum heating (MH) position or the maximum cooling (MC) position, second internal/external air selection door 75 can be maintained in the state that closes second internal air introduction port 72 and opens linking passage 79, if the defroster mode is set.

As a result, second internal/external air selection door 75 can always be maintained in the state that closes second internal air introduction port 72 (and opens linking passage 79) regardless of the operating position of temperature control lever 33', if the defroster mode is set. Therefore, when the defroster mode is set, the all-external air mode, which supplies the external air to first passages 80 and 80a and second passages 81 and 81a can be set, thereby improving the fogging-prevention performance during the defroster mode.

Figures 23, 24:
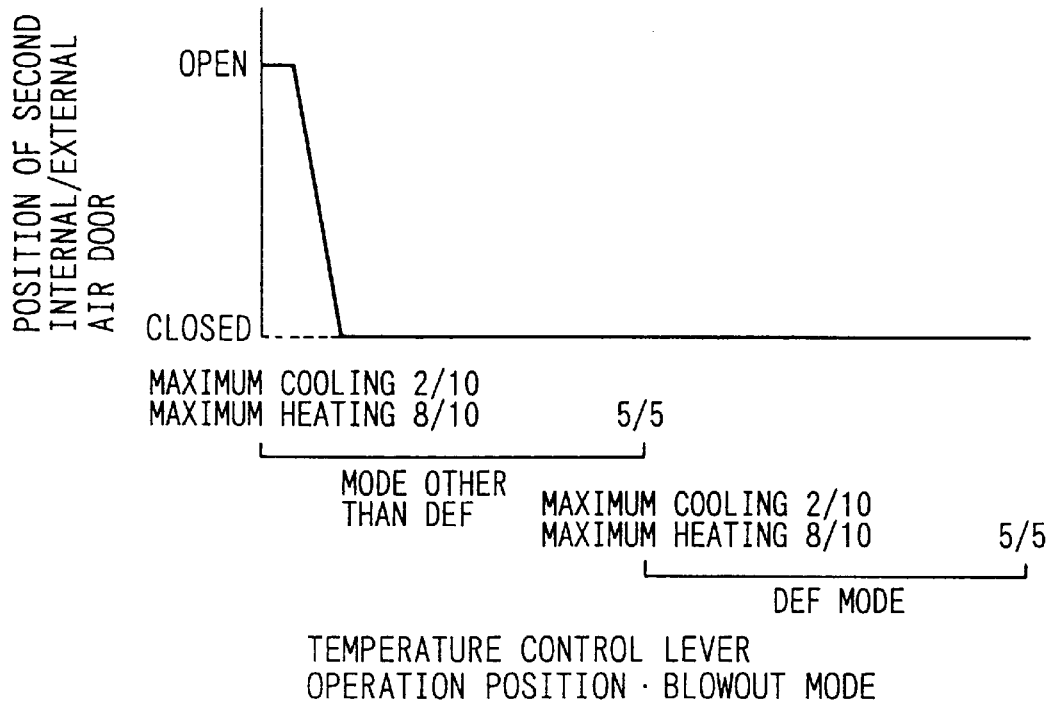
FIG. 23 is a diagram explaining the operation of the second internal/external air door of a vehicle air conditioning apparatus according to the present invention.
FIG. 24 is a table showing the operational characteristics of the second internal/external air door of a vehicle air conditioning apparatus according to the present invention.
Figure 26:
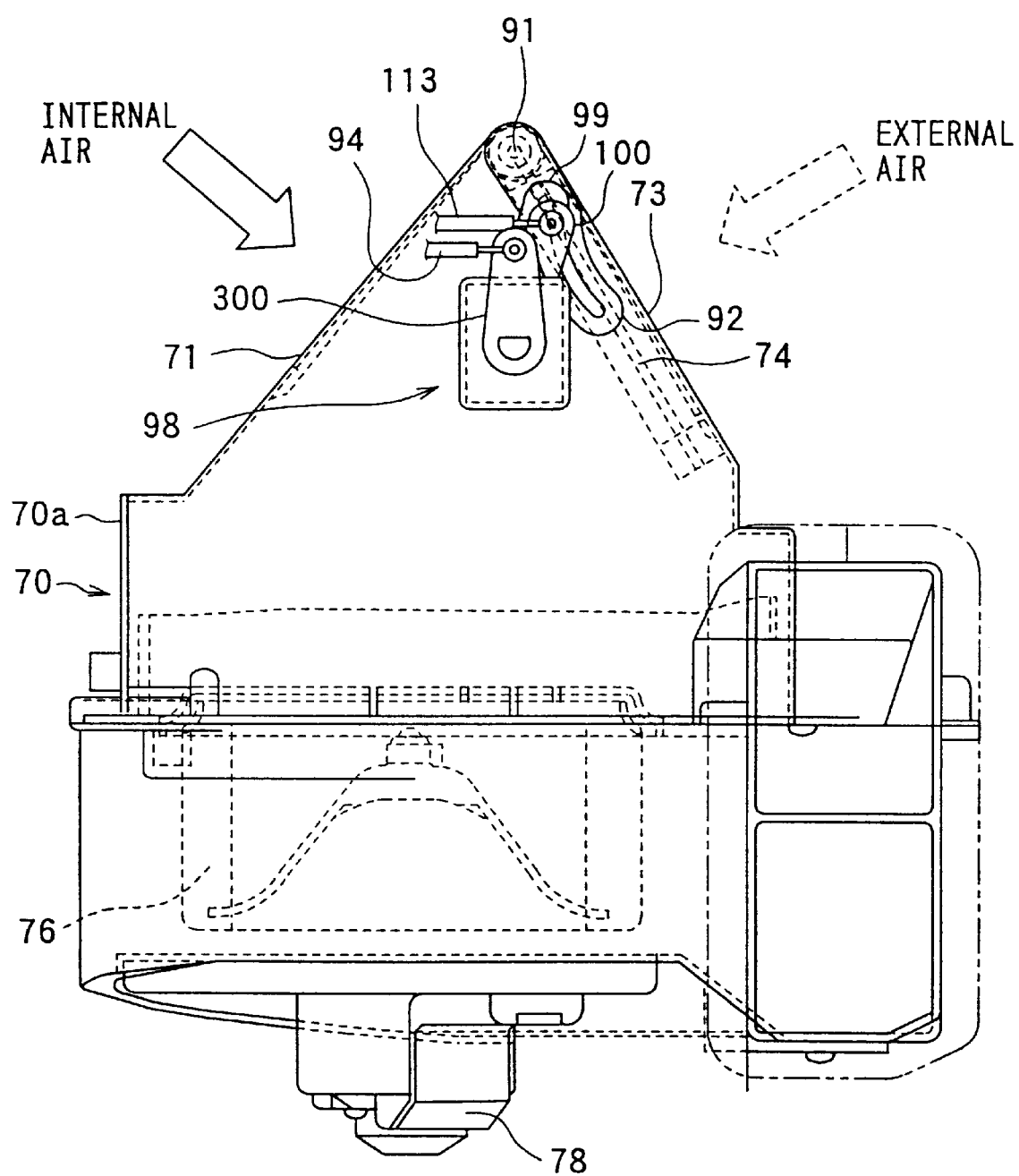
FIG. 26 is a front view of the fan unit of a vehicle air conditioning apparatus according to the present invention.
Figure 27:
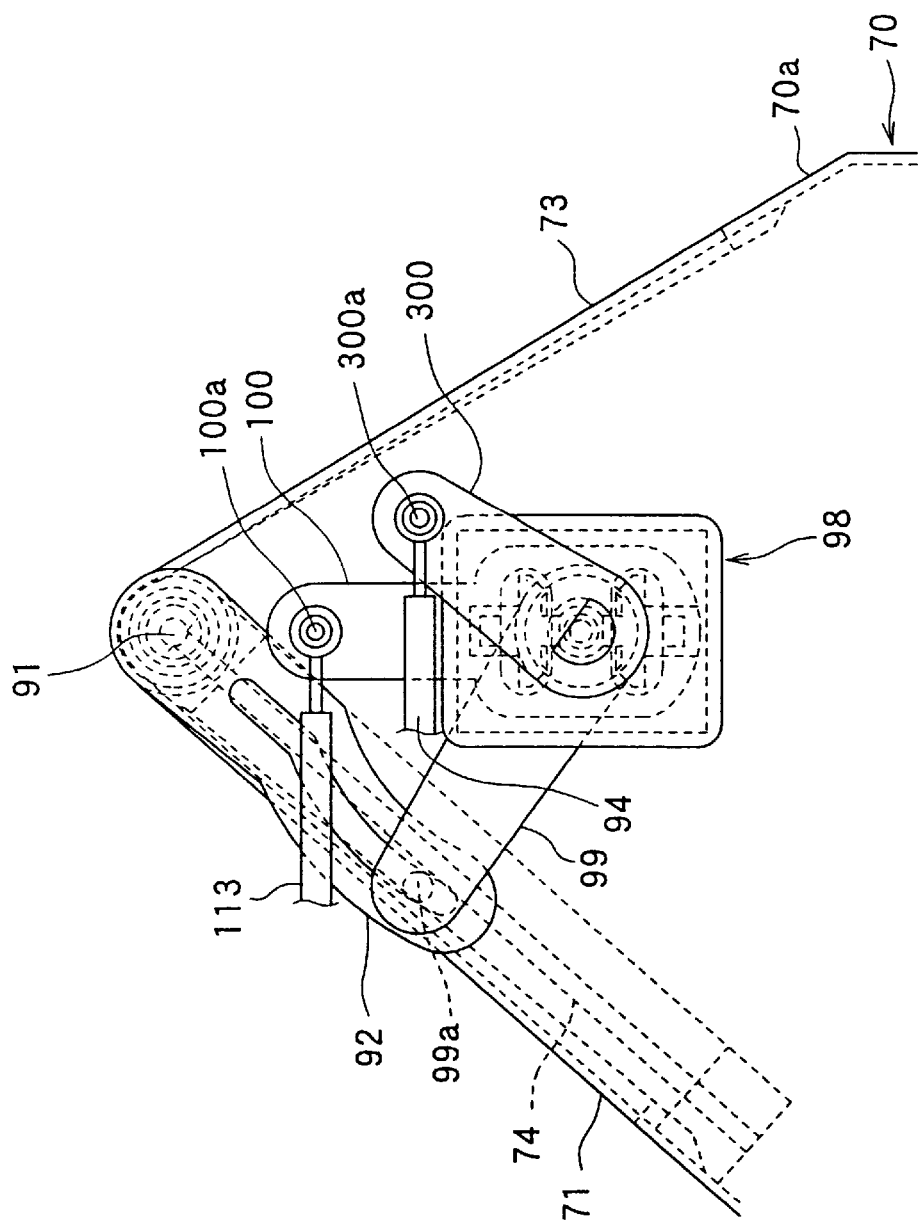
FIG. 27 is an exploded view of the major area of a vehicle air conditioning apparatus according to the present invention.

FIG. 23 summarily shows the opening and closing operations of second internal/external air selection door 75 in Embodiment 5. "Open" on the vertical axis in FIG. 23 indicates that second internal air introduction port 72 is open while "Closed" indicates that second internal air introduction port 72 is closed. The horizontal axis in FIG. 23 indicates the operation position of temperature control lever 33' and blowout modes. More specifically, the operation position of temperature control lever 33' when the blowout mode is set to a mode other than the defroster mode is shown on the left side of the horizontal axis in FIG. 23 while the operation position of temperature control lever 33' when the blowout mode is set to the defroster mode is shown on the right side of the horizontal axis in FIG. 23.

"5/10", on the horizontal axis in FIG. 23 indicates a temperature position that is between the maximum cooling position and the maximum heating position. Since the maximum cooling position is indicated by 0/10 and the maximum heating position is indicated by 10/10, 2/10 indicates a position closer to maximum cooling while 8/10, a position closer to maximum heating.

As shown in FIG. 23, when the defroster mode is set, second internal/external air selection door 75 is always maintained in the state that closes second internal air introduction port 72 regardless of the operating position of temperature control lever 33'. In contrast, when the blowout mode is set to a mode other than the defroster mode, second internal/external air selection door 75 is maintained in the state that opens second internal air introduction port 72 both when temperature control lever 33' is near the maximum cooling position or the maximum heating position, and second internal/external air selection door 75 is maintained in the state that closes second internal air introduction port 72 when temperature control lever 33' is in a temperature range that is between maximum cooling and maximum heating. FIG. 24 summarizes the opening and closing states of second internal air introduction port 72 by second internal/external air selection door 75 (same as those shown in FIG. 23) in a single table.

In the example in FIG. 23, second internal/external air selection door 75 is designed to shift the state of second internal air introduction port 72 from CLOSED to OPEN, from the position (2/10) near maximum cooling or the position (8/10) near maximum heating. Therefore, it is necessary to have second internal/external air selection door 75 shift the state of second internal air introduction port 72 from CLOSED to OPEN based on a slight change (e.g., an operation position change that is 1/10 the full operation range) in the operation position of temperature control lever 33'.

Embodiment 5 takes this point into consideration, and temperature control input lever 200, whose rotational position is changed based on the operation position of temperature control lever 33', is used as the input component that revolves bevel gears 54 and 55, in particular, out of the two input components of differential gear mechanism 98. Here, in differential gear mechanism 98, the revolution of bevel gears 54 and 55 is transmitted to the output side after being increased, and thus output lever 99 can be rotated to the desired position even if the rotational shift of temperature control input lever 200 is small. Therefore, second internal/external air selection door 75 can be opened and closed based on slight operations of temperature control lever 33'.

Note that in Embodiment 5, second internal/external air selection door 75 is operated to open second internal air introduction port 72 during both maximum cooling and maximum heating, when a blowout mode other than the defroster mode is set, as shown in FIGS. 23 and 24. However, it is also possible to operate second internal/external air selection door 75 such that it opens second internal air introduction port 72 only during maximum heating and such that it closes second internal air introduction port 72 during maximum cooling, when a blowout mode other than the defroster mode is set, as shown in FIG. 25.

Also in Embodiment 5, manually operating internal/external air selection lever 35' moves first internal/external air selection door 74 to the external or internal air introduction position via cable 94 and levers 93 and 92. However, it is also possible to install a motor whose rotational position is controlled by the manual operation position of internal/external air selection lever 35', and to have this motor open and close first internal/external air selection door 74.

Also in Embodiment 5, second internal/external air selection door 75 is used to open and close second internal air introduction port 72 and linking passage 79. However, it is also possible to provide a second external air introduction port instead of linking passage 79, and to have second internal/external air selection door 75 open and close this second external air introduction port and second internal air introduction port 72.

In the aforementioned Embodiment 5, an operational force transmission device utilizing differential gear mechanism 98 is used to open and close second internal/external air selection door 75. In contrast, in Embodiment 6, an operational force transmission device utilizing differential gear mechanism 98 is used to open and close first internal/external air selection door 74. Note that fan unit 70 according to Embodiment 6 is an ordinary type that is not equipped with second internal/external air selection door 75 and that opens and closes internal air introduction port 71 and external air introduction port 73 using a single first internal/external air selection door 74. Therefore, only a single fan 76 and a single air passage are provided, and the air passage is not partitioned into first and second passages.

Figure 28:
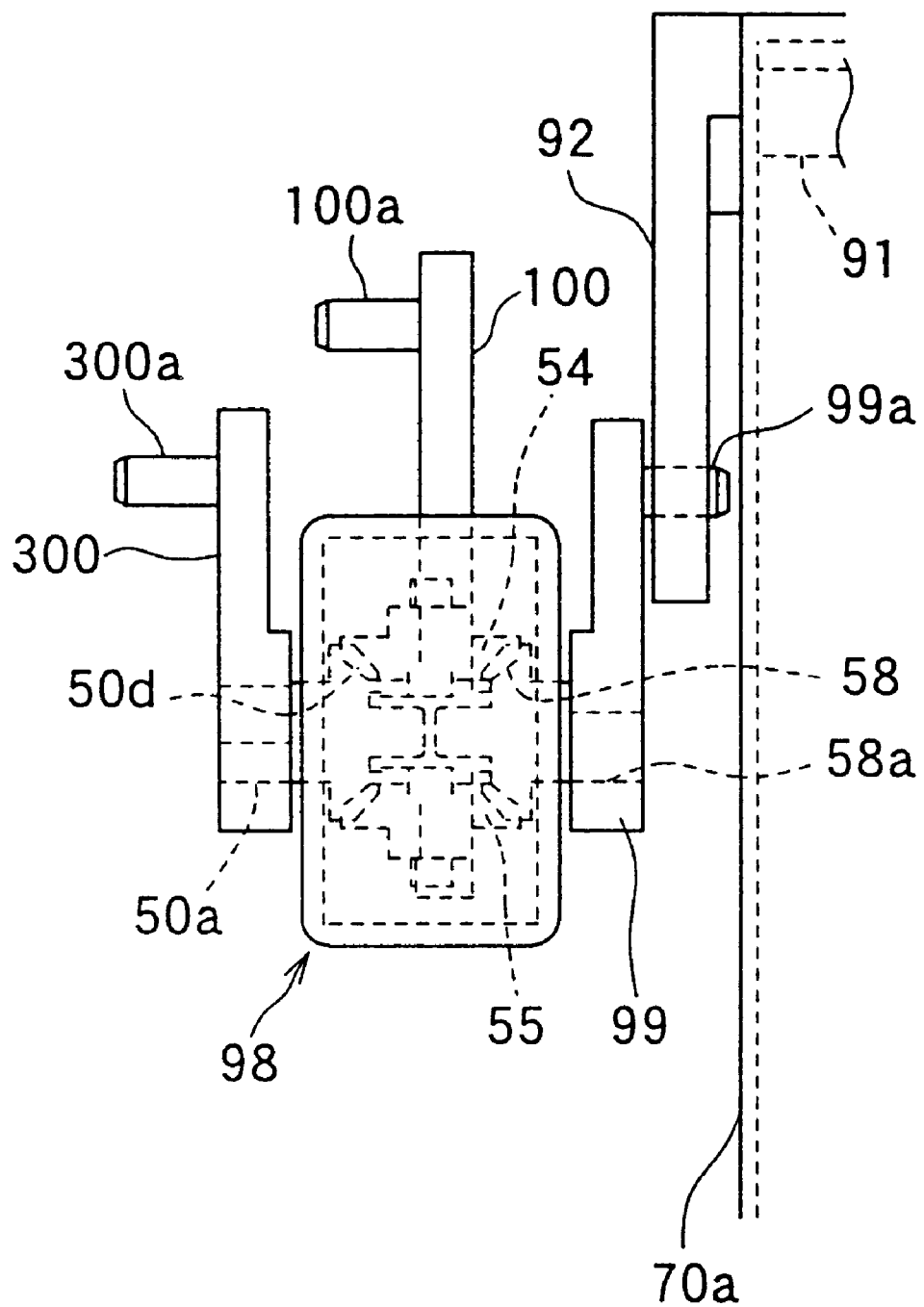
FIG. 28 is a side view of the differential gear mechanism of a vehicle air conditioning apparatus according to the present invention.

FIGS. 26 through 32 show Embodiment 6. Although the configuration of differential gear mechanism 98 is the same as that in the aforementioned Embodiment 5, input/output configuration of differential gear mechanism 98 is changed from that of the aforementioned Embodiment 5 as follows. That is, as shown in FIG. 28, one end of internal/external air selection input lever 300 is integrally connected as the first input component to input shaft 50a of differential gear mechanism 98. One end of cable 94 is connected to pin 300a on the other end of this input lever 300, and the other end of this cable 94 is connected to internal/external air selection lever 35' of air-conditioning operation panel 30 in FIG. 18.

Therefore, internal/external air selection input lever 300 rotates together with input shaft 50a and bevel gear 50d in linkage with the internal/external air selection operation of lever 35'. Note that no shift adjustment mechanism is provided between cable 94 and internal/external air selection lever 35' of air-conditioning operation panel 30, as was the case above, and the operational shift of lever 35' is directly transmitted to internal/external air selection input lever 300.

Blowout mode input lever 100 is used as the second input component of differential gear mechanism 98, and at the same time, this blowout mode input lever 100 is designed to rotatably support bevel gears 54 and 55, such that blowout mode input lever 100 supplies revolution input into bevel gears 54 and 55.

Here, blowout mode input lever 100 is connected to cable 113, and cable 113 is connected to blowout mode setting lever 31' of air-conditioning operation panel 30 via a shift adjustment mechanism (a combination of intermediate lever 109 having pin 109a and engagement groove 111) similar to that shown in FIG. 17. Consequently, when blowout mode setting lever 31' is being set to a position other than the defroster mode, blowout mode input lever 100 rotates to the first operation angle position in FIGS. 29 and 30 described below; and when blowout mode setting lever 31' is being set to the defroster mode, blowout mode input lever 100 rotates to the second operation angle position in FIGS. 31 and 32 described below.

Then, one end of output lever 99 is integrally connected to output shaft 58a of differential gear mechanism 98, and pin 99a at the other end of output lever 99 is slidably fitted into engagement groove 92a of internal/external air door lever 92. Here, engagement groove 92a is provided with a drive groove 92b which rotates internal/external air door lever 92 around rotation shaft 91 based on the shift in pin 99a and with an idling groove 92c which does not rotate blowout mode input lever 100 even when pin 99a is shifted. The engagement structure between this engagement groove 92a and pin 99a forms a shift adjustment mechanism between output lever 99 and internal/external air door lever 92.

Figure 29:
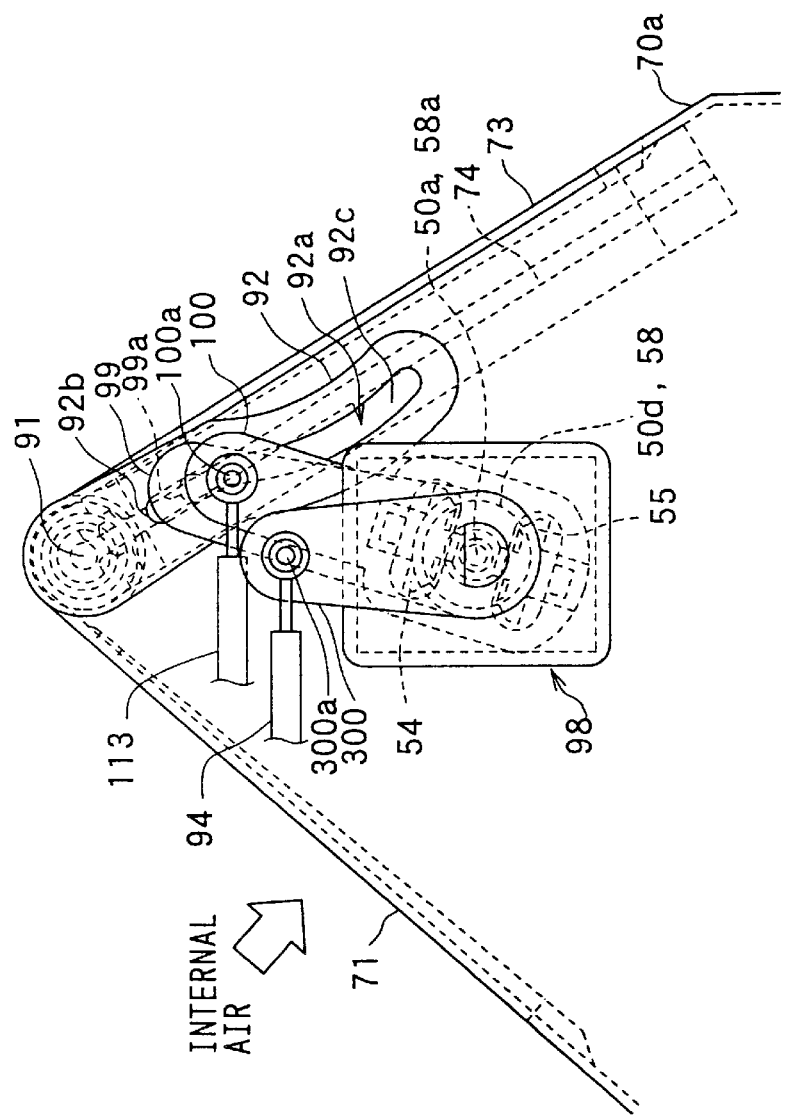
FIG. 29 is a diagram explaining the operation of the differential gear mechanism of a vehicle air conditioning apparatus according to the present invention.

Next, the operation of Embodiment 6 will be explained. FIG. 29 shows a case in which internal/external air selection lever 35' of air-conditioning operation panel 30 is set to the internal air (REC) position and blowout mode setting lever 31' is at a mode position other than the defroster mode. In this case, blowout mode input lever 100 rotates from the upright position to the right-leaning position, i.e., the first operation angle position, based on the operation position of blowout mode setting lever 31'. Furthermore, internal/external air selection input lever 300 rotates to the upright position, i.e. the first operation angle position, based on the operation of internal/external air selection lever 35' to the internal air position.

In this way, the rotation of two input levers 100 and 300 to the first operation angle position shown in FIG. 29 causes output lever 99, which is integrated with output shaft 58a of differential gear mechanism 98, rotate from the upright position to the right-leaning position, i.e., the first operation angle position. Consequently, pin 99a of output lever 99 enters drive groove 92b of engagement groove 92a of internal/external air door lever 92, causing internal/external air door lever 92 and internal/external air door 74 to the positions in FIG. 29. As a result, internal/external air door 74 opens internal air introduction port 71 and closes external air introduction port 73.

Figure 30:
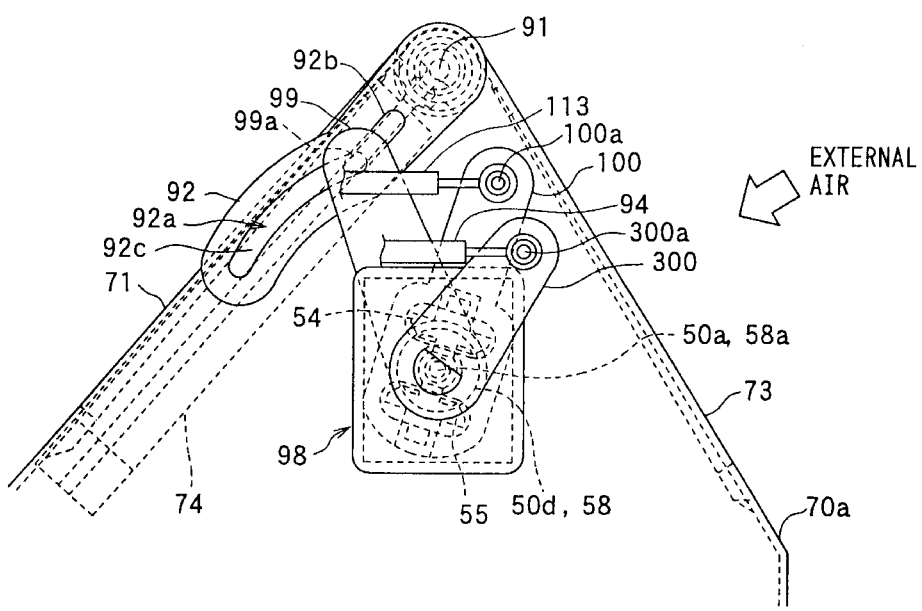
FIG. 30 is a diagram explaining the operation of the differential gear mechanism of a vehicle air conditioning apparatus according to the present invention.

Next, FIG. 30 shows a case in which internal/external air selection lever 35' is set to the external air (FRE) position and blowout mode setting lever 31' is set to a mode other than the defroster mode. In this case, setting internal/external air selection lever 35' to the external air position causes internal/external air selection input lever 300 to rotate from the upright position to the right-leaning position, i.e., the second operation angle position.

This rotation is transmitted from bevel gear 50d of input shaft 50a to bevel gear 58, output shaft 58a, and output lever 99 via bevel gears 54 and 55, causing output lever 99 to rotate from the upright position to the left-leaning position, i.e., the second operation angle position. Consequently, pin 99a of output lever 99 engages with drive groove 92b of engagement groove 92a of internal/external air door lever 92, causing internal/external air door lever 92 and internal/external air door 74 to the positions in FIG. 30. As a result, internal/external air door 74 closes internal air introduction port 71 and opens external air introduction port 73.

As explained above, when blowout mode setting lever 31' is set to a mode position other than the defroster mode, internal/external air door 74 can be operated such that the internal/external air mode selected by internal/external air selection lever 35' will be set.

Figure 31:
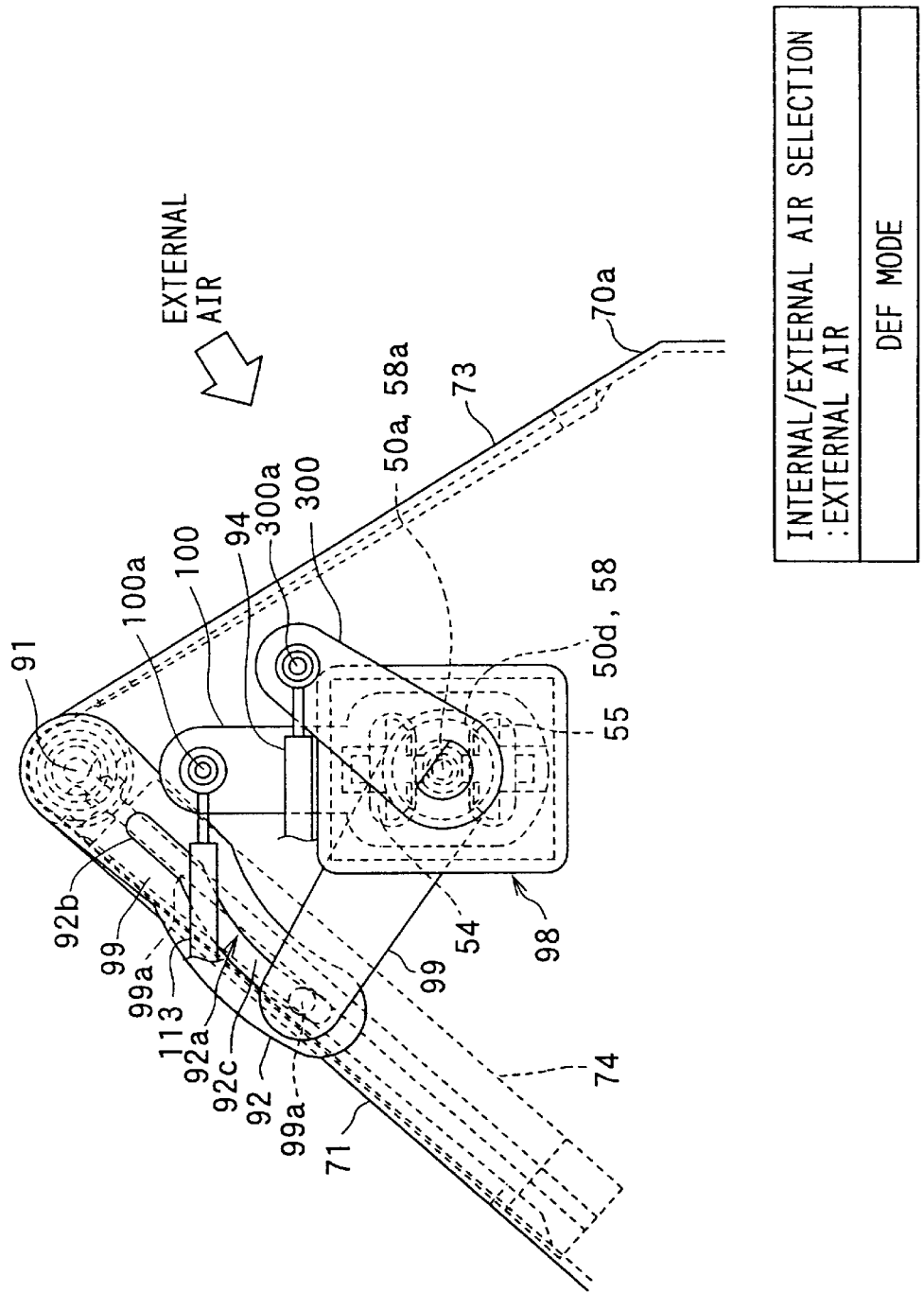
FIG. 31 is a diagram explaining the operation of the differential gear mechanism of a vehicle air conditioning apparatus according to the present invention.

FIG. 31 shows a case in which internal/external air selection lever 35' is set to the external (FRE) position and blowout mode setting lever 31' is set to the defroster mode position. In this case, setting blowout mode setting lever 31' to the defroster mode position causes blowout mode input lever 100 to rotate to the upright position, i.e., the second operation angle position.

Since this rotation causes bevel gears 54 and 55 to revolve on bevel gear 50d of input shaft 50a, the rotation associated with lo this revolution is transmitted to output shaft 58a and output lever 99 via bevel gear 58, causing output lever 99 to rotate to the third operation angle position which is leaning further to the left than the aforementioned second operation angle position (FIG. 30). However, even when the rotation of this output lever 99 occurs, pin 99a of output lever 99 only slides inside idling groove 92c of engagement groove 92a of internal/external air door lever 92, and thus internal/external air door lever 92 and internal/external air door 74 maintain the state in which internal air introduction port 71 is closed and external air introduction port 73 is open.

Figure 32:
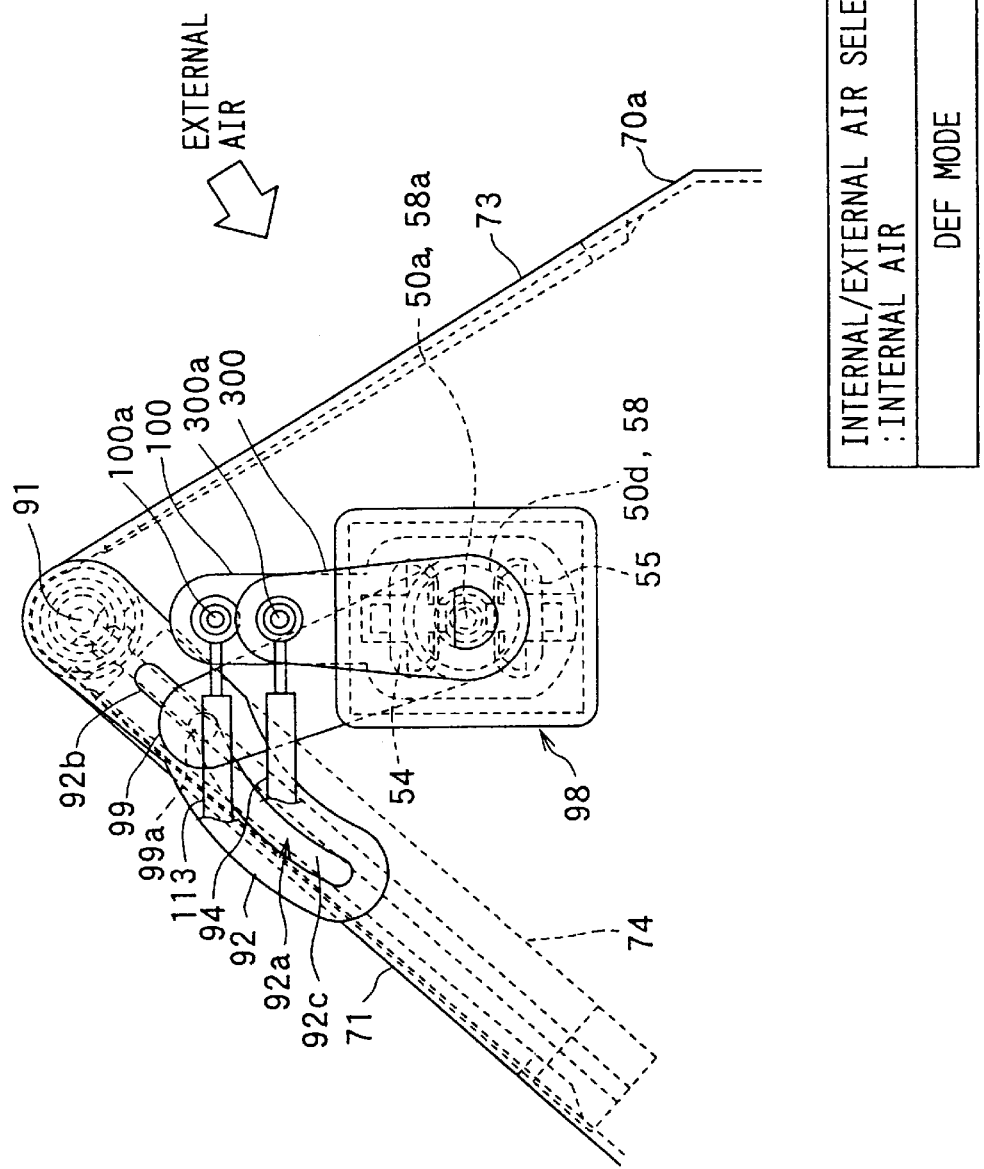
FIG. 32 is a diagram explaining the operation of the differential gear mechanism of a vehicle air conditioning apparatus according to the present invention.

FIG. 32 shows a case in which internal/external air selection lever 35' is being set to the internal (REC) position when blowout mode setting lever 31' is set to the defroster mode position. In this case, setting internal/external air selection lever 35' to the internal air position causes internal/external air selection input lever 300 to rotate to the upright position, i.e., the first operation angle position.

Consequently, output lever 99 returns from the third operation angle position to the second operation angle position. However, during this return from the third operation angle position to the second operation angle position, pin 99a of output lever 99 only slides inside idling groove 92c, and thus internal/external air door lever 92 and internal/external air door 74 maintain the state in which internal air introduction port 71 is closed and external air introduction port 73 is open.

During the defroster mode, the external air, which has a lower absolute humidity than the internal air, should be introduced. However, the vehicle occupant sometimes makes a mistake and manually sets internal/external air selection lever 35' of air-conditioning operation panel 30 to the internal air position. Even in such a case, according to Embodiment 6, internal/external air selection input lever 300 connected to internal/external air selection cable 94 rotates, rotating only output lever 99, and internal/external air door lever 92 and internal/external air door 74 can be maintained in the external air introduction positions. Therefore, excellent fogging-prevention performance can be achieved during the defroster mode by nullifying the occupant's mistake.

Figure 33:
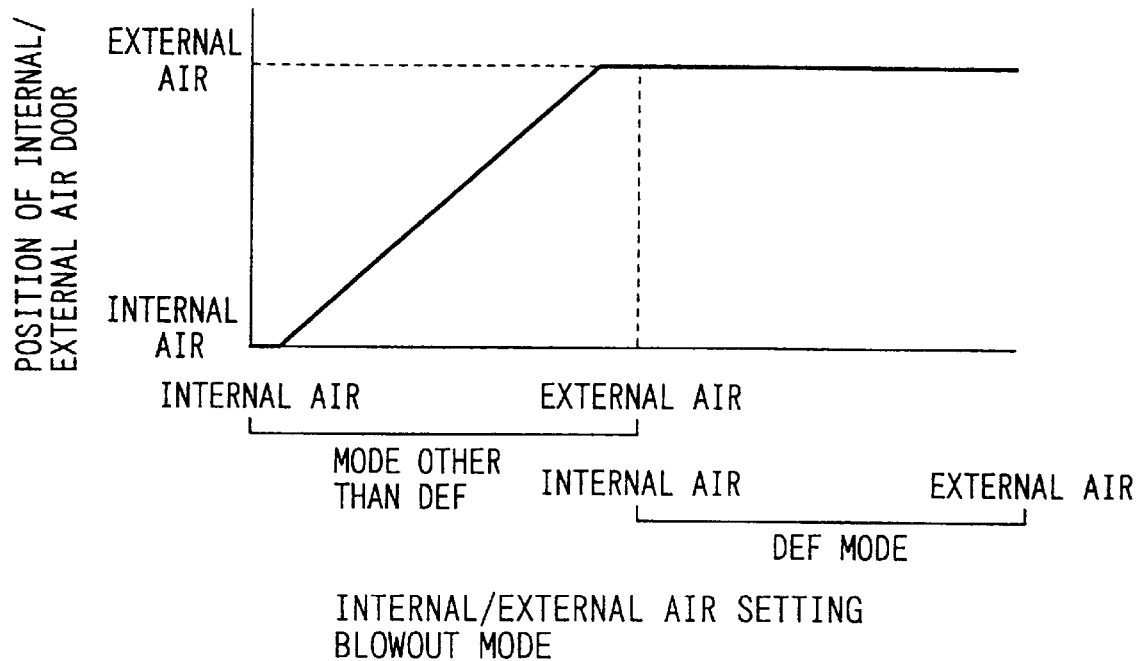
FIG. 33 is an operational characteristics diagram of the internal/external air door of a vehicle air conditioning apparatus according to the present invention.

FIG. 33 shows the internal/external air selection characteristics according to Embodiment 6. When the defroster mode is set, internal/external air selection door 74 is maintained at the external air introduction position, regardless of whether the internal/external air setting of air-conditioning operation panel 30 is internal air or external air. On the other hand, when a blowout mode other than the defroster mode is set, the internal air mode or the external air mode can be set according to the internal/external air setting of air-conditioning operation panel 30.

Note that in Embodiment 6, the external air introduction mode is set regardless of internal/external air setting of air-conditioning operation panel 30, only when the defroster mode is set, as shown in FIG. 33. However, fogging-prevention might be strongly required in the foot defroster mode as well, in some cases. Therefore, it is possible to have the external air introduction mode set regardless of internal/external air setting of air-conditioning operation panel 30, in both the defroster mode and the foot defroster mode.

In Embodiment 6, an explanation was provided for a differential gear mechanism for switching between the internal and external air, applied to an ordinary vehicular air-conditioning apparatus in which no internal/external air 2-layer flow mode is set. However, as in Embodiment 5, it is possible to apply Embodiment 6 to the driving of first internal/external air selection door 74 in a vehicular air-conditioning apparatus in which the internal/external air 2-layer flow mode can be set.

In the aforementioned Embodiments 5 and 6, bevel gears 50d, 54, 55, and 58 are used to configure differential gear mechanism 98. However, in Embodiment 7, differential gear mechanism 98 is comprised of a known planetary gear mechanism as shown in FIG. 34.

Figure 34:
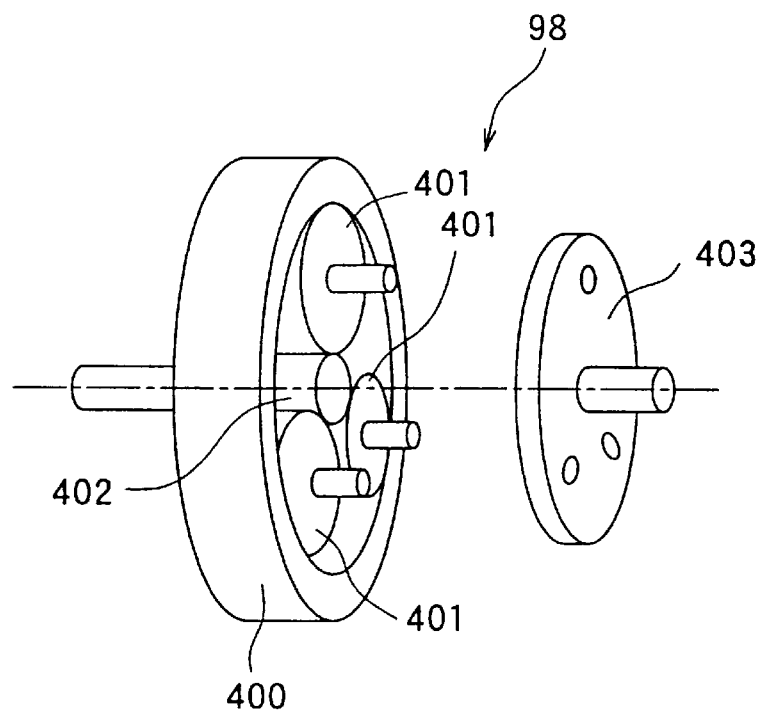
FIG. 34 is an exploded perspective diagram of the planetary gear mechanism of a vehicle air conditioning apparatus according to the present invention.

In FIG. 34, the planetary gear mechanism (differential gear mechanism 98) is comprised of a ring-shaped internal gear 400, multiple planetary gears 401, a sun gear 402, and a carrier component 403 which supports the rotation shafts of multiple planetary gears 401 and which causes planetary gears 401 to revolve.

In applying a configuration example of input/output in differential gear mechanism 98 that uses this planetary gear mechanism to application to Embodiment 5, it is possible to supply the rotational shift of temperature control input lever 200 to internal gear 400 as the first input, to supply the rotational shift of blowout mode input lever 100 to carrier component 403 (planetary gears 401) as the second input (revolution input), and to extract the rotational shift of sun gear 402 from output lever 99 as an output, for example.

In application to Embodiment 6, it is possible to supply the rotational shift of internal/external air selection input lever 300 to internal gear 300[sic] as the first input, to supply the rotational shift of blowout mode input lever 100 to carrier component 403 (planetary gears 401) as the second input (revolution input), and to extract the rotational shift of sun gear 402 from output lever 99 as an output, for example.

Note that it is of course possible to configure differential gear mechanism 53 in Embodiment 1 using a planetary gear mechanism in the same manner.

Figure 35:
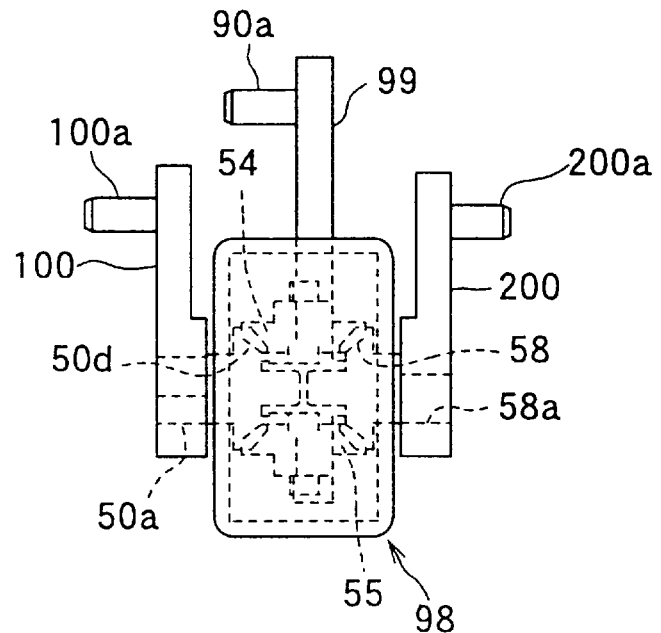
FIG. 35 is a side view of the differential gear mechanism of a vehicle air conditioning apparatus according to the present invention.
Figure 36:
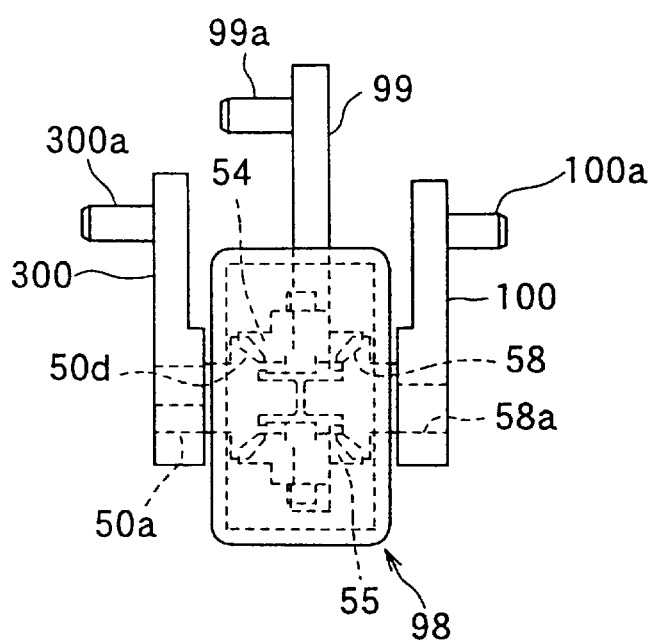
FIG. 36 is a side view of the differential gear mechanism of a vehicle air conditioning apparatus according to the present invention.

Input/output configuration examples of differential gear mechanism 98 are not limited to those in the aforementioned Embodiments 5 and 6, and various modifications are possible. In Embodiment 8, two rotation shafts 50a and 58a, that are positioned on the same shaft, are used as input shafts in differential gear mechanism 98 shown in FIG. 35. In application to Embodiment 5, blowout mode input lever 100 is linked to input shaft 50a and temperature control input lever 200 is linked to the other input shaft 58a, for example. Then, it is possible to extract the revolution shifts of bevel gears 54 and 55 as outputs from output lever 99, by rotatably supporting bevel gears 54 and 55 with output lever 99.

In Embodiment 9, the concept of the aforementioned Embodiment 8 is applied to Embodiment 6. As an input/output configuration example of differential gear mechanism 98, internal/external air selection input lever 300 is linked to input shaft 50a and blowout mode input lever 100 is linked to the other input shaft 58a. Then, it is possible to extract the revolution shifts of bevel gears 54 and 55 as outputs from output lever 99, by rotatably supporting bevel gears 54 and 55 with output lever 99.

Therefore, Embodiment 9 can be considered an example in which the positions of output lever 99 and blowout mode input lever 100 are reversed from those in the input/output configuration example in Embodiment 6 in FIG. 28.

In Embodiment 10, the internal/external air 2-layer flow mode can be manually set in the vehicular air-conditioning apparatus by the vehicle occupant as in Embodiment 5 (FIGS. 13 through 24), and the overall configuration of the vehicular air-conditioning apparatus can be the same as that shown in FIG. 13.

First, the issues involved in Embodiment 10 will be explained based on Embodiment 5. According to Embodiment 5, as shown in FIGS. 14 through 18, differential gear mechanism 98 is installed in fan unit 70, and this differential gear mechanism 98 is provided with blowout mode input lever 100 (the first input component) and temperature control input lever 200 (the second input component); and the operational shift of blowout mode setting lever 31' of air-conditioning operation panel 30 is transmitted to blowout mode input lever 100 via cable 108. Also, the operational shift of temperature control lever 33' of air-conditioning operation panel 30 is transmitted to temperature control input lever 200 via cable 102.

Therefore, in Embodiment 5, two cables 102 and 108 are needed for linking the two input levers 100 and 200 of differential gear mechanism 98 with the two operation levers 31' and 33' of air-conditioning operation panel 30, respectively. Here, air-conditioning operation panel 30 is a component that is mounted on the vehicle instrument panel (not shown in the figure) in the front interior of the vehicle. Therefore, after air-conditioning unit 10 and fan unit 70 are first installed on the inside of the instrument panel and air-conditioning operation panel 30 is mounted on the instrument panel, the aforementioned two cables 102 and 108 are connected.

Consequently, cable connection work must be performed within a tight space on the inside of the instrument panel, resulting in poor work efficiency.

Figure 37:
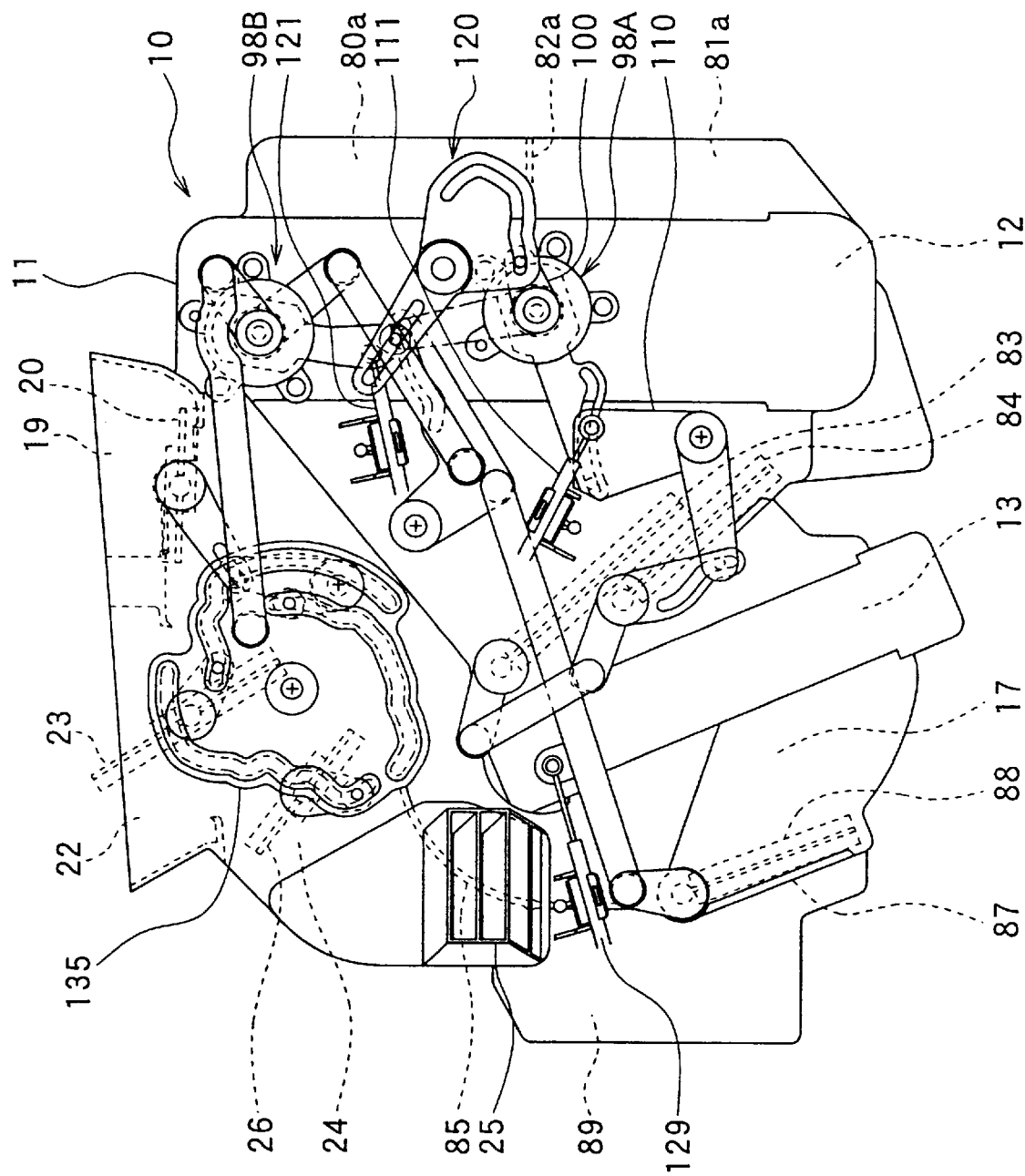
FIG. 37 is a front view of the air-conditioning unit of a vehicle air conditioning apparatus according to the present invention.
Figure 38:
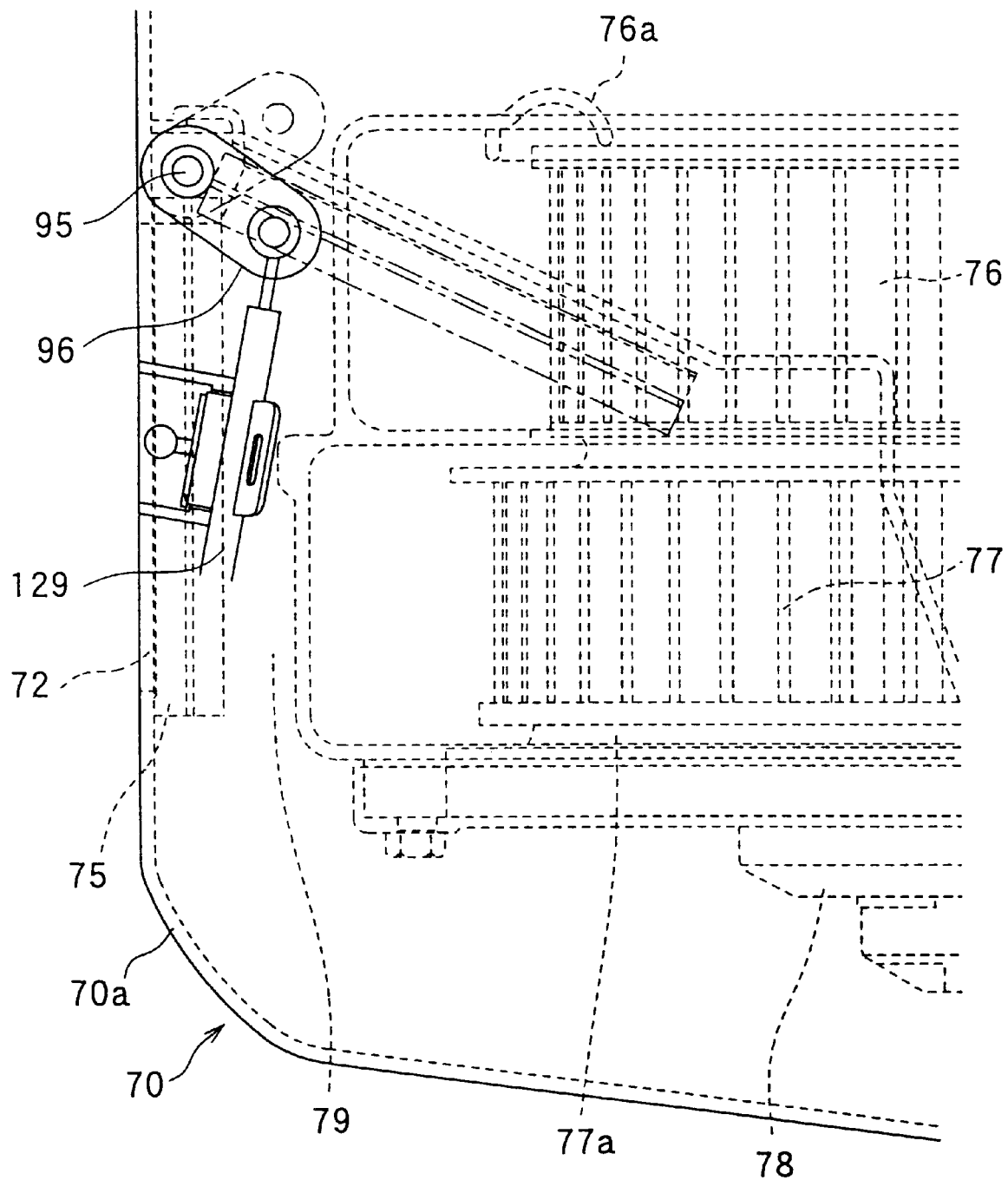
FIG. 38 is a front view of the major areas of the fan unit of vehicle air conditioning apparatus according to the present invention.
Figure 39:
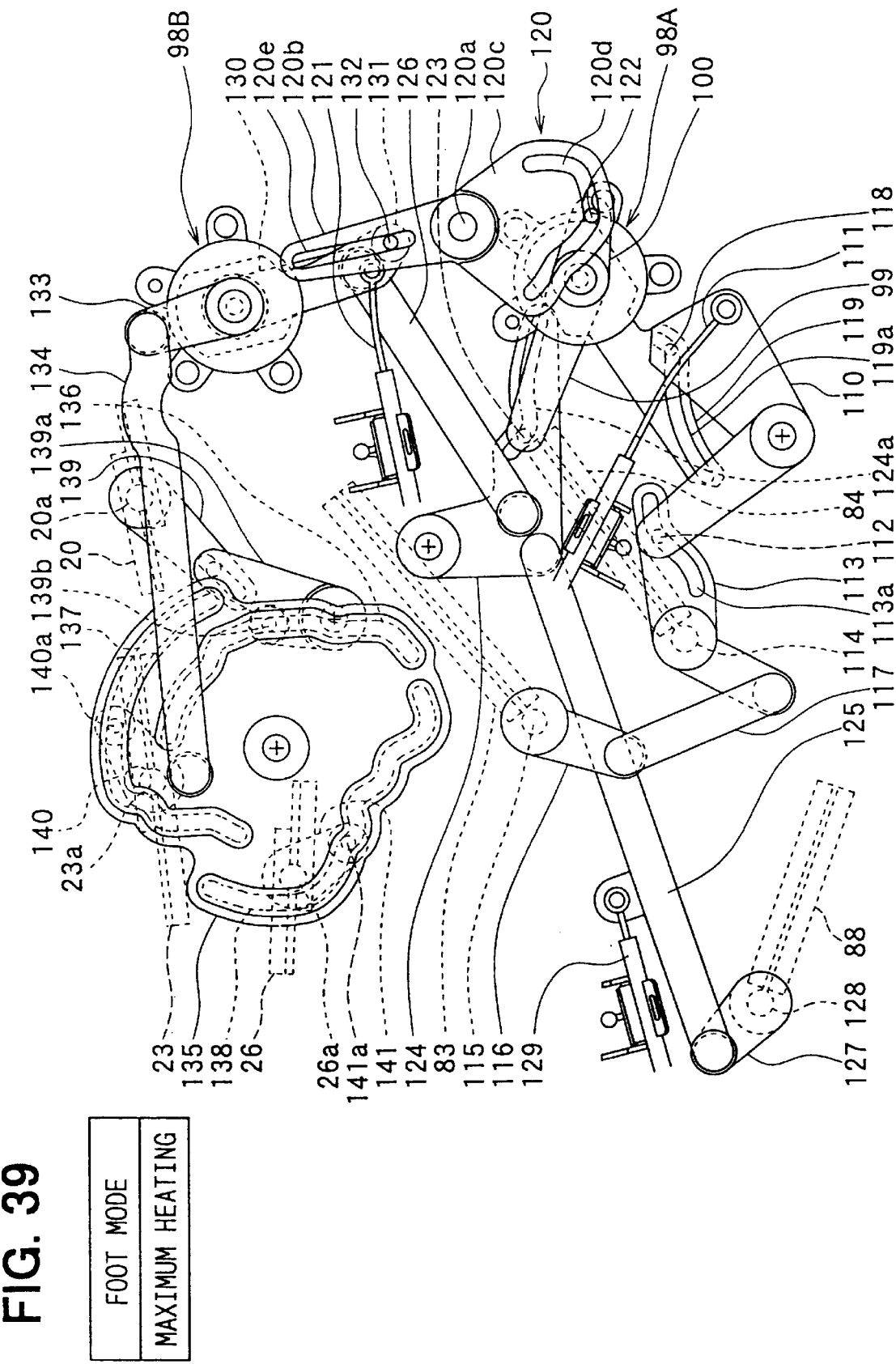
FIG. 39 is a configuration diagram of the door operation mechanism of a vehicle air conditioning apparatus according to the present invention.
Figure 40:
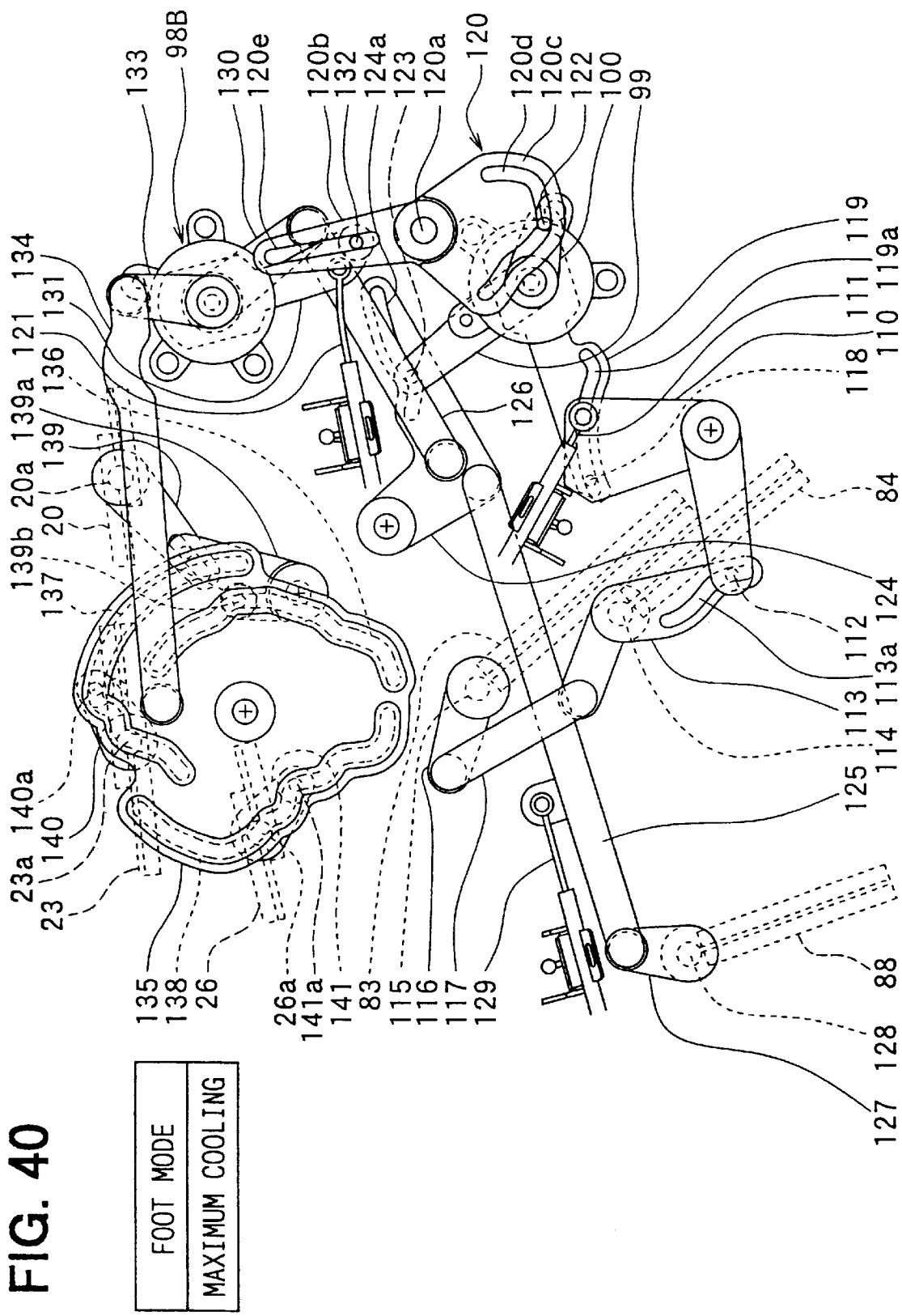
FIG. 40 is a configuration diagram of the door operation mechanism of a vehicle air conditioning apparatus according to the present invention.

In view of the aforementioned problem, Embodiment 10 is intended to provide a vehicular air-conditioning apparatus in which the operation components of air-conditioning operation panel 30 need not be connected to cables. FIG. 37 shows the state in which the operation link mechanism for various doors according to Embodiment 10 is mounted on the driver-side side surface of case 11 of air-conditioning unit 10, and FIG. 38 shows the main area of fan unit 70 according to Embodiment 10. FIGS. 39 and 40 shows this operation link mechanism only.

Temperature control (air mix) input lever 110 is V-shaped, and one of its ends is connected to cable 111, and input lever 110 is connected via this-cable 11 to temperature control lever 33' of air-conditioning operation panel 30. Consequently, the operation of temperature control lever 33' rotates input lever 110. The other end of this input lever 110 is connected to air-mix door lever 113 via the engagement area between pin 112 and engagement groove 113a. This air-mix door lever 113 is integrally connected to rotation shaft 114 of auxiliary air-mix door 84 and rotates auxiliary air-mix door 84.

Door lever 116 is integrally connected to rotation shaft 115 of main air-mix door 83, and air-mix door lever 113 is also connected to this door lever 116 via connecting rod 117. Therefore, when air-mix door lever 113 is rotated, both air-mix doors 83 and 84 also rotate in linkage. Furthermore, temperature control (air mix) input lever 110 is connected to maximum heating input lever 119 via the engagement area between pin 118 and engagement groove 119a.

Figure 41:
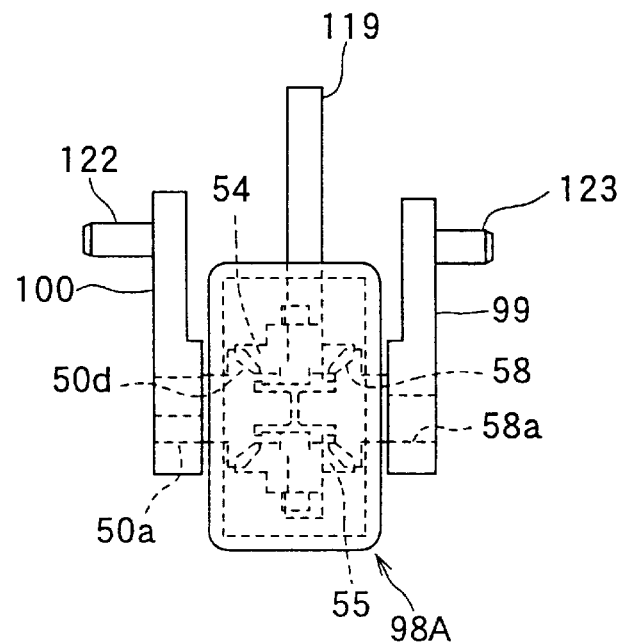
FIG. 41 is a side view of the first differential gear mechanism of a vehicle air conditioning apparatus according to the present invention.

In Embodiment 10, two (first and second) differential gear mechanisms 98A and 98B are secured on the side surface of case 11. Of these, first differential gear mechanism 98A opens and closes second internal/external air selection door 75 (FIG. 38) according to the temperature control (air mix) input condition and the blowout mode input condition, for manually setting the internal/external air 2-layer flow mode. Therefore, first differential gear mechanism 98A performs the same function as differential gear mechanism 98 in Embodiment 5, and maximum heating input lever 119 acts as a revolution input component (the second input component) for causing bevel gears 54 and 55 to revolve in first differential gear mechanism 98A, as shown in FIG. 41.

Meanwhile, blowout mode input lever 120 rotates around rotation shaft 120a, and has a long lever 120b and a fan-shaped lever 120. The shift in cable 121 is transmitted to long lever 120b via blowout mode input lever 131 of second differential gear mechanism 98B described below. Since this cable 121 is connected to blowout mode setting lever 31' of air-conditioning operation panel 30, blowout mode input lever 120 rotates based on the operation of blowout mode setting lever 31'.

This fan-shaped lever 120c of blowout mode input lever 120 is connected to blowout mode input lever 100 (the first input component) of first differential gear mechanism 98A via the engagement area between engagement groove 120d and pin 122. As shown in FIG. 41, this input lever 100 is integrally coupled with input shaft 50a which has bevel gear 50d. This input lever 100 rotates to the positions shown in FIGS. 39 and 40 in the foot and foot defroster mode, and in other modes, is maintained in a position (the position in FIG. 37) that is rotated by a predetermined angle in the counterclockwise direction from the positions in FIGS. 39 and 40 because of the shape of engagement groove 120*d* of fan-shaped lever 120*c*.

Also, in first differential gear mechanism 98A, output lever 99 which is coupled to output shaft 58*a* is connected to internal/external air 2-layer lever 124 via the engagement area between pin 123 and engagement groove 124*a*. Note that, in first differential gear mechanism 98A, input lever 100 is located on the top side in the direction perpendicular to the page in FIGS. 39 and 40, maximum heating input lever 119 is located in the middle of the same direction, and output lever 99 is located on the bottom side of the same direction.

Two connecting rods 125 and 126 are connected to the aforementioned internal/external air 2-layer lever 124, and lever 124 is connected to door lever 127 of 2-layer partitioning door 88 via one of the connecting rods, 125. Door lever 127 is integrally coupled with rotation shaft 128 of door 88. Connecting rod 125 is also connected to door lever 96 of second internal/external air selection door 75 via cable 129.

Figure 42:
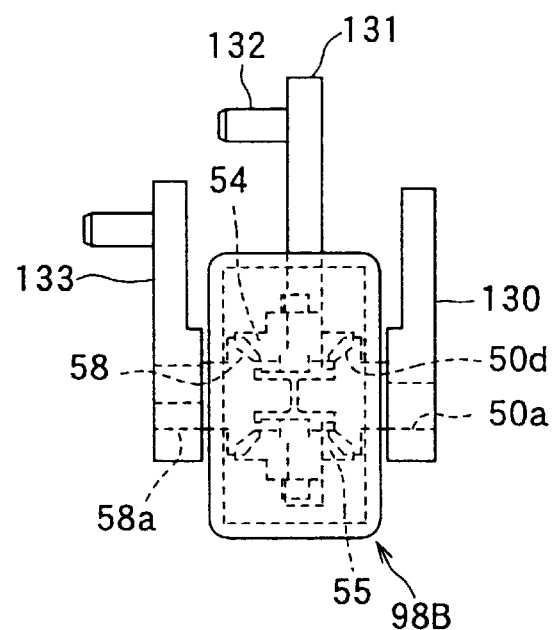
FIG. 42 is a side view of the second differential gear mechanism of a vehicle air conditioning apparatus according to the present invention.

The other connecting rod 126 is connected to internal/external air 2-layer input lever 130 if second differential gear mechanism 98B. This internal/external air 2-layer input lever 130 is integrally coupled with input shaft 50*a* which has bevel gear 50*d*, as shown in FIG. 42, and constitutes the first input component. Blowout mode input lever 131 of second differential gear mechanism 98B is the second input component (revolution input component) which causes bevel gears 54 and 55 to revolve, and is connected to the aforementioned blowout mode cable 121. This blowout mode input lever 131 is connected to long lever 120*b* of blowout mode input lever 120 of first differential gear mechanism 98A via the engagement area between pin 132 and engagement groove 120*e*.

Output lever 133, which is integrally coupled with output shaft 58*a* of second differential gear mechanism 98B, is connected to a platter-shaped blowout mode link 135 via connecting rod 134. Note that, in second differential gear mechanism 98B, internal/external air 2-layer input lever 130 is located on the bottom side in the direction perpendicular to the page in FIGS. 39 and 40, blowout mode input lever 131 is located in the middle of the same direction, and output lever 133 is located on the top side of the same direction.

The aforementioned blowout mode link 135 is a main link component for switching blowout modes, and has defroster engagement groove 136, face engagement groove 137, and foot engagement groove 138. Door levers 139, 140, and 141 are integrated into rotation shaft 20*a* of defroster door 20, rotation shaft 23*a* of face door 23, and rotation shaft 26*a* of foot door 26, respectively. Second door lever 139*a* is connected to defroster door 139; and pins 139*b*, 140*a*, and 141*a* of door levers 139*a*, 140, and 141 are slidably fitted into engagement grooves 136, 137, and 138, respectively, such that doors 20, 23, and 26 can be opened and closed by the rotation of blowout mode link 135.

Next, the operation of Embodiment 10 in the aforementioned configuration will be explained. FIG. 40 shows the maximum cooling position of temperature control lever 110, and when temperature control lever 33' of air-conditioning operation panel 30 is manually moved from the maximum cooling position to the maximum heating position, input lever 110 rotates in the clockwise direction from the position in FIG. 40 toward the position in FIG. 39. Consequently, maximum heating input lever 119 rotates in the counter-clockwise direction by a predetermined angle near the maximum heating position.

The rotation of this maximum heating input lever 119 causes bevel gears 54 and 55 to revolve in first differential gear mechanism 98A. During this step, since input-side bevel gear 50*d* of first differential gear mechanism 98A is restricted by blowout mode input lever 100 (the first input component) to the stopped position, the revolution of bevel gears 54 and 55 causes only bevel gear 58 on the output side to rotate. Here, since the revolution of bevel gears 54 and 55 is transmitted to bevel gear 58 after being increased, output lever 99 rotates in the same direction as input lever 119 and by an angle that is greater than (e.g., twice the rotation angle of) the rotation angle of input lever 119.

In first differential gear mechanism 98A, blowout mode input lever 100 (the first input component) rotates corresponding to the rotational position of blowout mode input lever 120, which responds to the operation position of blowout mode setting lever 31' of air-conditioning operation panel 30. When setting lever 31' is set to the face, bi-level, or defroster blowout mode, input lever 100 is held in the position in FIG. 37. However, when setting lever 31' is moved to the foot or foot defroster blowout mode, the clockwise rotation of blowout mode input lever 120 causes input lever 100 to rotate in the clockwise direction from the position in FIG. 37 to the position in FIGS. 39 and 40.

In the face, bi-level, or defroster blowout mode, blowout mode input lever 100 of first differential gear mechanism 98A is held in the position in FIG. 37, and as a result, pin 123 of output lever 99 of first differential gear mechanism 98A only moves inside the idling groove of engagement groove 124*a* of internal/external air 2-layer lever 124, regardless of the position of maximum heating input lever 119.

Consequently, in the face, bi-level, or defroster blowout mode, output lever 99 only moves inside the idling groove of engagement groove 124*a* regardless of where between the maximum cooling position and the maximum heating position temperature control input lever 110 is positioned, and thus internal/external air 2-layer lever 124 is always maintained in the position in FIGS. 37 and 40.

As a result, 2-layer partitioning door 88 connected to internal/external air 2-layer lever 124 is moved to the position that closes warm air bypass opening 87, and does not partition warm air passage 17. Second internal/external air selection door 75 is connected to internal/external air 2-layer lever 124 via cable 129, etc., and second internal/external air selection door 75 is moved to the position that closes second internal air introduction port 72, in linkage with 2-layer partitioning door 88.

However, when the blowout mode is set to the foot or defroster mode, the clockwise rotation of blowout mode input lever 120 causes blowout mode input lever 100 to rotate in the clockwise direction from the position in FIG. 37 to the position in FIGS. 39 and 40. In response to this rotation of blowout mode input lever 100, output lever 99 rotates in the opposite direction, i.e., in the counterclockwise direction, by the same angle.

During this process, if temperature control input lever 110 is located in a position between the maximum cooling position and the temperature control region, maximum heating input lever 119 is held in the position in FIG. 40. Therefore, pin 123 of output lever 99 only moves inside the idling groove of engagement groove 124*a* of internal/external air 2-layer lever 124, and consequently, internal/external air 2-layer lever 124, and 2-layer partitioning door 88 and second internal/external air selection door 75 as well as a result, maintain the aforementioned positions.

In contrast, when temperature control input lever 110 is moved to the maximum heating position (FIG. 39), maximum heating input lever 119 rotates in the counterclockwise direction from the position in FIG. 40 to the position in FIG. 39. In response to this counterclockwise rotation of maximum heating input lever 119, output lever 99 rotates further in the counterclockwise direction.

As a result, pin 123 of output lever 99 goes outside the idling groove of engagement groove 124*a* of internal/external air 2-layer lever 124, causing internal/external air 2-layer lever 124 to rotate in the clockwise direction from the position in FIG. 40 to the position in FIG. 39. Consequently, 2-layer partitioning door 88 rotates in the counterclockwise direction, opening warm air bypass opening 87, and at the same time, partitioning warm air passage 17 into first air passage 80*a*(FIG. 13) on the external air side and second air passage 81*a*(FIG. 13) on the internal air side. Moreover, second internal/external air selection door 75 is moved to the position that opens second internal air introduction port 72 (the position indicated by the two-dot chain lines in FIG. 38) in linkage with 2-layer partitioning door 88. Therefore, the air-conditioning apparatus is set in the internal/external air 2-layer flow mode shown in FIG. 13.

As explained above, only when both conditions for the internal/external air 2-layer flow (i.e., (1) the blowout mode is set to the foot or defroster mode, and (2) temperature control is at the maximum heating position) are satisfied, pin 123 of output lever 99 goes outside the idling groove of engagement groove 124*a* of internal/external air 2-layer lever 124, setting internal/external air 2-layer lever 124 to the internal/external air 2-layer position in FIG. 39.

In Embodiment 10, since connecting rod 125 is an accessory to air-conditioning unit 10 and door lever 96 is an accessory to fan unit 70, the work of connecting cable 129 can be easily performed during the assembly process for integrating air-conditioning unit 10 with fan unit 70 (i.e., before installing units 10 and 70 in the vehicle).

By the way, as shown in FIG. 13, in the internal/external air 2-layer flow mode, 2-layer partitioning door 88 opens warm air bypass opening 87, thus reducing the air flow resistance to foot openings 24 and 90 for the front and rear seats. As a result, the air volume for the foot side increases compared to the volume that occurs when the mode is not set to the internal/external air 2-layer flow mode (i.e., during the normal mode), making this air volume inappropriate relative to the air volume on the defroster side.

Therefore, Embodiment 10 is designed such that second differential gear mechanism 98B can be used to maintain the ratio between the foot-side air volume and the defroster-side air volume at an appropriate level during the internal/external air 2-layer flow mode.

In second differential gear mechanism 98B, internal/external air 2-layer input lever 130 is fixed to the position in FIG. 40 when a mode other than the internal/external air 2-layer flow mode is set. The rotation of blowout mode input lever 131 of second differential gear mechanism 98B according to the blowout mode causes bevel gears 54 and 55 in FIG. 42 to revolve. This revolution causes bevel gear 58 on the output side and output lever 133, thereby causing blowout mode link 135 to rotate via connecting rod 134.

Defroster mode door 20, face door 23, and foot door 26 are opened or closed at the predetermined rotational angle positions of this blowout mode link 135, thus setting each blowout mode.

In contrast, when the internal/external air 2-layer flow mode is set as described above, internal/external air 2-layer input lever 130 rotates in the clockwise direction from the position in FIG. 40 to the position in FIG. 39, in linkage with the rotation of internal/external air 2-layer lever 124. During this process, since blowout mode input lever 131 on the revolution input side is stopped, the rotation of bevel gear 50*d* of input shaft 50*a* causes bevel gear 58 of output shaft 58*a* to rotate in the opposite direction (counterclockwise direction).

Consequently, output lever 133 of second differential gear mechanism 98B rotates in the counterclockwise direction from the position in FIG. 40 to the position in FIG. 39 by the same angle as internal/external air 2-layer input lever 130. Based on this rotation of output lever 133, the operation angles (opening) of defroster door 20 and foot door 26 are corrected as explained below.

Figure 43:
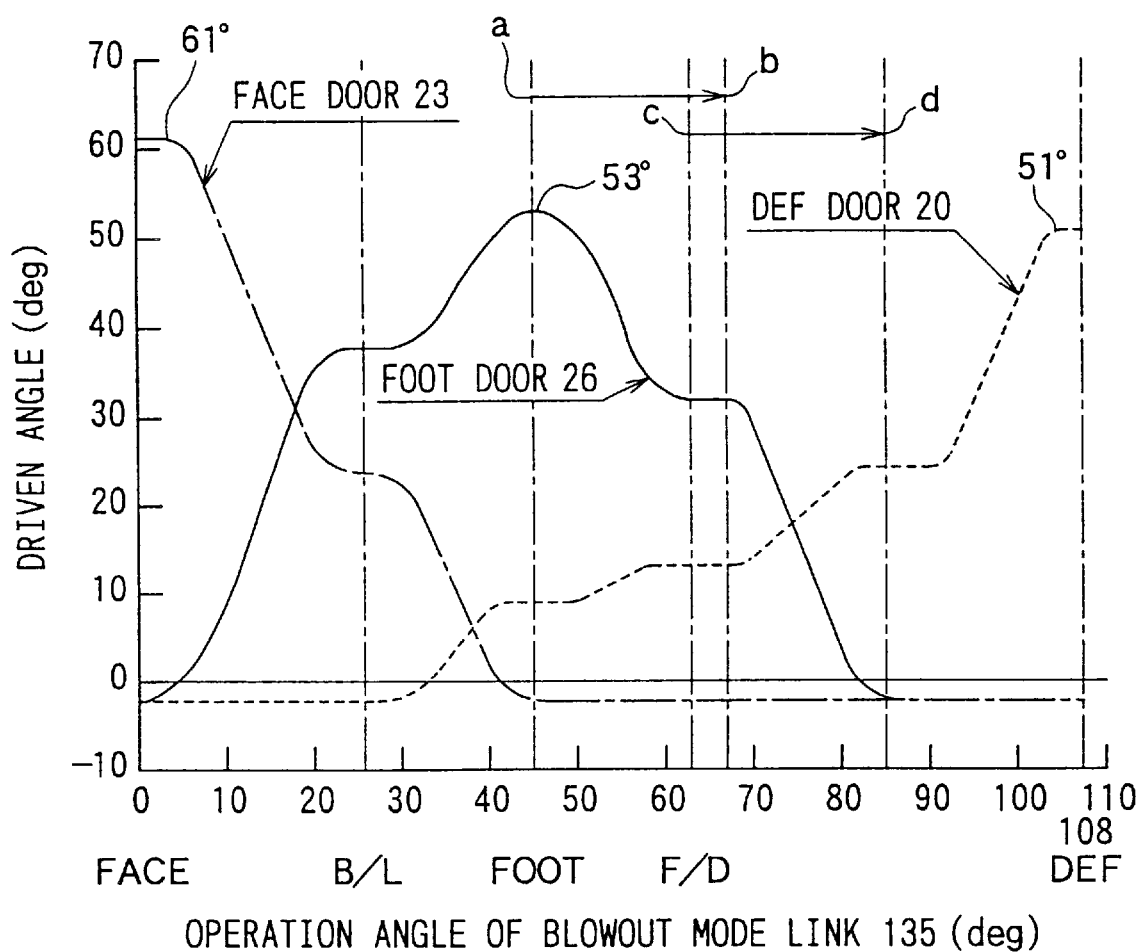
FIG. 43 is a diagram explaining the operation of a vehicle air conditioning apparatus according to the present invention.

That is, the driven angles on the vertical axis in FIG. 43 are the operation angles of defroster door 20, face door 23, and foot door 26, and the driving angles on the horizontal axis in FIG. 43 is the operation angle of blowout mode link 135.

The example in FIG. 43 is configured such that the foot mode gets set in the vicinity of the operation angle of blowout mode link 135=45°, and the foot defroster mode gets set in the vicinity of the operation angle of blowout mode link 135=63°. If the internal/external air 2-layer flow mode gets set during the foot mode, the rotation of internal/external air 2-layer input lever 130 of second differential gear mechanism 98B increases the drive angle of blowout mode link 135 from point a to point b by a predetermined angle (e.g., around 20°), thus increasing the operation angle (opening) of defroster door 20, and at the same time, decreasing the operation angle (opening) of foot door 26, thereby shifting the mode to the foot defroster mode.

If the internal/external air 2-layer flow mode gets set during the foot defroster mode, the drive angle of blowout mode link 135 increases from point c to point d by a predetermined angle (e.g., around 20°), thus increasing the operation angle (opening) of defroster door 20, and at the same time, setting the operation angle (opening) of foot door 26 to 0, thereby shifting foot door 26 to the position that completely closes foot opening 24. In other words, the mode is shifted from the foot defroster mode to the defroster mode.

Therefore, even if 2-layer partitioning door 88 opens warm air bypass opening 87 during the internal/external air 2-layer flow mode, reducing the air flow resistance to foot openings 24 and 90 for the front and rear seats, the opening of foot opening 24 is reduced in linkage with the setting of the 2-layer flow mode, and therefore the foot-side air volume can be prevented from increasing. As a result, even in the internal/external air 2-layer flow mode, the ratio between the foot-side air volume and the defroster-side air volume can be maintained at an appropriate level.

Note that in Embodiment 10, the increase in the foot-side air volume is prevented by correcting the operation angle (opening) of defroster door 20 and foot door 26 itself during the internal/external air 2-layer flow mode. However, if a dedicated air volume adjustment door for suppressing the increase in the foot-side air volume during the internal/external air 2-layer flow mode is added, second differential gear mechanism 98B can be abolished.

In Embodiment 10, connecting rod 125 connected to 2-layer partitioning door 88 is connected to second internal/external air selection door 75 via cable 129. However, it is also possible to position first and second differential gear mechanisms 98A and 98B as well as the linking mechanisms connected to them on the side surface on the passenger side inside case 11 of air-conditioning unit 10, and to use a different link to directly connect second internal/external air selection door 75 to the linking area (connecting rod 125, etc.) for opening and closing 2-layer partitioning door 88. In this way, cable 129 can be eliminated.

Figure 44:
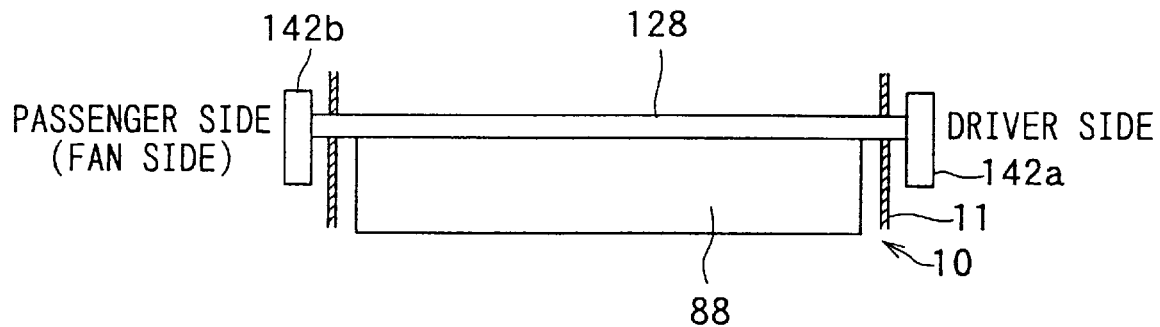
FIG. 44 is a diagram explaining a modified example of a vehicle air conditioning apparatus according to the present invention.

As another modified example, it is also possible to use rotation shaft 128 of 2-layer partitioning door 88 simplify the operation mechanism of second internal/external air selection door 75, as shown in FIG. 44. In the example in FIG. 44, the tips of rotation shaft 128 are protruded to both sides (the driver side and the passenger side) inside case 11 of air-conditioning unit 10, and door lever 142a for driving 2-layer partitioning door 88 is provided on the driver-side tip of rotation shaft 128.

In contrast, door lever 142b for driving second internal/external air selection door 75 is provided on the passenger-side tip of rotation shaft 128, and this door lever 142b is connected to door lever 96 (FIG. 38) of second internal/external air selection door 75 via an appropriate link (not shown in the figure).

With this configuration, it is possible to install door lever 142b for driving second internal/external air selection door 75 on the passenger-side (the fan side) of case 11, using the length of rotation shaft 128 in the axial direction, and therefore second internal/external air selection door 75 can be opened and closed in linkage with 2-layer partitioning door 88, using a simple link and without using cable 129.

Also, in Embodiment 10, both first and second differential gear mechanisms 98A and 98B are concentrated on the side surface on the driver side inside case 11 of air-conditioning unit 10. However, it is also possible to adopt a distributed layout, in which the mechanism (differential gear mechanism) for opening and closing second internal/external air selection door 75 is positioned in fan unit 70, as in Embodiment 5, for example, and the drive mechanism for 2-layer partitioning door 88 and the blowout mode door opening control mechanism for controlling the air volume ratio are positioned on the side surface on driver side inside case 11 of air-conditioning unit 10.

In this distributed layout, it is possible to supply the blowout mode input and temperature control (air mix) input to the opening/closing mechanism of second internal/external air selection door 75 from the air-conditioning unit 10 side. However, it is also possible to transmit the operational shift of blowout mode setting lever 31' of air-conditioning operation panel 30 and the operational shift of temperature control lever 33' to the opening/closing mechanism of second internal/external air selection door 75 via cables 102 and 108, as in Embodiment 5.

Embodiment 11 relates to an improvement to Embodiment 1. In Embodiment 1, as shown in FIG. 9, when blowout mode knob 31 of air-conditioning operation panel 30 is set to the Auto position, the opening of air-mix door 16 is increased as the drive angle of motor 44 increases, and at the same time, the blowout mode is sequentially and automatically switched from the face mode, to the bi-level mode, and then to the foot mode.

In contrast, when blowout mode knob 31 of air-conditioning operation panel 30 is set to the defroster position, movable lever 41 is used to cause bevel gears 54 and 55 of differential gear mechanism 53 to rotate (revolution and autorotation), thereby rotating bevel gear 58 and second output shaft 58a by angle $\theta^1$ ($\theta^1$ is greater than angle $\theta$ in the Auto mode), and in this way, the defroster mode can be manually set when desired.

Consequently, according to Embodiment 1, the only blowout mode that can be manually set is the defroster mode, and other blowout mode cannot be manually set.

Therefore, the objectives of Embodiment 11 are to secure an auto control function that achieves both the opening control of the air-mix door (temperature control means) and the blowout mode auto switching function according to Embodiment 1 in linkage, using a single motor actuator, and additionally to allow the manual setting of modes other than the defroster mode as desired, as in ordinary vehicular air-conditioning apparatuses.

FIG. 45A shows the flow in which air-mix door 16 (temperature control means) and the entire operation mechanism of blowout mode doors 20, 23, and 26 operate in linkage, and FIG. 45B shows a configuration overview of said operation mechanism.

Motor actuator 40 has drive motor 44, and the rotation of output shaft 44a of motor 44 is input into differential gear mechanism 53 via gears 48' and 49'. In this example, the reduction ratio between gears 48' and 49' is set to 0, and thus the rotation of motor 44 is input into differential gear mechanism 53 without any reduction in speed. However, it is of course possible to reduce the rotation of motor 44 using gears 48' and 49'.

Figure 46:
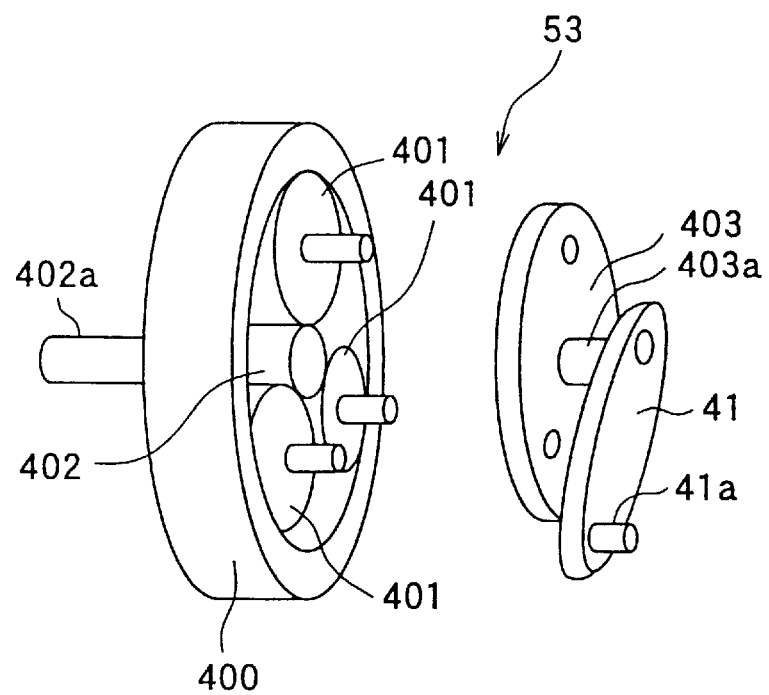
FIG. 46 is a perspective diagram of the planetary gear mechanism used in the door operation mechanism of a vehicle air conditioning apparatus according to the present invention.

Differential gear mechanism 53 is comprised of the planetary gear mechanism shown in FIG. 46. This differential (planetary) gear mechanism 53 has the same configuration as that in FIG. 34, and like symbols indicate like components. Gear 49' and air-mix link 150 are integrally provided on rotation shaft 402a of sun gear 402 of differential (planetary) gear mechanism 53, and the rotation of gear 49' rotates rotation shaft 402a and air-mix link 150 together. The rotation of air-mix link 150 is transmitted to rotation shaft 16a of air-mix door 16 inside case 11 via connecting rod 151 and air-mix door lever 152.

In differential (planetary) gear mechanism 53, rotation shaft 403a is provided on platter-shaped carrier component 403 which rotatably supports planetary gears 401 and causes planetary gears 401 to revolve. This rotation shaft 403a is integrally connected to one end of blowout mode input lever 41, and this blowout mode input lever 41 is used to rotate carrier component 403, thereby causing planetary gears 401 to revolve.

Here, blowout mode input lever 41 is equivalent to movable lever 41 in Embodiment 1, and pin 41a on the other end of blowout mode input lever 41 is connected to blowout mode knob 31 of air-conditioning operation panel 30 (see FIGS. 49 and 50 described below) via a cable, etc. (not shown in the figure but equivalent to cable 37 in FIG. 3).

Figure 47:
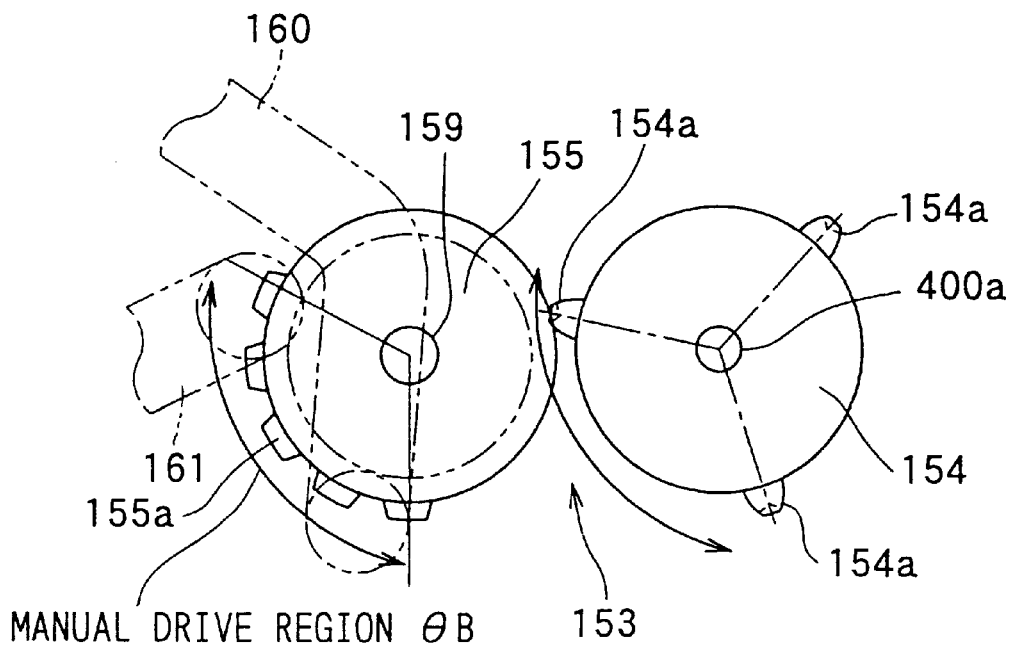
FIG. 47 is a front view of the intermittent gear mechanism used in the door operation mechanism of a vehicle air conditioning apparatus according to the present invention.

FIG. 47 shows intermittent gear mechanism 153. Input-side gear 154 has three teeth 154a which are provided at a spacing of 1200; and every time input-side gear 154 rotates by 120°, it rotates output-side gear 155 by 30°. On the outside perimeter of output-side gear 155, five teeth 155a are provided only within the range of operation angle $\theta^B$ in the manual drive region.

Figure 48:
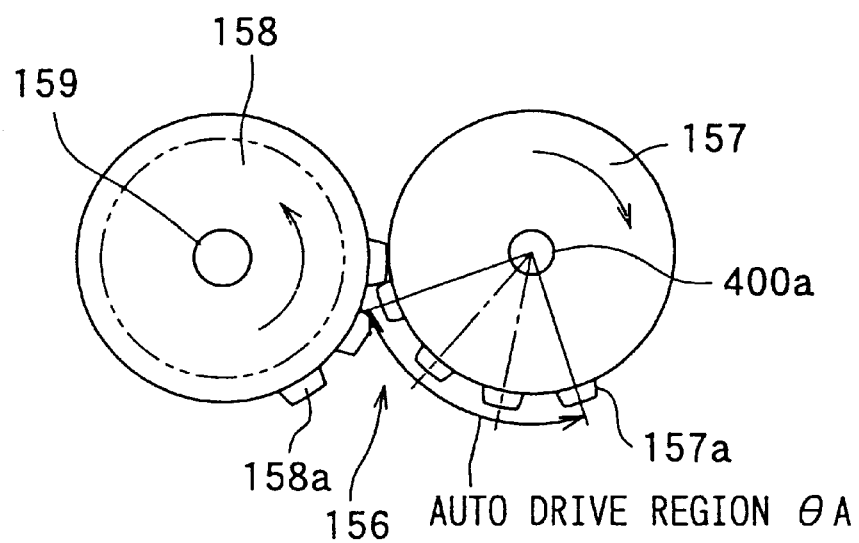
FIG. 48 is a front view of the interlocking gear mechanism used in the door operation mechanism of a vehicle air conditioning apparatus according to the present invention.

FIG. 48 shows interlocking gear mechanism 156. Input-side gear 157 is provided with four teeth 157a only within the auto drive region $\theta^A$ which is set within a predetermined angle (90° in this example); and input-side gear 157 rotates output-side gear 158 only within this auto drive region $\theta^A$. Therefore, only three teeth 158a are provided on the outside perimeter of output-side gear 158.

Here, input-side gears 154 and 157 of both gear mechanisms 153 and 156 are stacked in the axial direction and are integrally connected to rotation shaft 400a of internal gear 400 of differential (planetary) gear mechanism 53, and rotate together with the rotation of internal gear 400. Output-side gears 155 and 158 of both gear mechanisms 153 and 156 are also stacked in the axial direction and are integrally connected to a common rotation shaft 159. Two connecting rods 160 and 161 are connected to either output-side gear 155 or 158 (to output-side gear 155 in this example), and output-side gear 155 is connected to blowout mode link 135 via these connecting rods 160 and 161.

This blowout mode link 135 is the same as that shown in FIGS. 39 and 40, has three engagement grooves (linking grooves) for rotating blowout mode doors 20, 23, and 26, and the pin lever mechanisms of blowout mode doors 20, 23, and 26 engage with these engagement grooves. Therefore, the rotation of blowout mode link 135 can be used to rotate blowout mode doors 20, 23, and 26 inside case 11.

Figure 49:
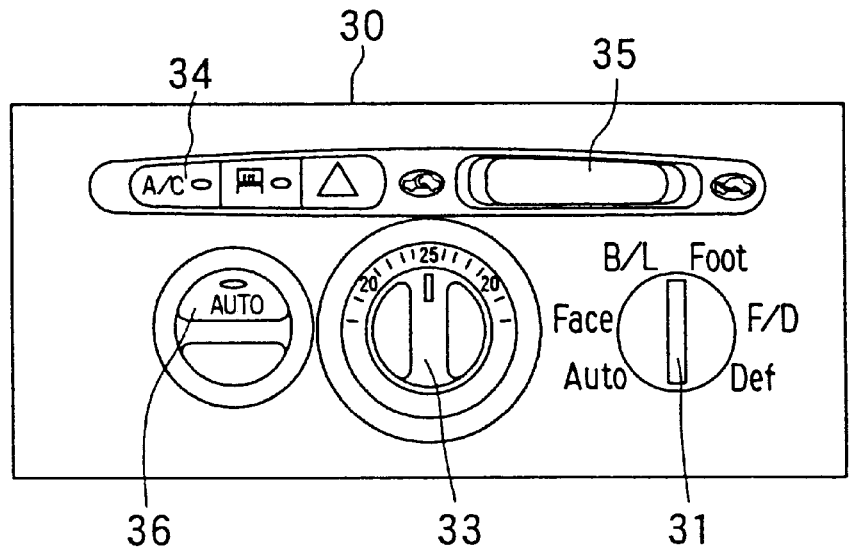
FIG. 49 is a front view of the air-conditioning operation panel of a vehicle air conditioning apparatus according to the present invention.

FIG. 49 shows a specific example of air-conditioning operation panel 30. Blowout mode knob 31 is a rotatable operation component, and, in linkage to the change in the opening of air-mix door 16, can be rotated to set the blowout mode to the Auto mode position, the face mode position, the bi-level mode position, the foot mode position, the foot defroster mode position, or the defroster mode position.

Figure 50:
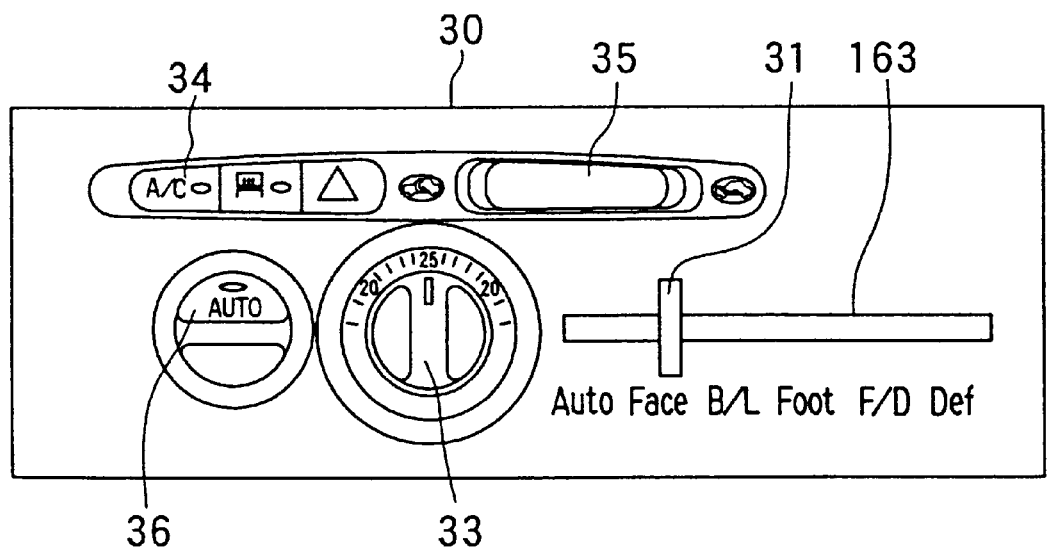
FIG. 50 is a front view showing another example of the air-conditioning operation panel of a vehicle air conditioning apparatus according to the present invention.

As in FIG. 2, air-conditioning operation panel 30 is provided with blowout mode knob 31, as well as temperature setter 33 having a rotatable knob, push-button type air-conditioner switch 34, push-button type internal/external air selection switch 35, and fan switch 36 having a rotatable knob, etc. Note that blowout mode knob 31 is not limited to the rotatable operation component, and can be a lever operation component that can be slid along guiding groove 163 as shown in FIG. 50.

Next, the operation of Embodiment 11 will be explained. First, a case will be explained, in which blowout mode knob 31 is set to the Auto position on air-conditioning operation panel 30. In this case, as blowout mode knob 31 is moved to the Auto position, carrier component 403 of differential (planetary) gear mechanism 53 rotates. Since sun gear 402 is stopped if motor 44 is stopped, planetary gears 401 autorotate while revolving around sun gear 402.

Internal gear 400 and both input-side gears 154 and 157 then together rotate to the positions that correspond to this revolution of planetary gears 401. FIGS. 47 and 48 show the rotational positions of both input-side gears 154 and 157 when blowout mode knob 31 is set to the Auto position.

In the aforementioned state, by controlling the rotational angle of sun gear 402 by controlling the rotational angle of motor 44, the blowout mode is automatically switched as described below, in linkage with the change in the opening of air-mix door 16. In Embodiment 11, as in Embodiment 1, the operation (rotational) angle of motor 44 is determined according to the target air-mix door opening SW computed by air-conditioning electronic control device 710.

More specifically speaking, in this example, sun gear 402, i.e., air-mix link 150, is designed to rotate by 180° between SW=0% (the maximum cooling position) and 100% (the maximum heating position), and the 180° rotation of sun gear 402 is designed to be extracted from internal gear 400 as rotation having an operation angle=90° (operation angle $\theta^A$ in the auto drive region in FIG. 48), through reduction in the planetary gear mechanism.

When input-side gear 157 (FIG. 48) which is integrated with internal gear 400 rotates within the range of "operation angle of internal gear 400=90°," output-side gear 158 rotates in response to the rotation of input-side gear 157. This rotation of output-side gear 158 is transmitted to blowout mode link 135 via connecting rods 160 and 161, and the rotation of this blowout mode link 135 drives blowout mode doors 20, 23, and 26, thus sequentially switching the blowout mode from Face, to B/L, and to Foot as the opening of air-mix door 16 changes from 0% to 100%. This blowout mode switching is shown in the Auto region on the right edge of FIG. 51.

Figure 51:
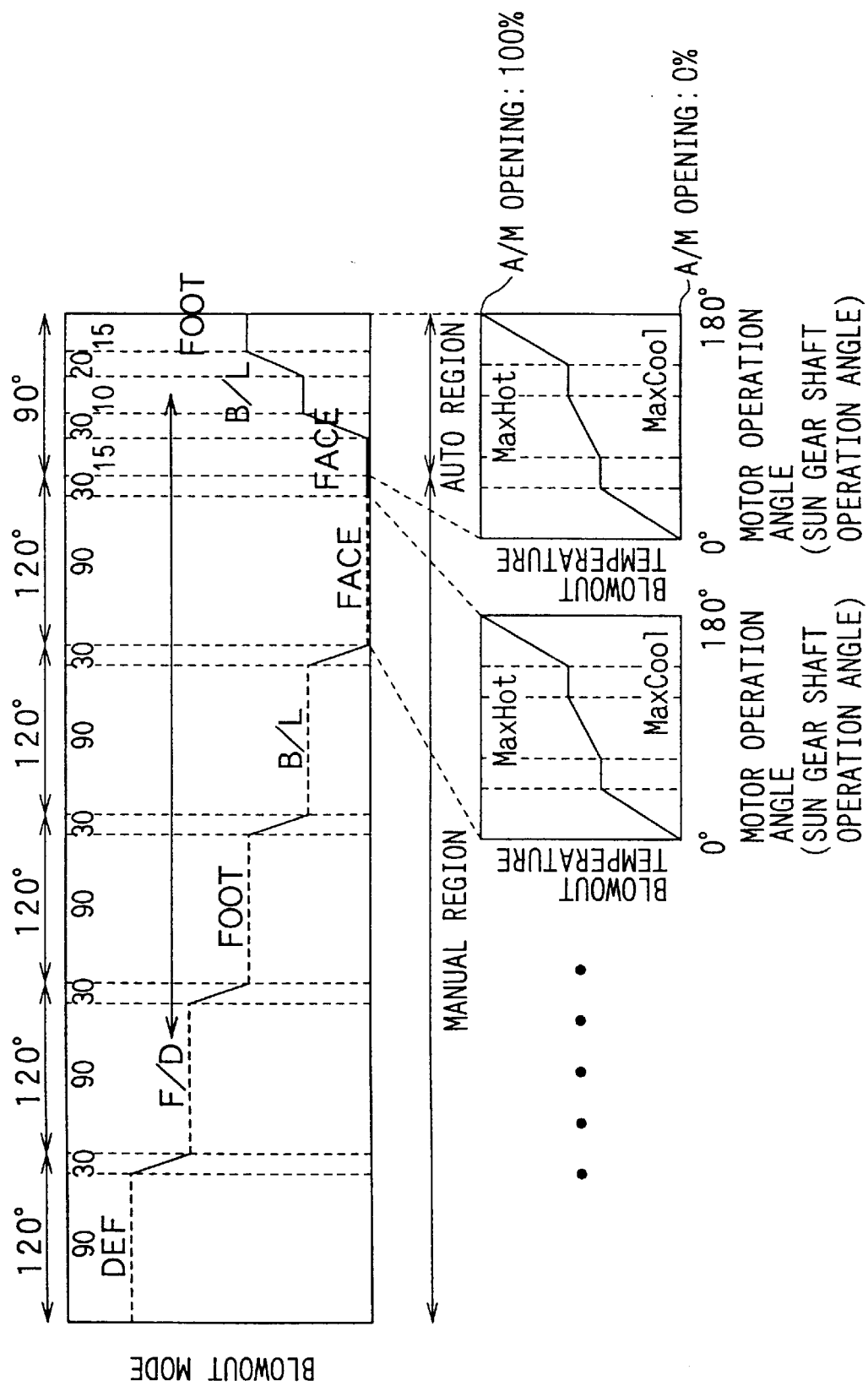
FIG. 51 is an operational characteristics diagram of a vehicle air conditioning apparatus according to the present invention.

Meanwhile, the rotation of air-mix link 150, which rotates together with sun gear 402, is transmitted to air-mix door 16 via connecting rod 151 and door lever 152, and the opening of air-mix door 16 changes between 0% and 100% as shown on the bottom of the right edge of FIG. 51.

Furthermore, since air-mix link 150 rotates within the range of operation angle=180° (twice the operation angle of internal gear 400), this operation angle=180° can be utilized to fine-tune the opening of air-mix door 16. Therefore, the resolution of blowout temperature control becomes fine, making it possible to control the blowout temperature well without causing hunting.

Note that, as is clear from the top and bottom diagrams on the right edge of FIG. 51, blowout switching by means of blowout mode doors 20, 23, and 26 and the adjustment of the opening of air-mix door 16 are alternately performed. This alternate drive can be realized by alternately forming the idling groove in the engagement groove of blowout mode link 135 and the idling groove in the engagement groove of air-mix link 150 (or air-mix door lever 152).

Next, the manual setting of blowout modes will be explained. When blowout mode knob 31 is moved from the Auto position to one of the blowout mode in air-conditioning operation panel 30, carrier component 403 of differential (planetary) gear mechanism 53 rotates to the position that corresponds to the operation position of this blowout mode knob 31. In this case, since sun gear 402 is stopped if motor 44 is stopped, planetary gears 401 autorotate while revolving around sun gear 402, and as a result, internal gear 400 and both input-side gears 154 and 157 together rotate to the positions that correspond to the revolution of planetary gears 401.

Here, if blowout mode knob 31 is set to a blowout mode other than the Auto position, teeth 157a of input-side gear 157 of interlocking gear mechanism 157[sic, should be 156] rotate to positions that do not engage with teeth 158a of output-side gear 158, and thus the rotation of input-side gear 157 is not transmitted to output-side gear 158.

On the other hand, if blowout mode knob 31 is moved from the Auto position to a position between the Face mode and the Defroster mode in air-conditioning operation panel 30, interlocking gear mechanism 157[sic, should be 156] causes teeth 155a of output-side gear 155 of intermittent gear mechanism 153 to rotated to positions that engage with teeth 154a of input-side gear 154. Therefore, if input-side gear 154 of intermittent gear mechanism 153 is rotated by a predetermined angle (120° in this example) by moving blowout mode knob 31 to a different mode position, output-side gear 155 rotates by a predetermined angle (30° in this example) every time input-side gear 154 rotates by 1200.

The rotation of this output-side gear 155 is transmitted to blowout mode link 135 via connecting rods 160 and 161, and the rotation of this blowout mode link 135 drives blowout mode doors 20, 23, and 26, thereby switch the blowout mode.

Operation angle OB in the manual drive region of output-side gear 155 shown in FIG. 47 is 30°×5=150° in this example.

By the way, the aforementioned manual switching of blowout modes can be performed while sun gear 402 is held stationary. This means that the blowout mode can be switched while keeping the opening of air-mix door 16 constant to keep the blowout temperature constant. Therefore, the need for resetting temperature setter 33 every time the blowout mode is manually set, is eliminated.

To adjust the blowout temperature after manually setting a blowout mode, temperature setter 33 can be used to change the value of the target air-mix door opening SW to change the operation (rotation) angle of motor 44. This change in the operation angle of motor 44 causes air-mix link 150 to rotate, adjusting the opening of air-mix door 16, and thus the blowout temperature.

In this case, sun gear 402 rotates together with air-mix link 150. Although the maximum operation angle of sun gear 402 is 180°, the operation angle of internal gear 400 is reduced by ½ to 90°, and input-side gear 154 of intermittent gear mechanism 153 rotates within this 90-degree operation angle. However, since input-side gear 154 is provided with idling angles (120°−30°=90°), in which teeth 154a of input-side gear 154 do not drive output-side gear 155, output-side gear 155 does not rotate even when input-side gear 154 rotates by the aforementioned 90o operation angle. Therefore, the opening of air-mix door 16 can be adjusted to adjust the blowout temperature, while keeping the blowout mode constant.

In the manual region in FIG. 51, the characteristics of blowout temperature control below the Face mode show the characteristics for adjusting the opening of air-mix door 16 while keeping the blowout mode constant as described above. Note that, in the manual region in FIG. 51, the dotted-line area of each blowout mode indicates that the blowout mode is held constant by the idling angle (=90°) of input-side gear 154.

Furthermore, Embodiment 11 offers an advantage in that the blowout mode switching linking mechanism can be made compact as explained below by combining differential (planetary) gear mechanism 53 and intermittent gear mechanism 153. That is, even when the operation angle of air-mix link 150 (sun gear 402) is set to a large value of 180° for adjusting the blowout temperature in each mode, the operation angle of internal gear 400 (input-side gears 154 and 157) can be reduced through speed reduction by differential (planetary) gear mechanism 53. Therefore, the operation angle of output-side gear 155 in the Auto region can be held down to 90°.

Moreover, in the dotted-lined 90° area in each mode in the manual region, output-side gear 155 can be maintained in a stopped state by means of the idling angle of intermittent gear mechanism 153. Consequently, the total operation angle of output-side gear 155 in the manual region is 30°×5=150°. Therefore, the total operation angle of output-side gear 155 in the Auto region and the manual region can be set to 90°+150°=240°. As a result, the operation mechanism for blowout mode doors 20, 23, and 26 can be made compact.

Figure 52:
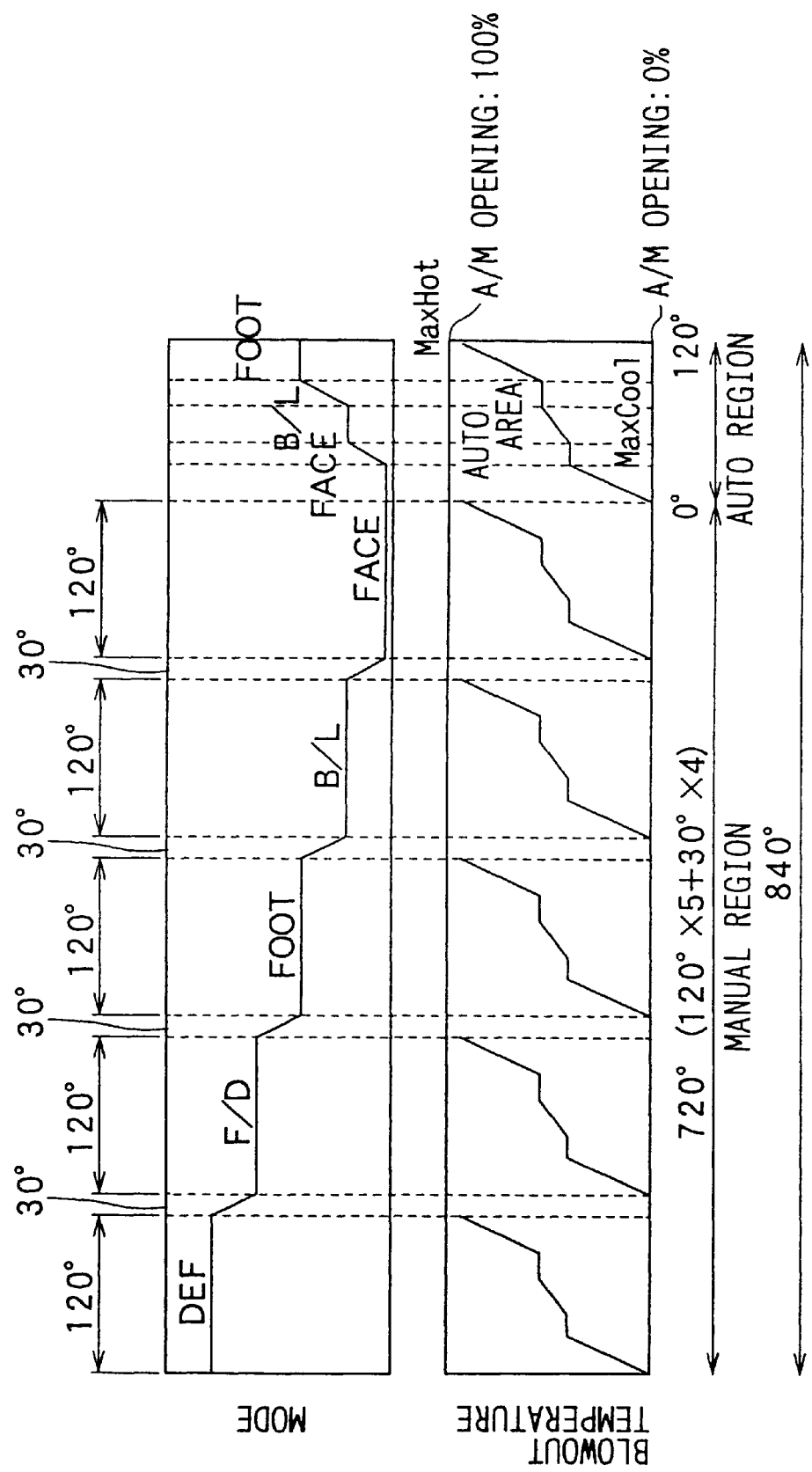
FIG. 52 is an operational characteristics diagram of the comparison example for Embodiment 11 of a vehicle air conditioning apparatus according to the present invention.

In contrast, FIG. 52 shows a comparison example, in which (1) no speed reduction is performed by differential (planetary) gear mechanism 53, and (2) no idling angles are set in intermittent gear mechanism 153. Consequently, in this comparison example, if the required operation angle in the Auto region is set to 120°, the angle in the manual region becomes 120°×5°+30°×4=720°, and the total required operation angle for the Auto region and the manual region becomes 840°. As a result, it becomes difficult to create an operation mechanism for blowout mode doors 20, 23, and 26.

FIG. 53 shows a specific design example of differential (planetary) gear mechanism 53 according to Embodiment 11. In *1 in FIG. 53, the operation angle of output-side gear 155 becomes 30°×5°=150° because idling angles are set in intermittent gear mechanism 153. *2 indicates the autorotation angle of planetary gears 401, and in response to this autorotation angle (400°), the operation angle of blowout mode input lever 41 can be 80°, resulting in 5X acceleration.

Figure 54A:
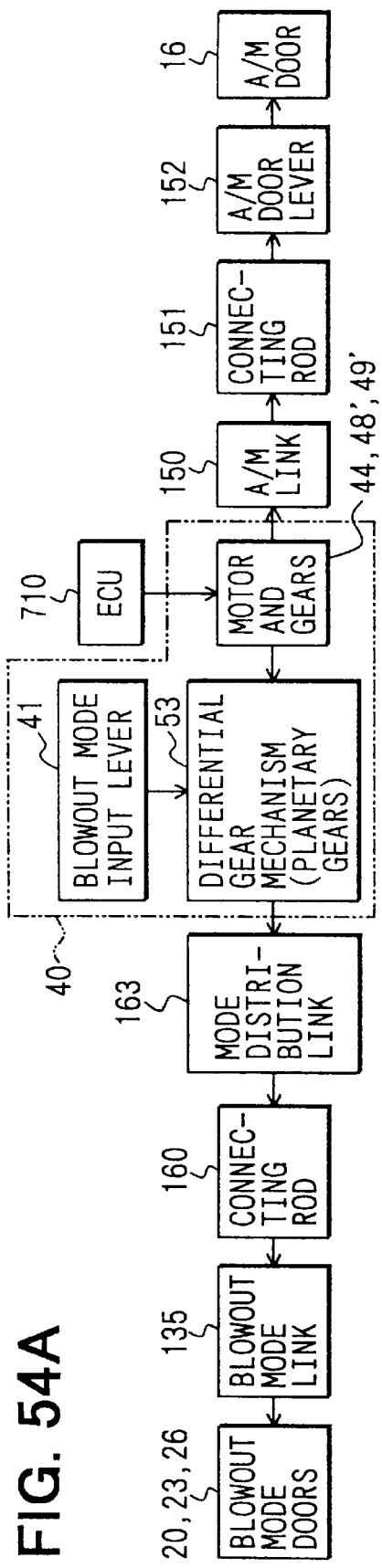
FIG. 54A is a diagram explaining the interlocked flow of the door operation mechanism of Embodiment 12 of a vehicle air conditioning apparatus according to the present invention.
Figure 54B:
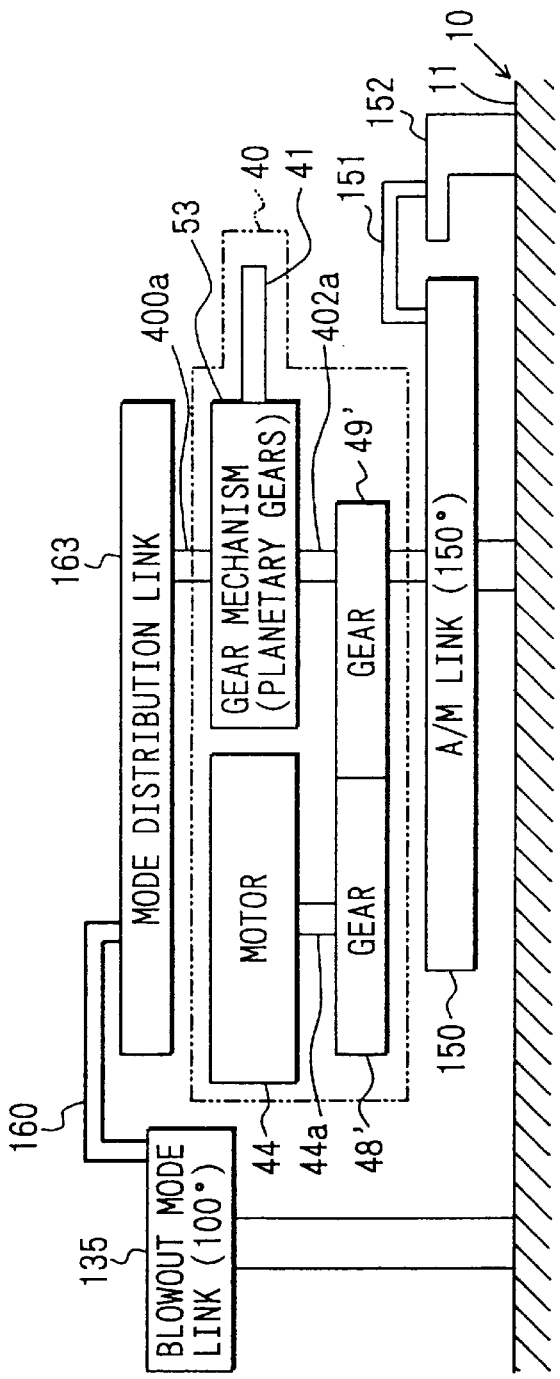
FIG. 54B is a schematic diagram of the door operation mechanism of a vehicle air conditioning apparatus according to the present invention.

Embodiment 12 is a modified case of Embodiment 11. As shown in FIG. 54, shaft 400a of internal gear 400 of differential (planetary) gear mechanism 53 is connected to a single blowout mode distribution link 163, such that the rotation of internal gear 400 directly rotates blowout mode distribution link 163.

Figure 55:
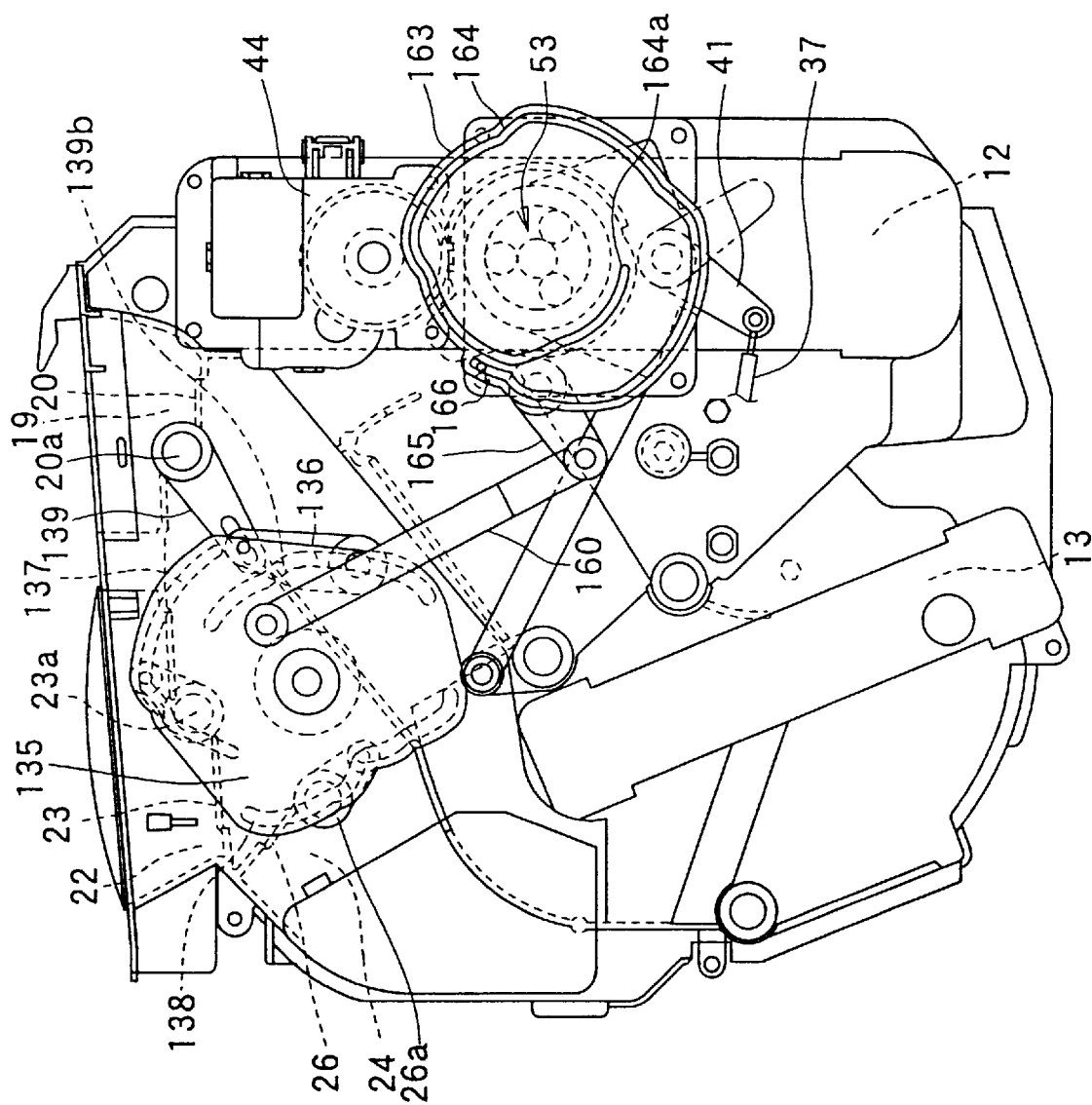
FIG. 55 is a front view of the air-conditioning unit in which the door operation mechanism according to Embodiment 12 is installed for a vehicle air conditioning apparatus according to the present invention.
Figure 56:
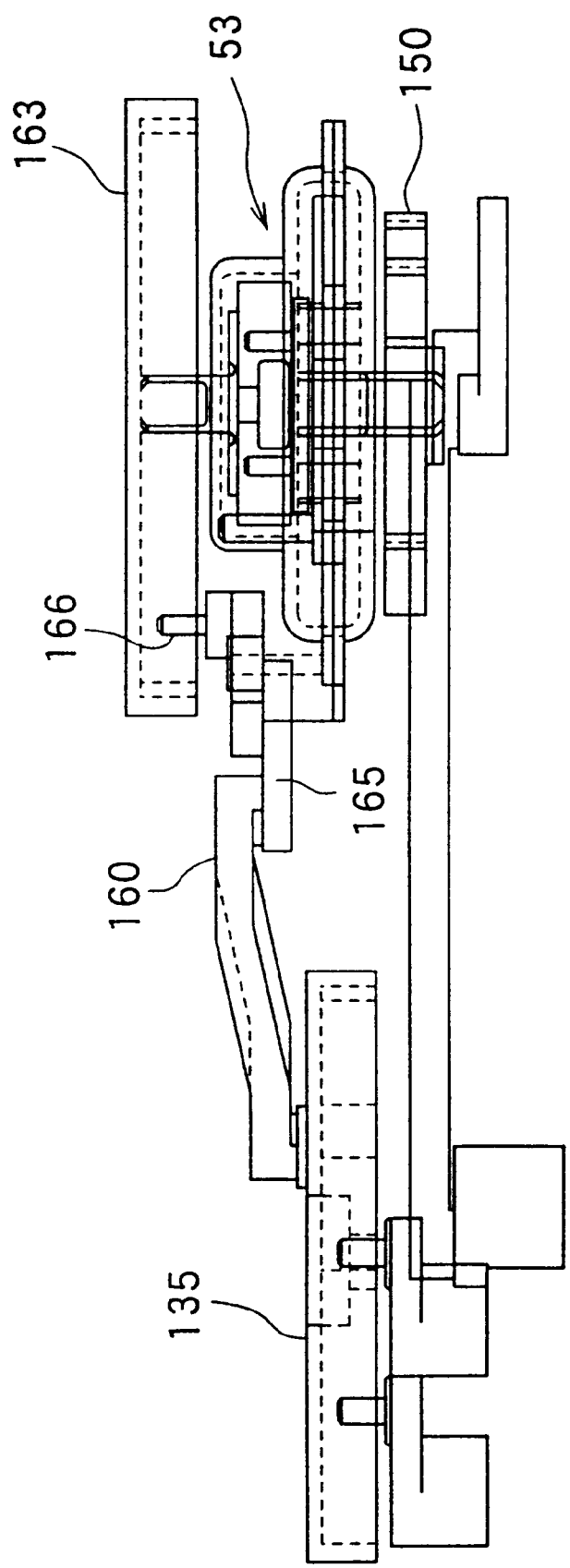
FIG. 56 is a side view of major areas in FIG. 55 for a vehicle air conditioning apparatus according to the present invention.

FIGS. 55 and 56 show specific examples in which Embodiment 12 has been applied to air-conditioning unit 10. Blowout mode distribution link 163 has an approximate platter shape, has engagement groove 164 formed along its external edge, and at the same time, has one end 164a of engagement groove 164 formed in a spiral manner reaching toward the center.

Pin 166 on one end of intermediate lever 165 is slidably fitted into this engagement groove 164, and the other end of intermediate lever 165 is connected to blowout mode link 135 via connecting rod 160. Blowout mode link 135 is the same as those in FIGS. 39 and 40, has three engagement grooves 136, 137, and 138 which correspond to three blowout mode doors 20, 23, and 26; and blowout mode doors 20, 23, and 26 are opened and closed via pin lever mechanisms that individual fit in these three engagement grooves 136, 137, and 138.

To alternately drive air-mix door 16 and blowout mode doors 20, 23, and 26, multiple idling grooves and drive grooves are alternately formed in engagement groove 164 of blowout mode distribution link 163. In this way, the idling functions for stopping the drive of the blowout mode doors can be concentrated on the side of distribution link 163. As a result, there is no need to provide idling functions for alternately driving on the side of blowout mode link 135, blowout mode link 135 can be made compact by shortening engagement grooves 136, 137, and 138, and at the same time, the operation angle of blowout mode link 135 can be made small. In this example, the operation angle of blowout mode link 135 is set to 100°.

In FIG. 55, cable 37 connects blowout mode knob 31 of air-conditioning operation panel 30 (FIGS. 49 and 50) to blowout mode input lever 41 of differential (planetary) gear mechanism 53.

Embodiment 12 has a configuration in which blowout mode distribution link 163 is directly connected to rotation shaft 400aof internal gear 400, without using intermittent gear mechanism 153 and interlocking gear mechanism 156 used in Embodiment 11, and thus the overall configuration can be simplified. On the other hand, the effect of operation angle reduction of output-side gear 155 by the idling angle of intermittent gear mechanism 153 cannot be obtained.

Figure 57:
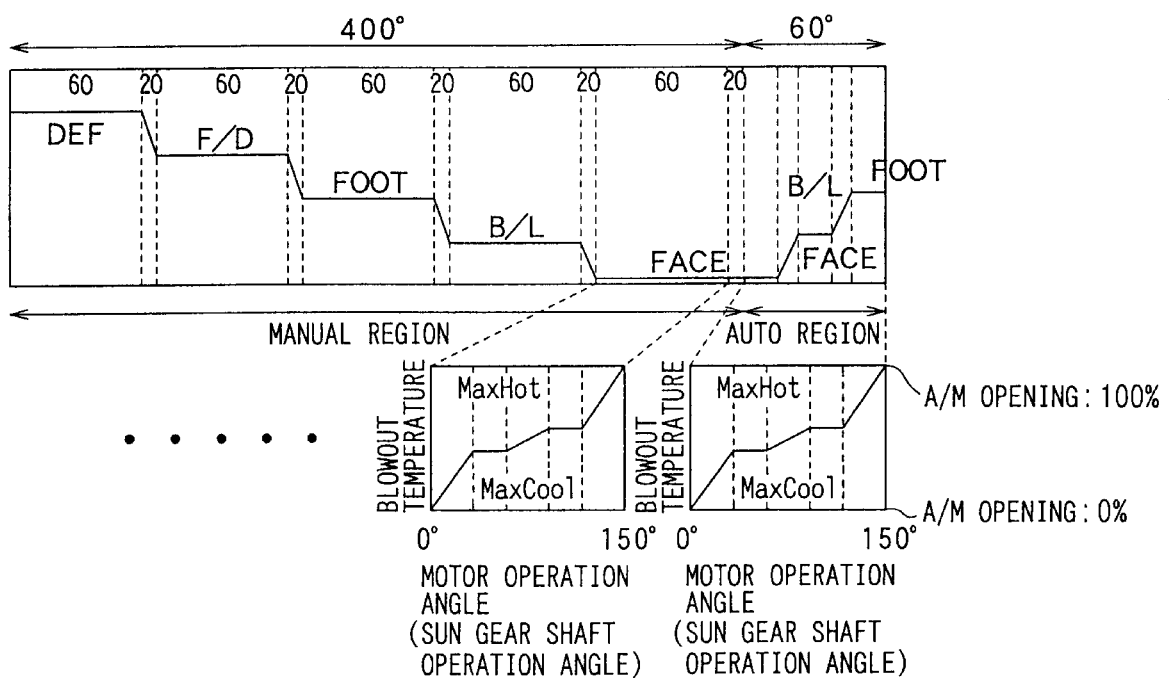
FIG. 57 is an operational characteristics diagram for a vehicle air conditioning apparatus according to the present invention.

Therefore, in Embodiment 12, as shown in FIG. 57, the motor operation angle for adjusting the opening of air-mix door 16, i.e., the operation angle of sun gear 402 (air-mix link 150) is reduced from 180° used in Embodiment 11 to 150°, and based on this, the operation angle of internal gear 400 (distribution link 164[sic. should be 163]) in the Auto region is reduced from 90° used in Embodiment 11 to 60°.

Based on the above, the total operation angle of distribution link 163 is set to 460°=60° in the Auto region +400° in the manual region.

(1) In Embodiment 1, stoppers 42h and 42i are provided in actuator case 42 as stopper means for restricting the operation range (β) of movable lever 41. However, it is also possible to install these stopper means on the side of air-conditioning operation panel 30.

(2) In each of the aforementioned embodiment, air-mix door 16 (83 or 84), which adjusts the ratio between the air passing through cool air bypass passage 15 and the air passing through heater core 13, is used as a means of adjusting the temperature [of the air] blown into the cabin. However, it is also possible to use a warm water valve, etc., which adjusts the volume of the warm water passing through heater core 13, as the temperature control means.

(3) In each of the aforementioned embodiment, differential gear mechanisms 53 or 98 is used to create a relative positional shift between first and second output shafts 50a and 58a. However, it is also possible to use a differential friction mechanism, which can transmit force based on a frictional force, instead of a differential gear mechanism, to create a relative positional shift between first and second output shafts 50a and 58a.

(5[sic]) The application of the motor actuator according to the present invention is not limited to the vehicular air-conditioning apparatuses according to the aforementioned embodiments, and can be applied to the driving of slave components in a wide variety of fields.

(6) A case in which two revolving bevel gears 54 and 55 are installed in differential gear mechanisms 53 and 98 was explained. However, it is also of course possible to provide three or more revolving bevel gears 54 and 55. In differential gear mechanism 98 in Embodiments 5 and 6, an example was explained in which the gear ratio between bevel gears 50d and 58 on the two shafts 50a and 58a is set to 1:1. However, it is also possible to set this gear ratio to a value other than 1:1.

(7) In Embodiments 5 and 6, it is also possible to form part of cases 42 and 43 of differential gear mechanism 98 integrally with resin case 70a of fan unit 70.

(8) In Embodiments 5 and 6, a case in which internal/external air selection doors 74 and 75 are comprised of rotatable plate-shaped doors was explained. However, it is also possible to configure internal/external air selection doors 74 and 75 using known rotary doors, sliding doors, film-type doors, etc.

(9) Two-layer partitioning door 88 explained in Embodiment 5 is designed to get set to the 2-layer flow partitioning position (the position that opens warm air bypass opening 87) shown in FIG. 13 when the following two conditions are satisfied: (1) the blowout mode is set to the foot mode or the defroster mode, and (2) the temperature control means, such as air-mix doors 16, 83, or 84, is at the maximum heating position. Therefore, it is also possible to open and close 2-layer partitioning door 88, using differential gear mechanism 98 which uses both blowout mode input lever 100 and temperature control input lever 200 for inputs in the same way as second internal/external air selection door 75 does.

(10) In each embodiment, a case in which blowout mode doors 20, 23, and 26 are comprised of rotatable doors, was explained. However, it is also possible to configure the blowout mode doors as a single door using a known rotary door, a film-type door, etc.

While the above-described embodiments refer to examples of usage of the present invention, it is understood that the present invention may be applied to other usage, modifications and variations of the same, and is not limited to the disclosure provided herein.

What is claimed is:

1. A vehicular air-conditioning apparatus for a vehicle, comprising:
   a temperature control means for controlling air temperature of air blown to an interior of a vehicle;
   a face opening for blowing out air toward a head of a vehicle occupant in a cabin of the vehicle;
   a foot opening for blowing air toward feet of the vehicle occupant in the cabin;
   defroster openings for blowing out air to vehicular window glass of the vehicle;
   blowout mode doors for opening/closing the face opening, foot opening and defroster openings;
   wherein at least a face mode for blowing out air from the face opening, a foot mode for blowing out air from the foot opening, and a defroster mode for blowing out air from the defrosters openings can be selected and switched;
   a drive motor,
   a first output shaft which receives rotation from the drive motor;
   a second output shaft which receives the rotation from the first output shaft; and
   a differential mechanism positioned between the first output shaft and second output shaft that adjusts relative positions of the first output shaft and second output shaft;
   an operation component that operates the differential mechanism;
   wherein the temperature control means is connected to the first output shaft, the blowout mode doors are connected to the second output shaft, when the operation component is being set to the Auto blowout mode, the rotation of the drive motor rotates the first output shaft and the second output shaft at the same time, the rotation of the drive motor being transmitted to the first output shaft and the second output shaft through the differential mechanism;
   wherein the rotation of the first output shaft controls the temperature control means, and the rotation of the second output shaft drives the blowout mode doors to switch between a face mode and a foot mode; and
   wherein the differential mechanism is activated while the first output shaft is stationary when the operation component is being set to the defroster blowout mode while the drive motor is stopped to set the defroster mode by rotating the second output shaft and shift the relative positions of the first and second output shaft.

2. A vehicular air-conditioning apparatus as claimed in claim 1, wherein the defroster mode is maintained even when the second output shaft rotates within a predetermined angle during the defroster mode.

3. A vehicular air-conditioning apparatus as claimed in claim 1, wherein the first output shaft is positioned on one side of an axial direction of the differential mechanism and the second output shaft is positioned on an opposite side of the differential mechanism along the axial direction.

4. A vehicular air-conditioning apparatus as claimed in claim 1, further comprising a stopper means that restricts the rotation angle of the second output shaft to a predetermined range when the second output shaft is rotated by moving the operation component to the defroster blowout mode.

5. A vehicular air-conditioning apparatus as claimed in claim 1, wherein a rotation angle of the second output shaft, which is rotated when the operation component is moved from the auto blowout mode to the defroster mode, is set larger than the rotation angle of the second output shaft, which is rotated by the rotation of the drive motor, when operation component is set to the auto blowout mode.

6. A vehicular air-conditioning apparatus as claimed in claim 1, wherein:
   the operation component is installed in an air-conditioning operation panel operable by the vehicle occupant; and
   the differential mechanism includes a movable component, said differential mechanism responsive to manual operation force from the operation component to be actuated.

7. A vehicular air-conditioning apparatus as claimed in claim 1, wherein the differential mechanism component is a differential mechanism includes bevel gears for transmitting rotational movement.

8. A motor actuator comprising:

a drive motor, a first output shaft which receives rotation from the drive motor;

a second output shaft which receives the rotation from the first output shaft; and a differential mechanism positioned between the first output shaft and second output shaft that adjusts relative positions of the first output shaft and second output shaft;

an operation component that operates the differential mechanism;

wherein a first slave component is connected to the first output shaft and a second slave components is connected to the second output shaft, and wherein the rotation of the drive motor rotates the first output shaft and the second output shaft at the same time when the movable component is being set to a first operating position, the rotation of the drive motor being transmitted to the first output shaft and the second output shaft through a differential mechanism within a predetermined operation angle range; and wherein the first slave component and the second slave component are activated in linkage through the rotation of the first output shaft and the second output shaft, and wherein the differential mechanism is activated while the first output shaft is stationary when the movable component is being set to the second operation position while the drive motor is stopped to rotate the second output shaft outside the predetermined operation angle range by shifting the relative positions of the first output shaft and the second output shaft.

9. The motor actuator as claimed in claim 8, wherein the second output shaft is rotated when the movable component is moved from the first operating position to the second operating position, a rotation angle of the second output shaft is set larger than a rotation angle of the second output shaft when the movable component is set to the first operation position, said second output shaft being rotated by the drive motor.

10. A motor actuator as claimed in claim 8, wherein the first slave component is a temperature control means for controlling the temperature of air blown into the cabin, the second slave component being blowout mode doors for switching the blowout mode for the cabin.

11. A vehicular air-conditioning apparatus comprising:

defroster openings for blowing out air to a vehicular window glass;

foot openings blowing out air to a foot area of a vehicle occupant;

first air passages sending air to the defroster openings;

second air passages sending air to the foot openings, a first internal/external air selection door that switches air introduced into the first air passages between internal and external air;

a second internal/external air selection door that switches air introduced into the second air passages between internal and external air;

a blowout mode operation component that is manually operated for selecting the blowout mode for a cabin;

a blowout mode input component that rotates in linkage with the operation of the blowout mode operation component;

a temperature control operation component that is manually operated for controlling the temperature of air blown into the cabin;

temperature control input components that rotate in linkage with the operation of the temperature control operation component;

differential mechanisms that rotate the output component using the rotational shift in all of the input components;

wherein the output component is connected to the operation area of the second internal/external air selection door, the mode for blowing out air from both the defroster opening and the foot opening is set by the blowout mode operation component, the differential mechanisms rotate the output component to the predetermined position at the same time based on the rotational shifts of all of the input components when the temperature control operation component is set to the maximum heating setting to set the second internal/external air selection door to introduce internal air into the second air passages.

12. A vehicular air-conditioning apparatus as claimed in claim 11, wherein the differential mechanisms rotate the output component to the predetermined position based on the rotational shifts of the blowout mode input component when the defroster mode for blowing air from the defroster opening is set by the blowout mode operation component to set the second internal/external air selection door to stop internal air flow into the second air passages.

13. A vehicular air-conditioning apparatus as claimed in claim 12, wherein shift adjustment mechanisms are installed between the output component and the second internal/external air selection door to adjust the shifts therebetween; and the second internal/external air selection door remaining in the external air introduction position by a shift adjustment mechanisms even if the rotational shifts of the temperature control input components change the rotational position of the output component when the defroster mode is being set.

14. A vehicular air-conditioning apparatus as claimed in claim 11, wherein when a blowout mode other than the defroster mode is set by the blowout mode operation component and the temperature control operation component is set to the maximum cooling position, the differential mechanisms rotate the output component to the predetermined position based on the rotational shifts of all of the input components, whereby the second internal/external air selection door is set to introduce internal air into the second air passages.

15. A vehicular air-conditioning apparatus as claimed in claims 11, wherein the differential mechanisms include bevel gears, the rotational shifts of the temperature control input components are input into the bevel gears at the same time.

16. A vehicular air-conditioning apparatus as claimed in claim 11, wherein shift adjustment mechanisms for adjusting the shifts between two components are installed between the blowout mode operation component and the blowout mode input component, shift adjustment mechanisms being installed between the temperature control operation component and the temperature control input components.

17. A vehicular air-conditioning apparatus comprising:

defroster openings that blow air into the vehicular window glass;

foot openings that blow air into the foot area of the vehicle occupant;

an internal/external air selection door that switches air sent to the cabin between internal and external air;

an internal/external air operation component that is manually operated to switch between internal and external air introduction;

a blowout mode operation component that is manually operated to select a blowout mode for the cabin, a blowout mode input component which rotates in linkage with the operation of the blowout mode operation component;

an internal/external air selection input component that rotates in linkage with the operation of the internal/external air operation component;

wherein a differential mechanism that rotates the output component using the rotational shift of both of the input components as inputs;

wherein the output component is connected to the operation area of the internal/external air selection door;

wherein when the mode for blowing out air mainly from defroster openings is being set by the blowout mode operation component, the differential mechanism rotates the output component to the predetermined position based on the rotational shifts of the blowout mode input component, whereby the internal/external air selection door is maintained in the external air introduction position; and wherein when a blowout mode other than the defroster-dominant mode is being set by the blowout mode operation component, the differential mechanism rotates the output component to the position that corresponds to the rotational shift of the internal/external air selection input component, whereby the internal/external air selection door is set to the internal/external air mode set by the blowout mode operation component.

18. A vehicular air-conditioning apparatus as claimed in claim 17, wherein shift adjustment mechanisms are installed between the output component and the second internal/external air selection door to adjust the shifts therebetween; and the second internal/external air selection door remaining in the external air introduction position by a shift adjustment mechanisms even if the rotational shifts of the temperature control input components change the rotational position of the output component when the defroster mode is being set.

19. A vehicular air-conditioning apparatus as claimed in claim 17, wherein the differential mechanism uses bevel gears, the rotational shift of the blowout mode input component is input into the bevel gears at the same time.

20. A vehicular air-conditioning apparatus as claimed in claim 11, further comprising:

a temperature control means for controlling a temperature of air blown into the cabin;

blowout mode doors that switch a mode for blowing air into the cabin;

a first transmission means that transmits the operation of the temperature control operation component to the operation area of the temperature control means;

a second transmission means for transmitting the operation of the blowout mode operation component to the operation areas of the blowout mode doors, the control input components (200 and 119) of the differential mechanisms (98 and 98A) are rotated based on the shift transmitted from the first transmission means, and the blowout mode input component of the differential mechanisms is rotated based on the shift transmitted from the second transmission means.

21. A vehicular air-conditioning apparatus as claimed in claim 20, wherein the differential mechanisms are positioned closer to the temperature control means and the blowout mode doors than to the second internal/external air selection door, and a third transmission means is provided that transmits the rotational shift of the output component of the differential mechanisms to the second internal/external air selection door.

22. A vehicular air-conditioning apparatus as claimed in claim 21, further comprising a 2-layer partitioning door for separating the first air passages from the second air passages on the upstream side of the defroster opening and the foot opening;

wherein the second internal/external air selection door and the 2-layer partitioning door are operated in linkage based on the rotational shift of the output component.

23. A vehicular air-conditioning apparatus comprising:

a temperature control means for controlling the temperature of air blown into the cabin;

face openings that blow air toward a head of a vehicle occupant in a cabin;

foot openings that blow air toward feet of the vehicle occupant in the cabin;

defroster openings that blow air toward the vehicular window glass;

blowout mode doors that open and close individual openings and switches including a face mode for blowing out air from the face openings, a foot mode for blowing out air from the foot openings, and a defroster mode for blowing out air from the defroster openings;

a drive motor;

a first rotation shaft that receives rotation from the drive motor;

a second rotation shaft that receives rotation from the first rotation shaft;

a differential mechanism positioned between the first rotation shaft and the second rotation shaft for adjusting the relative positions theirbetween;

an operation component that operates a differential mechanism; wherein the temperature control means is connected to the first rotation shaft;

the blowout mode doors are connected to the second rotation shaft; and when the operation component is set to the auto blowout mode, the rotation of the drive motor rotates the first rotation shaft and the second rotation shaft at the same time, the differential mechanism transmitting rotation from the drive motor to the first rotation shaft and the second rotation shaft; and wherein the rotation of the first rotation shaft controls the temperature control means, the rotation of the second rotation shaft drives the blowout mode doors; and wherein when the operation component is being set to the face mode position, the foot mode position, or the defroster position of the blowout mode while the drive motor is stopped, the differential mechanism is activated while the first rotation shaft is stationary, whereby the face mode, foot mode, or defroster mode is set by rotating the second rotation shaft and changing the operation angle of the second rotation shaft corresponding to the operation position of the operation component.

24. A vehicular air-conditioning apparatus described in claim 23, wherein:

an intermittent operation mechanism is provided between the second rotation shaft and the operation mechanism on the side of the blowout mode doors; and the rotation of the second rotation shaft is intermittently transmitted to the operation mechanism only within part of the operation angle of the second rotation shaft.

25. A vehicular air-conditioning apparatus as claimed in claim 23, wherein the differential mechanism is a planetary gear mechanism, the first rotation shaft being a sun gear shaft of the planetary gear mechanism and the second rotation shaft being an internal gear shaft of the planetary gear shaft, and a planetary gear is revolved by operating the operation component.

26. An operational force transmission device comprising:

a first input component that rotates in linkage with the operation of a first operation component;

a second input components that rotate in linkage with the operation of second operation components;

a differential mechanism that rotates an output component using the rotational shift of the first input component and the second input components;

slave components driven by rotational shift of the output component;

wherein the differential mechanism rotates the output component to the first output position when all of the input components have rotated to predetermined positions, the differential mechanism rotating the output component to the second output position when any of input components rotates to a position different from the predetermined position.

27. An operational force transmission device comprising:

a first input component that rotates in linkage with operation of a first operation component;

second input components that rotate in linkage with the operation of second operation components;

a differential mechanism that rotates an output component using rotational shift of the first input component and the second input components;

slave components driven by rotational shift of the output component;

wherein shift adjustment mechanisms are installed between the output component and the slave components for adjusting shifts theirbetween;

wherein the differential mechanism rotates the output component within a predetermined range between first and second positions corresponding to the rotational shift of the first input component within the predetermined range, the output component rotates to a third position that is outside of the predetermined range based on the rotational shift of the second input components; and when the output component rotates to the third position, the rotational shift of the output component is designed not to be transmitted to the slave components by the shift adjustment mechanisms.

* * * * *